United States Patent
Imaoka et al.

(10) Patent No.: US 12,422,655 B2
(45) Date of Patent: Sep. 23, 2025

(54) OPTICAL SYSTEM, IMAGE PROJECTION APPARATUS, AND IMAGING APPARATUS

(71) Applicant: Panasonic Intellectual Property Management Co., Ltd., Osaka (JP)

(72) Inventors: Takuya Imaoka, Kanagawa (JP); Qinghua Zhao, Miyagi (JP); Katsu Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 478 days.

(21) Appl. No.: 17/821,231

(22) Filed: Aug. 22, 2022

(65) Prior Publication Data

US 2022/0397749 A1    Dec. 15, 2022

Related U.S. Application Data

(63) Continuation of application No. PCT/JP2020/042935, filed on Nov. 18, 2020.

(30) Foreign Application Priority Data

Feb. 27, 2020    (JP) ................. 2020-032016

(51) Int. Cl.
*G02B 15/22*    (2006.01)
*G02B 13/16*    (2006.01)

(52) U.S. Cl.
CPC ............. *G02B 15/22* (2013.01); *G02B 13/16* (2013.01)

(58) Field of Classification Search
CPC .... G02B 15/22; G02B 15/1461; G02B 15/14; G02B 13/16

(Continued)

(56) References Cited

U.S. PATENT DOCUMENTS

2010/0128234 A1*    5/2010    Nishikawa ......... G02B 17/0896
                                                                353/101
2015/0103403 A1*    4/2015    Oe ..................... G02B 13/0095
                                                                359/432

(Continued)

FOREIGN PATENT DOCUMENTS

JP    2010-122573    6/2010
JP    2019-174633    10/2019

OTHER PUBLICATIONS

International Search Report issued Jan. 26, 2021 in International (PCT) Application No. PCT/JP2020/042935.

(Continued)

*Primary Examiner* — Stephone B Allen
*Assistant Examiner* — Leonidas Boutsikaris
(74) *Attorney, Agent, or Firm* — Wenderoth, Lind & Ponack, L.L.P.

(57) ABSTRACT

The present disclosure is directed to an optical system internally having an intermediate imaging position that is conjugated to a magnification conjugate point on a magnification side and a reduction conjugate point on a reduction side, respectively, the optical system comprising: a magnification optical system positioned on the magnification side with respect to the intermediate imaging position; and a relay optical system positioned on the reduction side with respect to the intermediate imaging position; the relay optical system including: a first lens group positioned closest to the magnification side; two lens groups positioned on the reduction side with respect to the first lens group; and a negative lens group interposed between the two lens groups, wherein during zooming the negative lens is fixed, while the two lens groups are displaced.

20 Claims, 19 Drawing Sheets

(58) Field of Classification Search
USPC .......................................................... 359/676
See application file for complete search history.

(56) References Cited

U.S. PATENT DOCUMENTS

| | | | |
|---|---|---|---|
| 2018/0059380 A1* | 3/2018 | Nagatoshi | G02B 13/16 |
| 2018/0059393 A1* | 3/2018 | Nagatoshi | G02B 13/16 |
| 2019/0166329 A1* | 5/2019 | Shiokawa | G02B 13/16 |
| 2019/0306390 A1 | 10/2019 | Nagatoshi et al. | |

OTHER PUBLICATIONS

International Preliminary Report on Patentability issued Aug. 30, 2022 in corresponding Internaitonal (PCT) Patent Application No. PCT/JP2020/042935.

Notice of Reasons for Refusal dated Aug. 6, 2024, in corresponding Japanese Patent Application No. 2022-503093, with English-language translation.

* cited by examiner

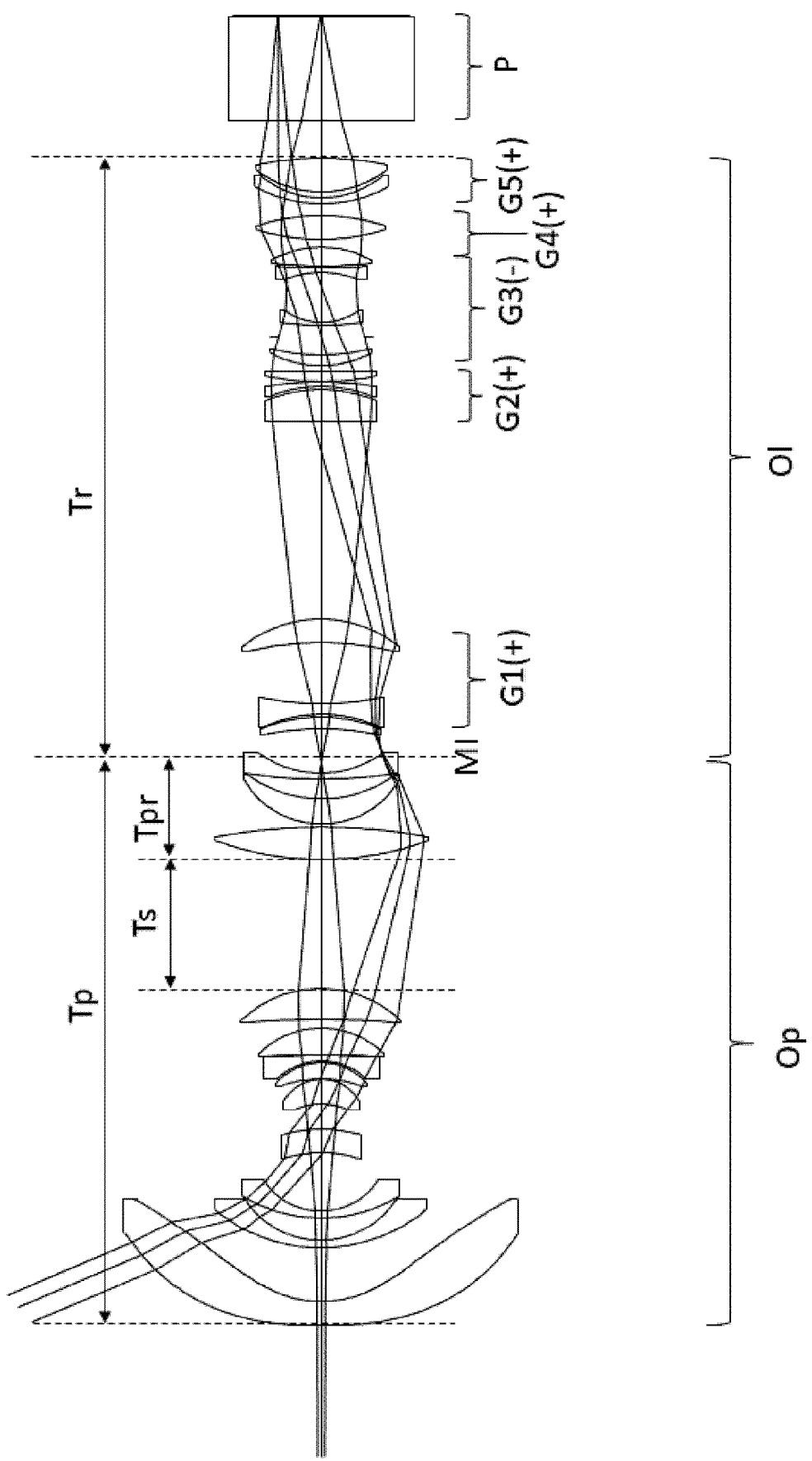

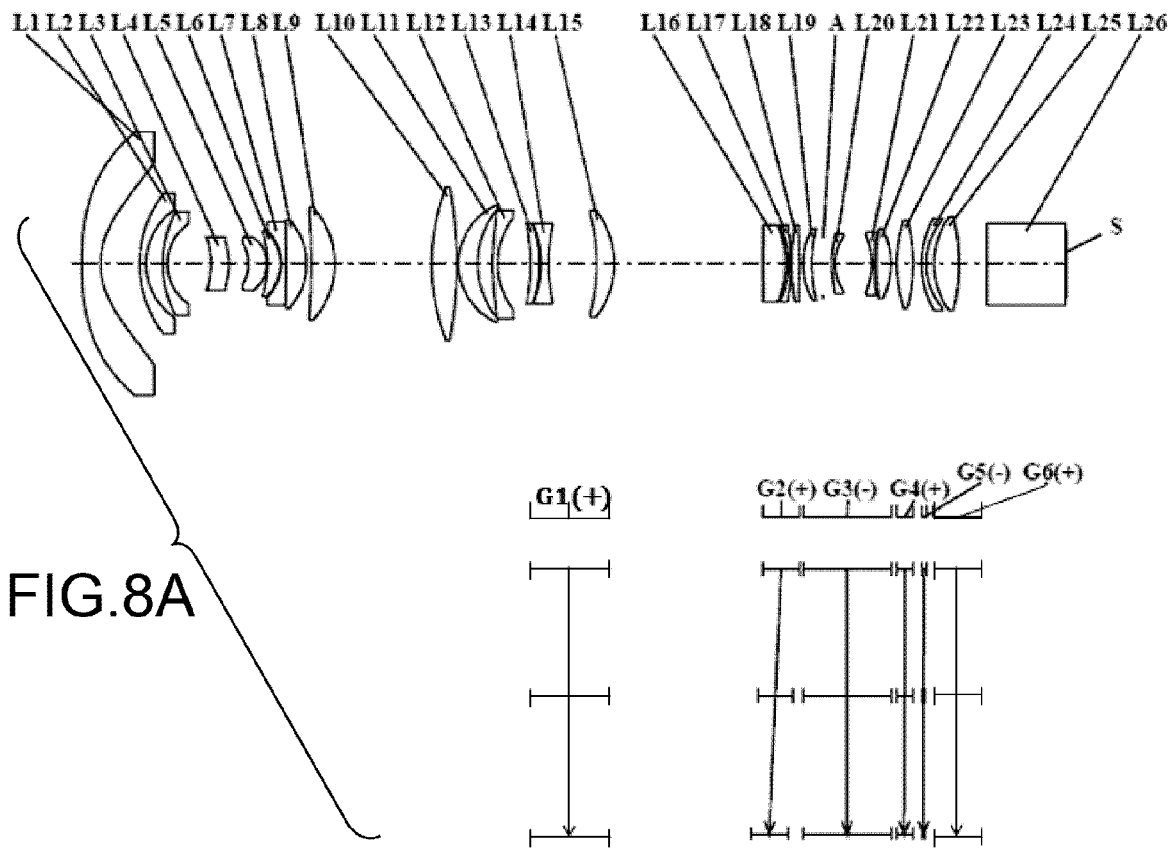
FIG.8A
FIG.8B
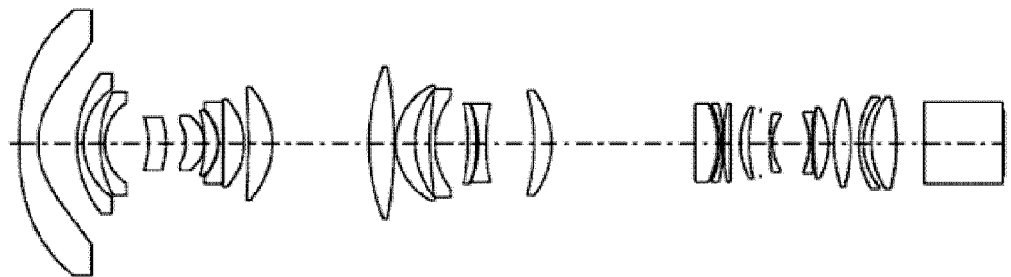
FIG.8C
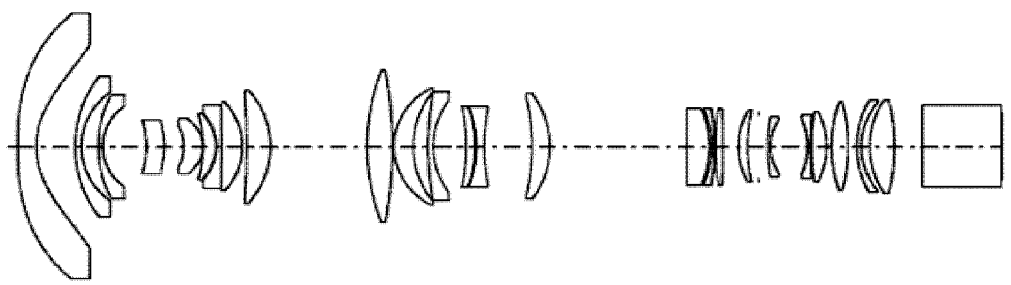

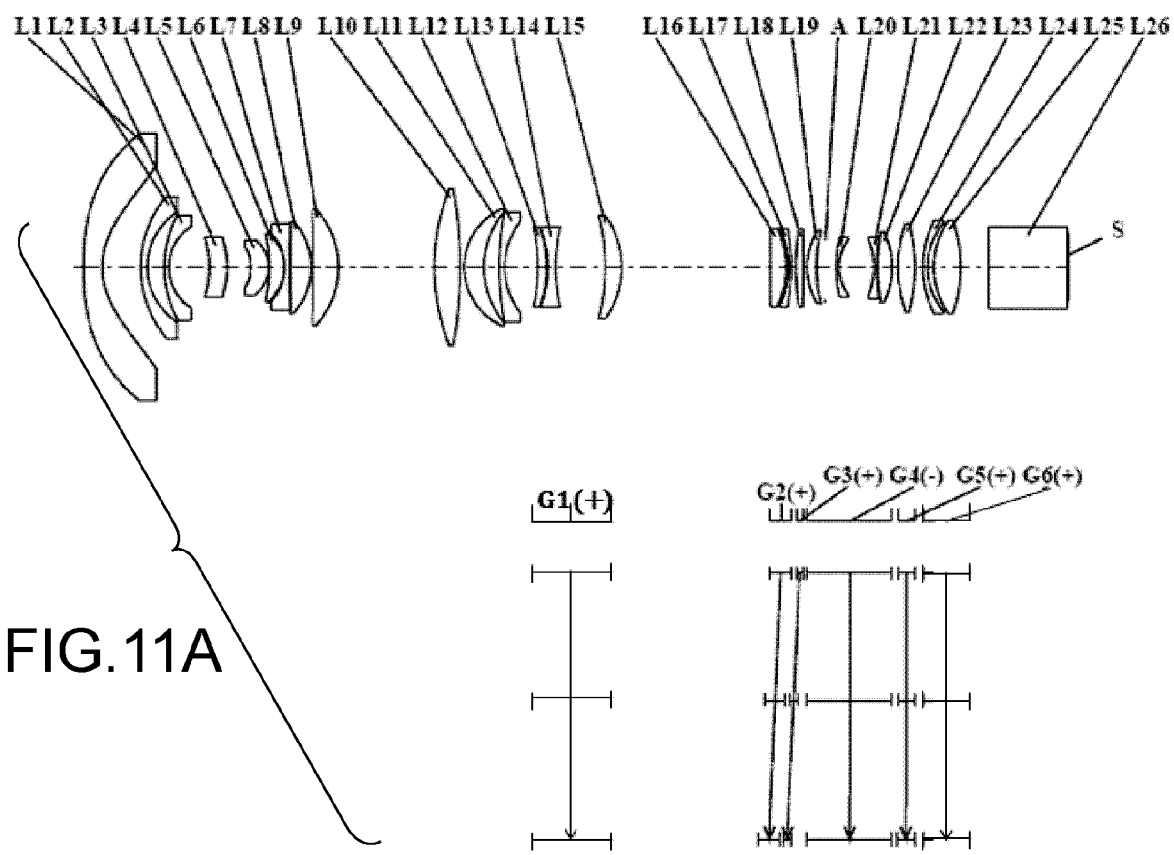
FIG.11A
FIG.11B
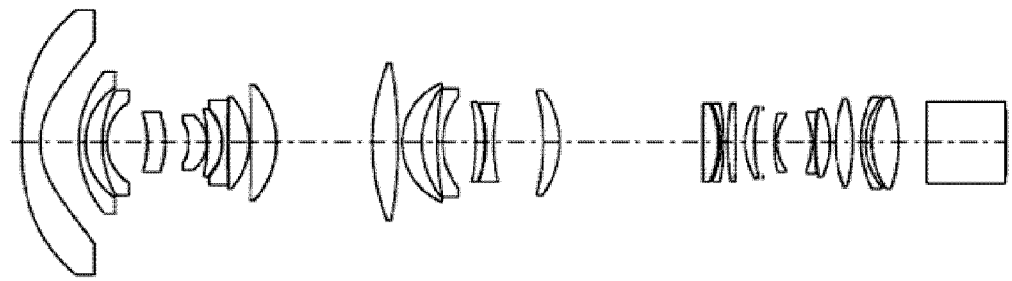
FIG.11C
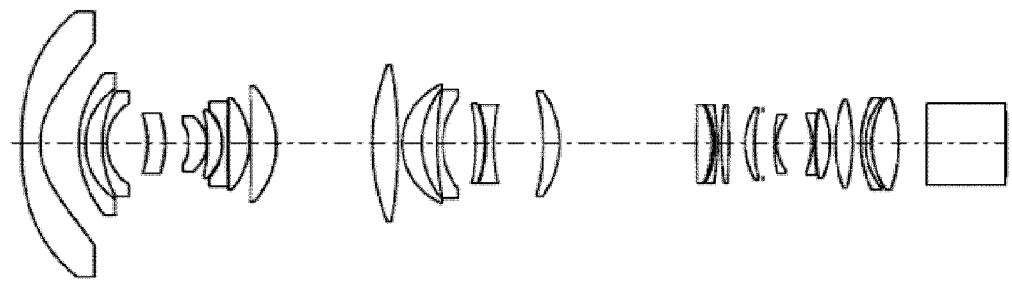

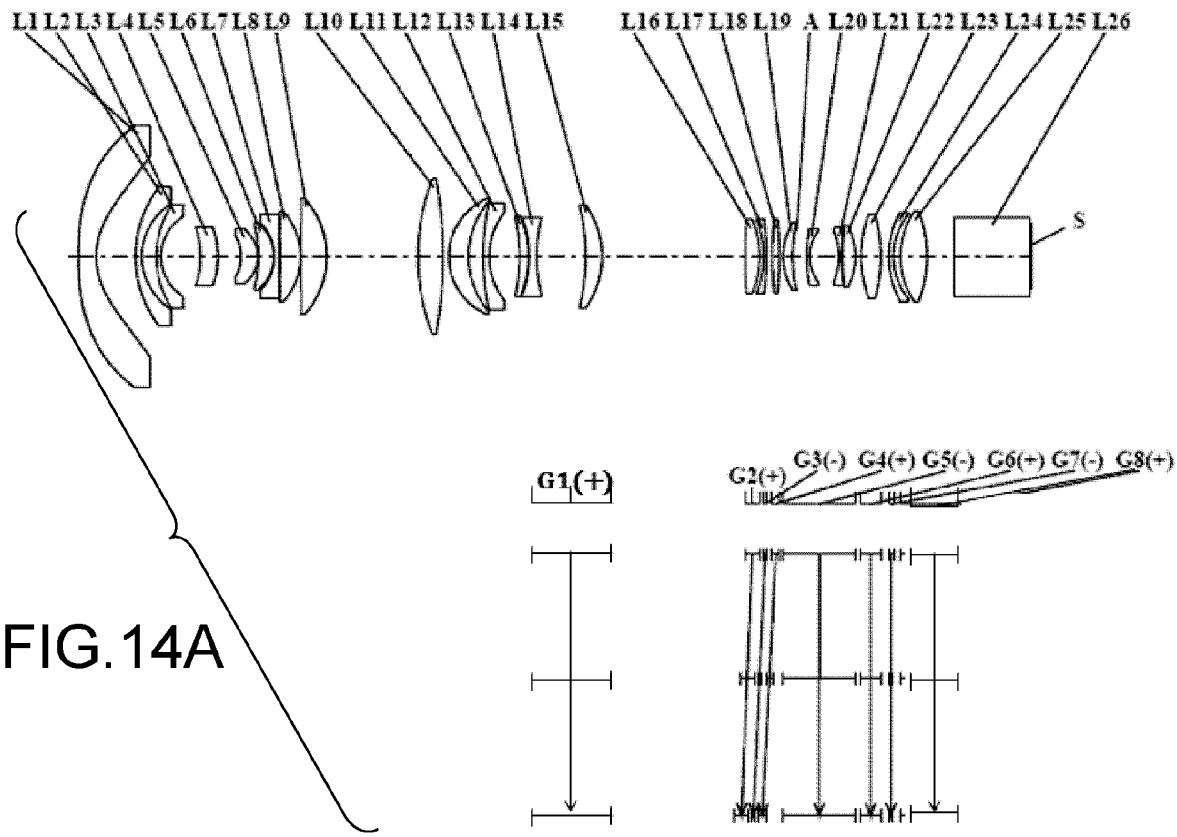
FIG.14A
FIG.14B
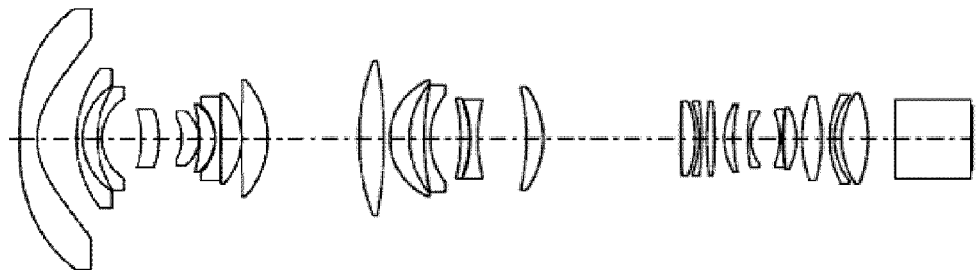
FIG.14C
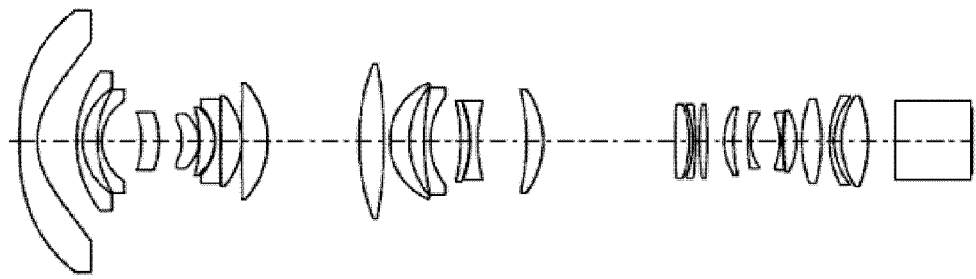

OPTICAL SYSTEM, IMAGE PROJECTION APPARATUS, AND IMAGING APPARATUS

CROSS-REFERENCE OF RELATED APPLICATIONS

This application is a continuation of International Patent Application No. PCT/JP2020/042935, filed on Nov. 18, 2020, which claims the benefit of Japanese Patent Application No. 2020-032016, filed on Feb. 27, 2020, the contents all of which are incorporated herein by reference.

TECHNICAL FIELD

The present disclosure relates to an optical system that forms an intermediate image. The present disclosure also relates to an image projection apparatus and an imaging apparatus using such an optical system.

BACKGROUND

Intermediate imaging-based optical systems have an advantage of achieving wide-angle projection with a short focal length and a wide screen, while the total length of the optical system tends to be increased, thereby rendering the optical system heavier. When attaching a portion of the optical system to an outside of a hosing of an image projection apparatus body, a moment acting on the center of gravity may cause the optical system to tilt relative to the apparatus body, thereby possibly degrading the optical performance.

In order to reduce a weight of the optical system, it may be conceived that a lens made of a synthetic resin is used in lieu of a lens made of glass. Such a synthetic resin has a smaller specific gravity, a smaller thermal conductivity and a larger coefficient of linear expansion as compared to glass. Thus, the optical system can be lightweight. However if local temperature elevation and thermal deformation take place, some optical aberrations, in particular, chromatic aberration tends to be increased. This tendency is more remarkable in case of high-intensity projection.

Patent Document 1 discloses a wide-angle imaging optical system, wherein the first lens L1a positioned closest to the magnification conjugate point has the largest diameter. The first lens L1a has aspherical double surfaces with quite complicated shapes, hence, it could be imagined to use a synthetic resin lens. However, such complicated aspherical shapes tend to be sensitive to thermal deformation. Therefore, it is expected that optical aberrations may be significantly degraded due to temperature elevation.

PATENT DOCUMENT

[Patent Document 1] JP 2019-174633 A

The present disclosure provides an optical system that can reduce a moment acting on the center of gravity and mitigate thermal effect. The present disclosure also provides an image projection apparatus and an imaging apparatus using such an optical system.

One aspect of the present disclosure is directed to an optical system internally having an intermediate imaging position that is conjugated to a magnification conjugate point on a magnification side and a reduction conjugate point on a reduction side, respectively, the optical system comprising:

a magnification optical system positioned on the magnification side with respect to the intermediate imaging position; and
a relay optical system positioned on the reduction side with respect to the intermediate imaging position;
the relay optical system including:
a first lens group positioned closest to the magnification side;
two lens groups positioned on the reduction side with respect to the first lens group; and
a negative lens group interposed between the two lens groups,
wherein during zooming the negative lens is fixed, while the two lens groups are displaced.

Further, an image projection apparatus according to the present disclosure includes the above-described optical system and an image forming element that generates an image to be projected through the optical system onto a screen.

Still further, an imaging apparatus according to the present disclosure includes the above-described optical system and an imaging element that receives an optical image formed by the optical system to convert the optical image into an electrical image signal.

The optical system according to the present disclosure can reduce a moment acting on the center of gravity and mitigate thermal effect. Therefore, stable optical performance can be kept in case of high intensity light passing through the lens, for example, high-intensity projection.

BRIEF DESCRIPTION OF THE DRAWINGS

FIG. 4 is a layout diagram showing an optical path at a wide-angle end in a zoom lens system of example 2 for an object distance of 1065.7157 mm.

FIGS. 8A-8C are layout diagrams of the zoom lens system of example 3 for an object distance of 1065.7157 mm.

FIGS. 11A-11C are layout diagrams of the zoom lens system of example 4 for an object distance of 1065.7157 mm.

FIGS. 14A-14C are layout diagrams of the zoom lens system of example 5 for an object distance of 1065.7157 mm.

DESCRIPTION OF EMBODIMENT

Figure 1:
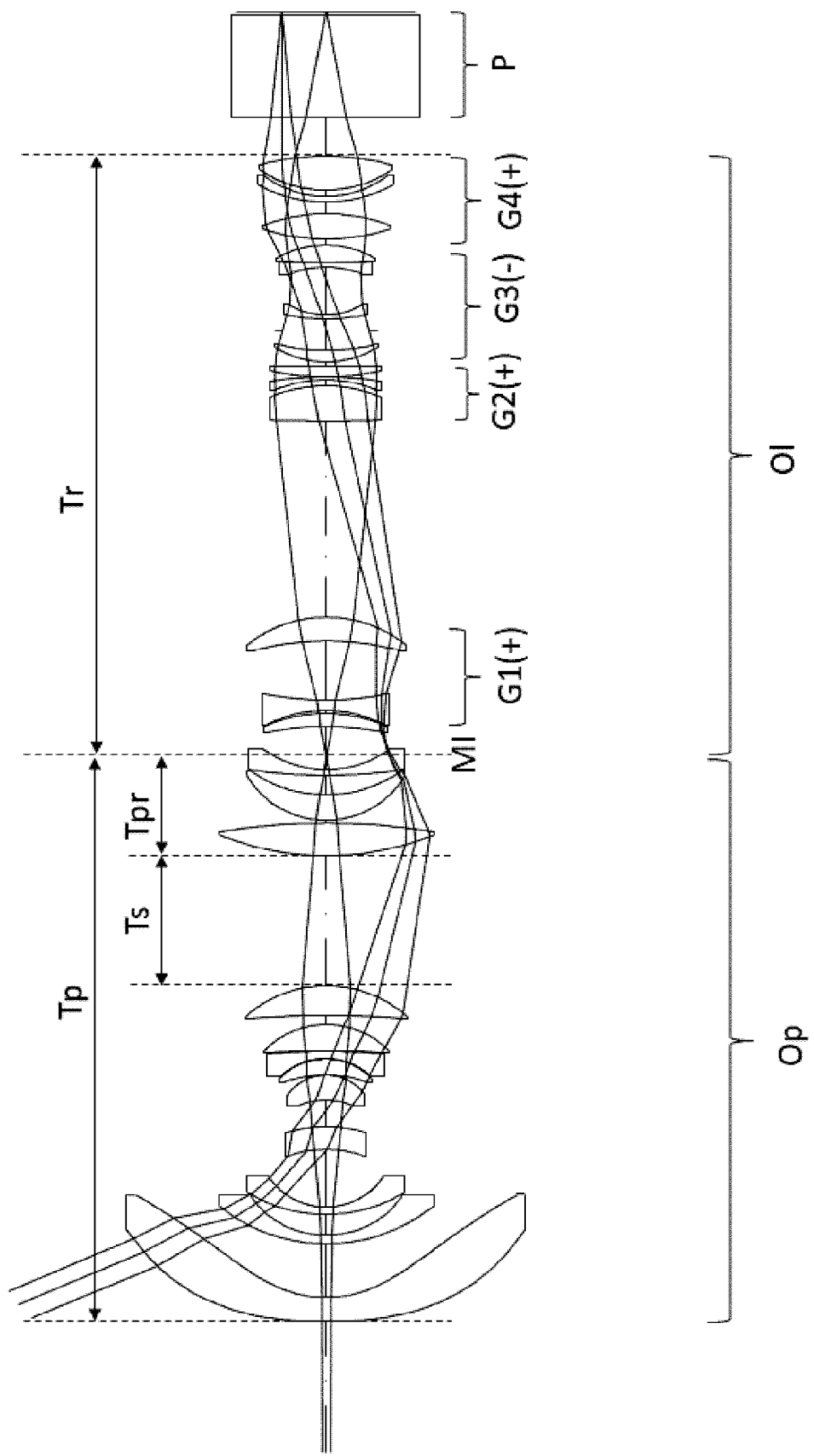
FIG. 1 is a layout diagram showing an optical path at a wide-angle end in a zoom lens system of example 1 for an object distance of 1065.7157 mm.
Figure 2A:
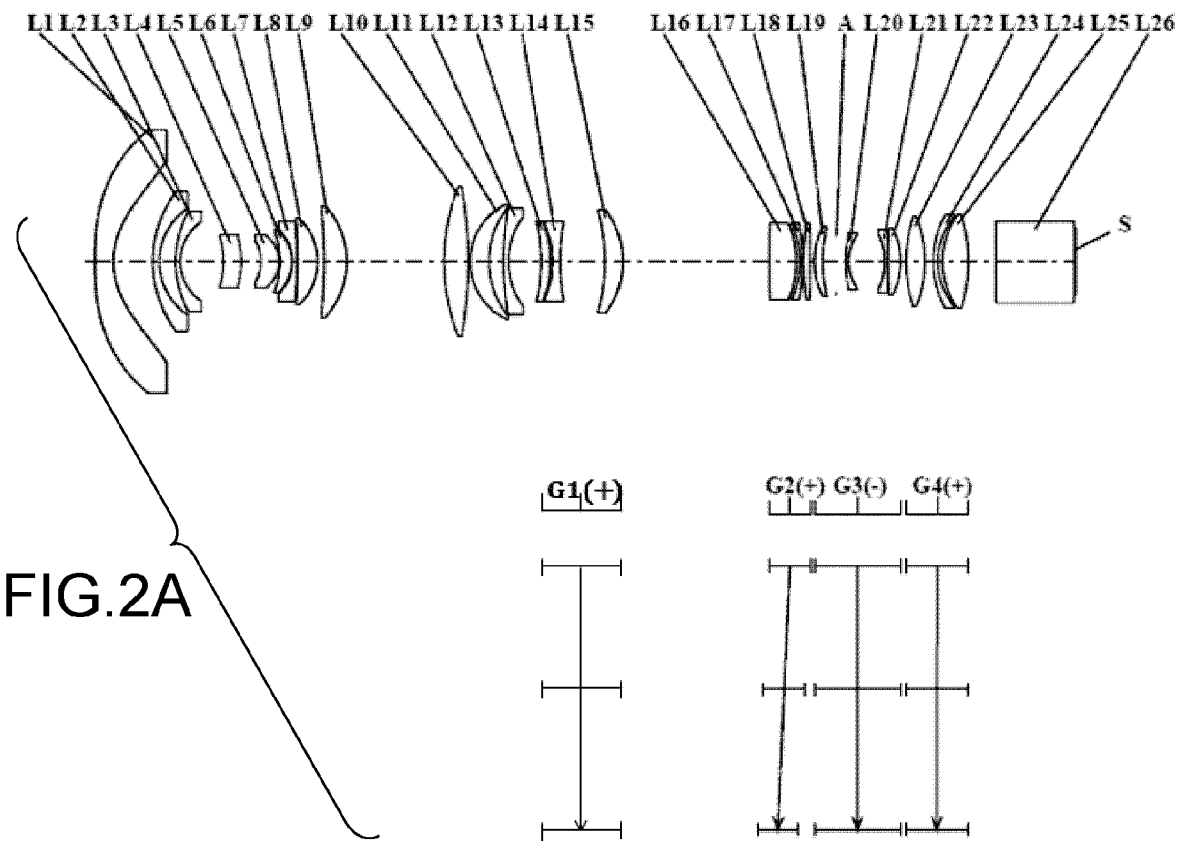
FIGS. 2A-2C are layout diagrams of the zoom lens system of example 1 for an object distance of 1065.7157 mm.
Figure 2B:
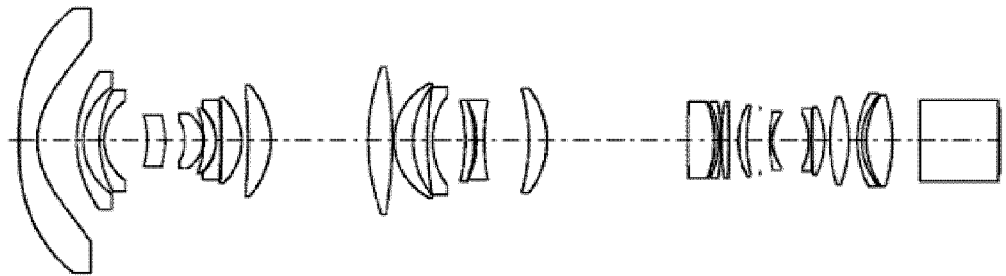
Figure 2C:
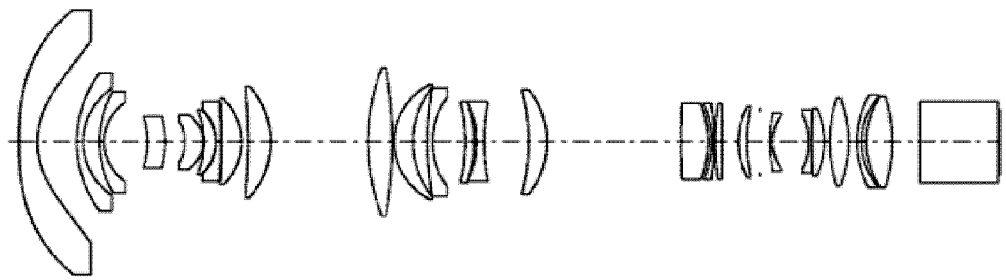
Figure 3A:
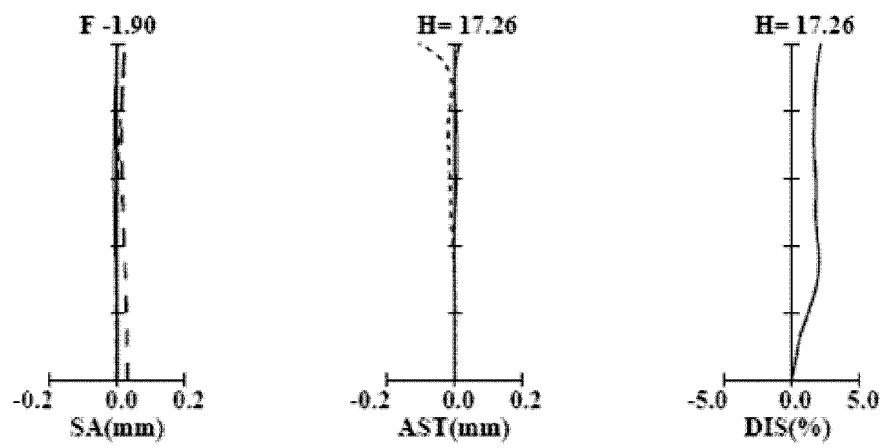
FIGS. 3A-3C are longitudinal aberrations diagram of the zoom lens system of example 1 for an object distance of 1065.7157 mm.
Figure 3B:
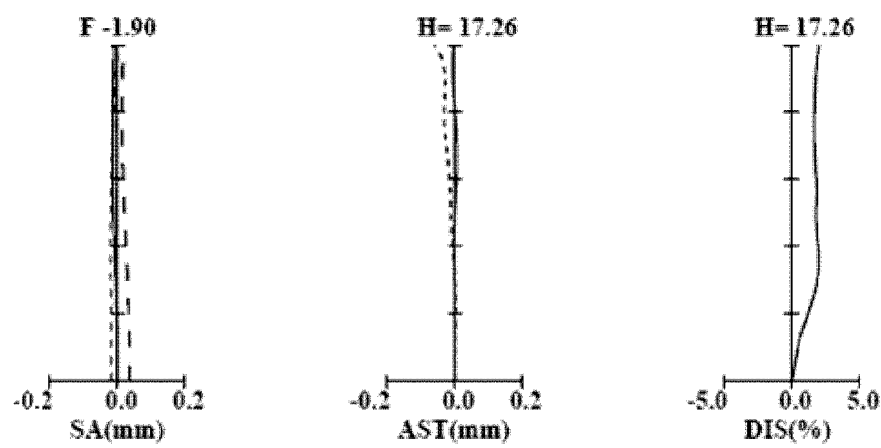
Figure 3C:
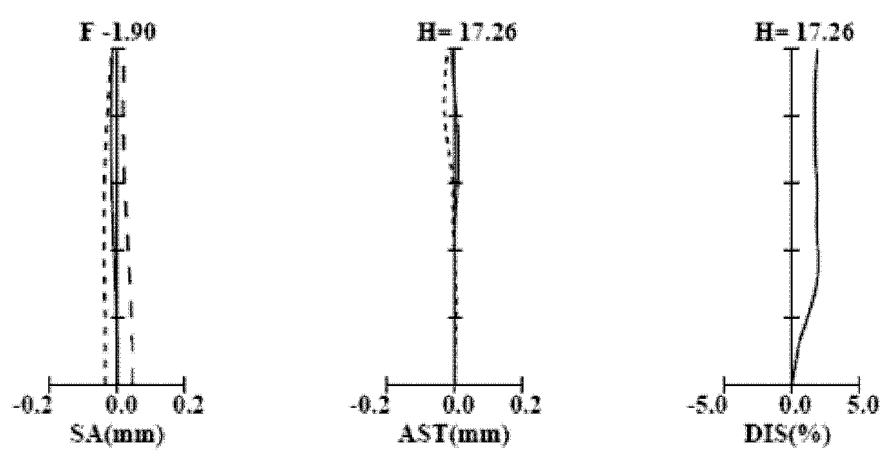
Figure 5A:
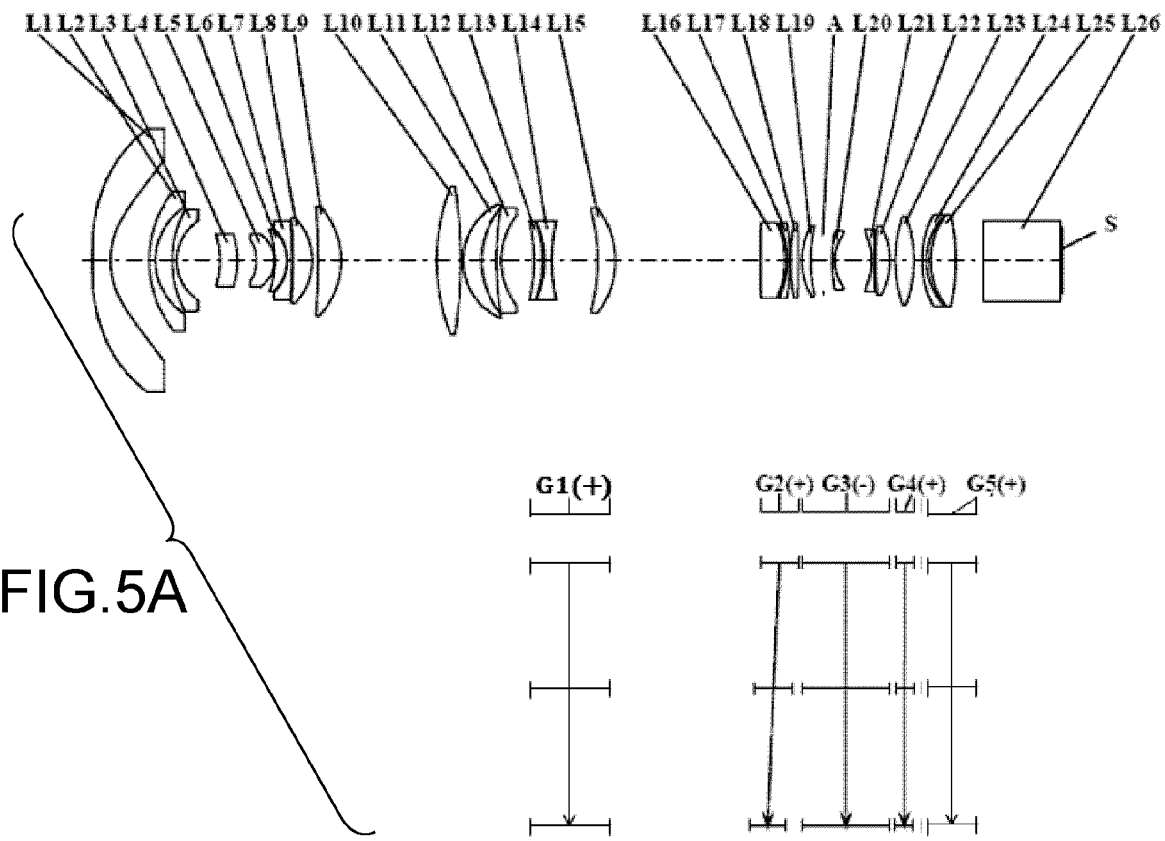
FIGS. 5A-5C are layout diagrams of the zoom lens system of example 2 for an object distance of 1065.7157 mm.
Figure 5B:
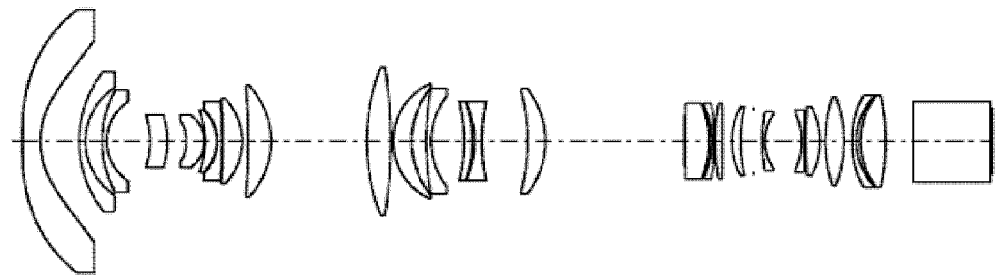
Figure 5C:
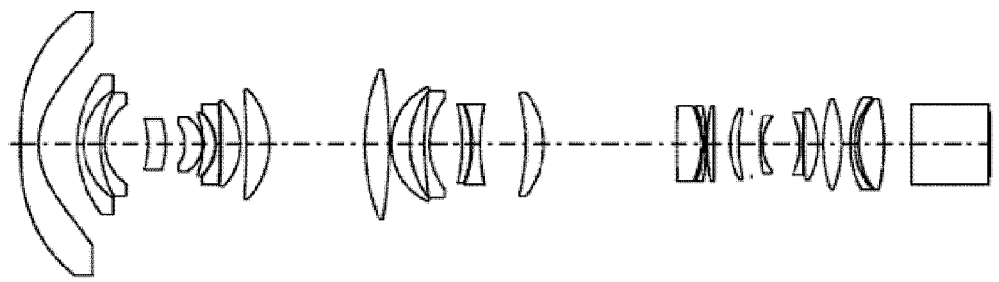
Figure 6A:
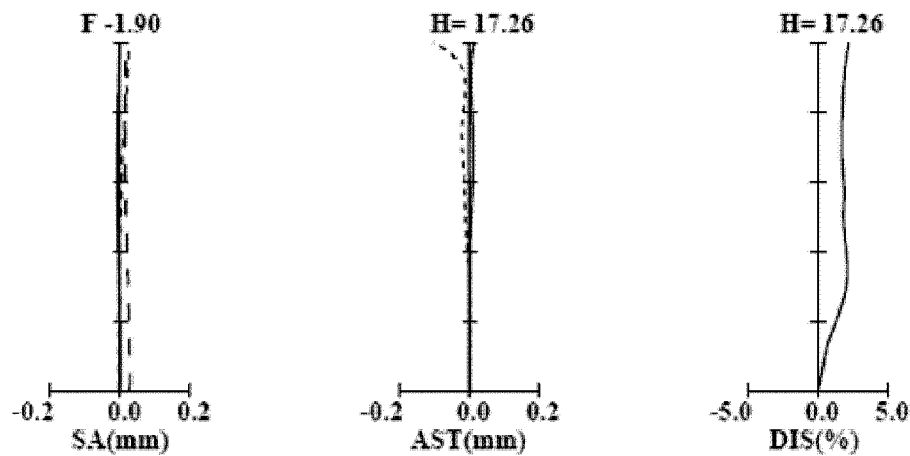
FIGS. 6A-6C are longitudinal aberrations diagram of the zoom lens system of example 2 for an object distance of 1065.7157 mm.
Figure 6B:
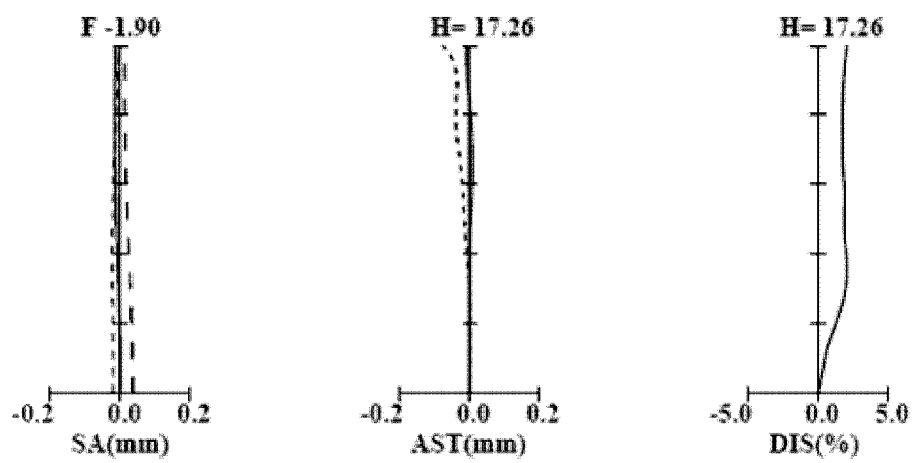
Figure 6C:
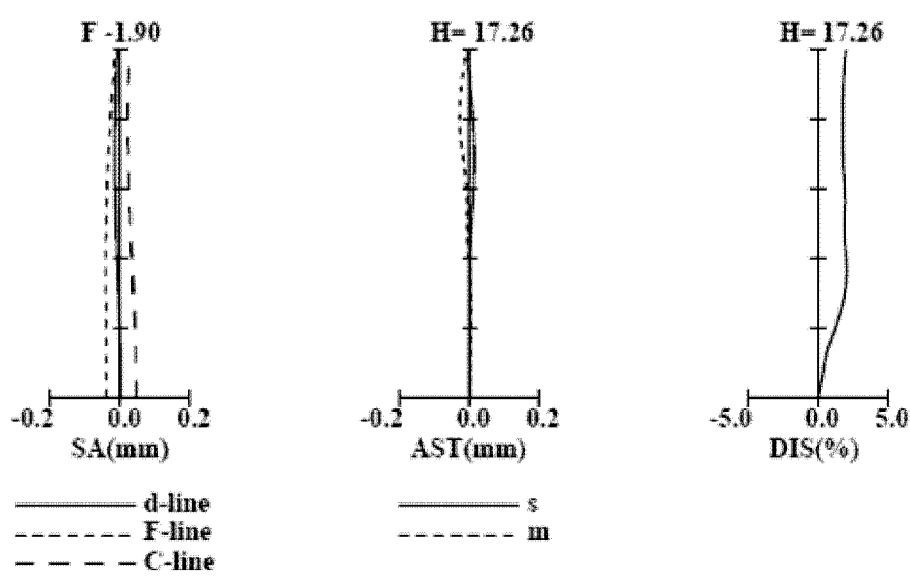
Figure 7:
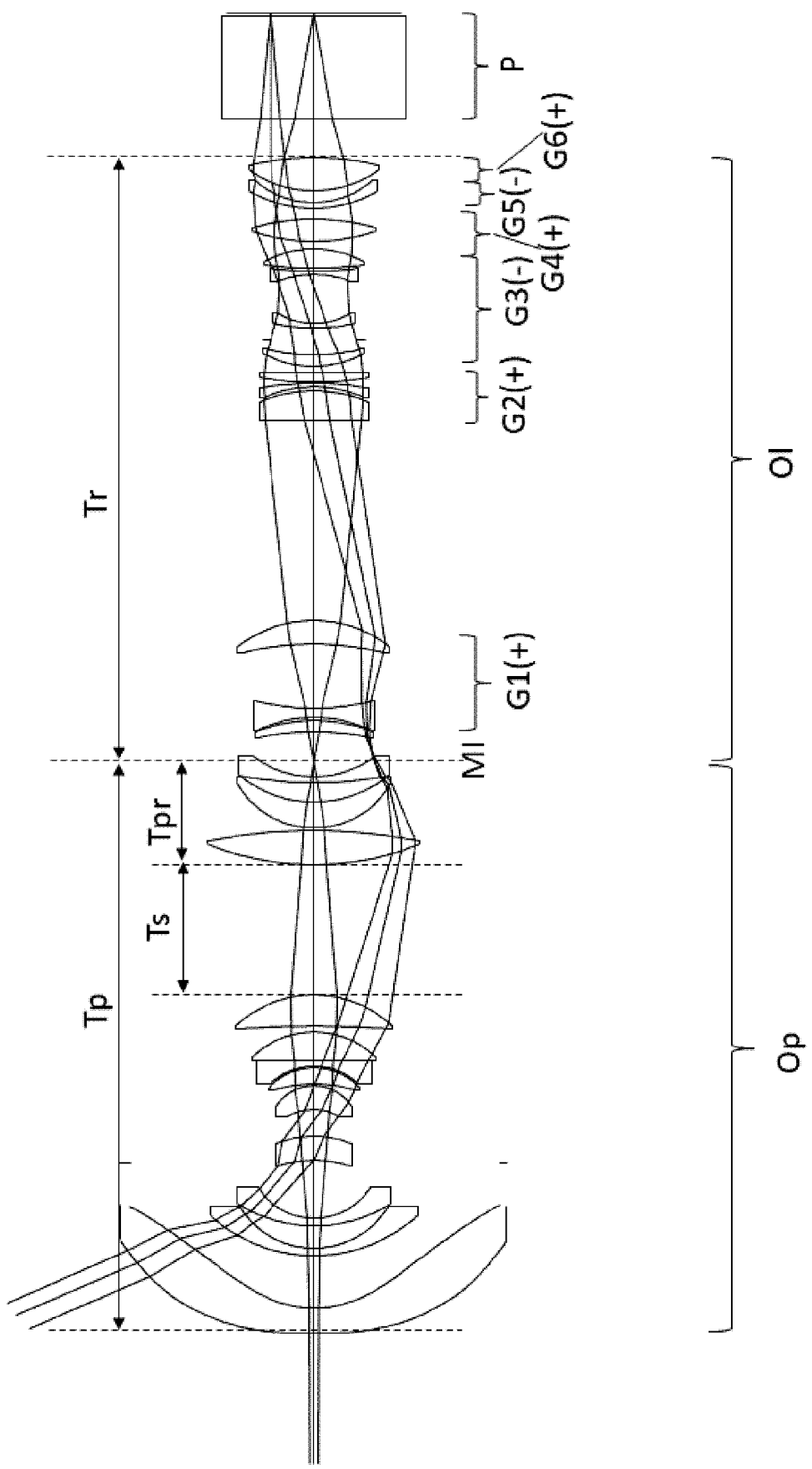
FIG. 7 is a layout diagram showing an optical path at a wide-angle end in a zoom lens system of example 3 for an object distance of 1065.7157 mm.
Figure 9A:
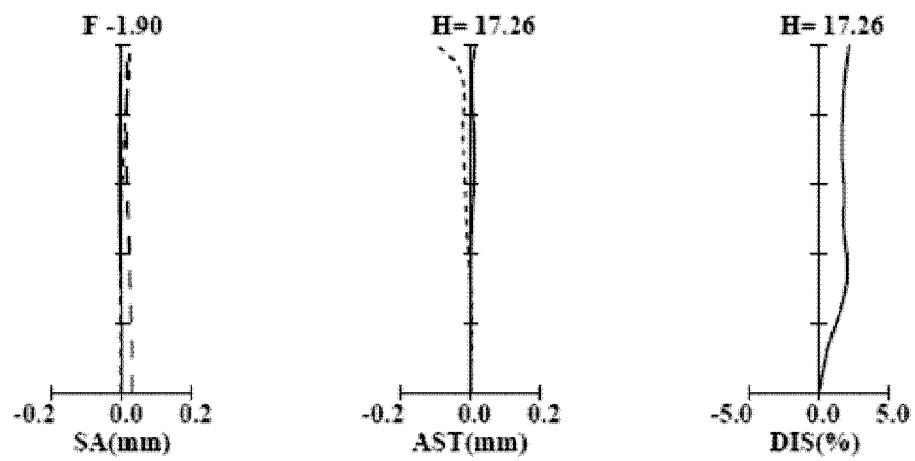
FIGS. 9A-9C are longitudinal aberrations diagram of the zoom lens system of example 3 for an object distance of 1065.7157 mm.
Figure 9B:
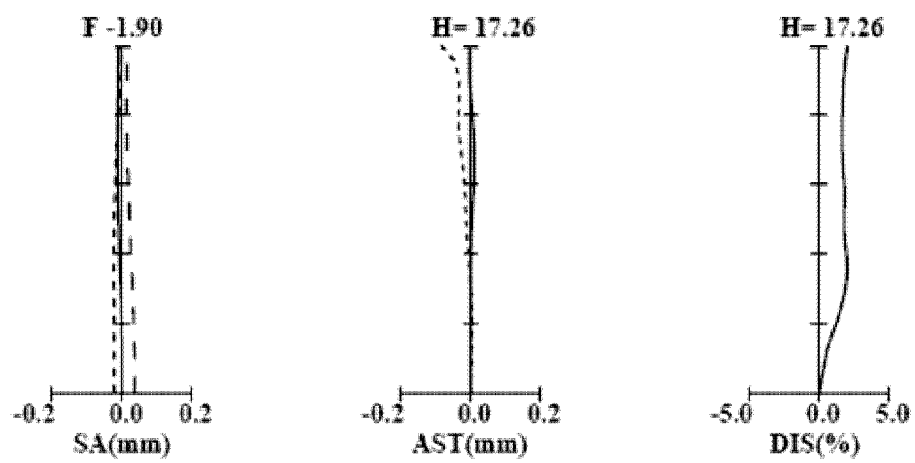
Figure 9C:
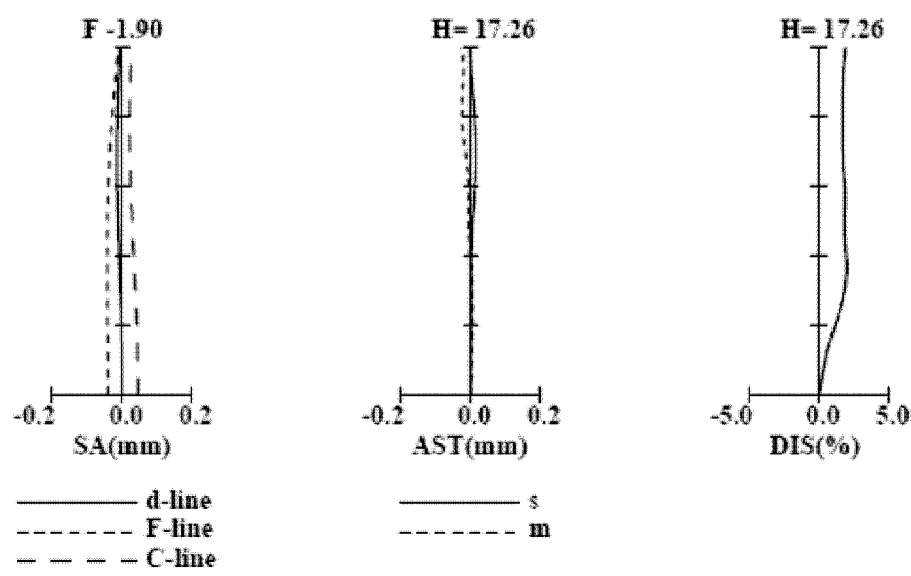
Figure 10:
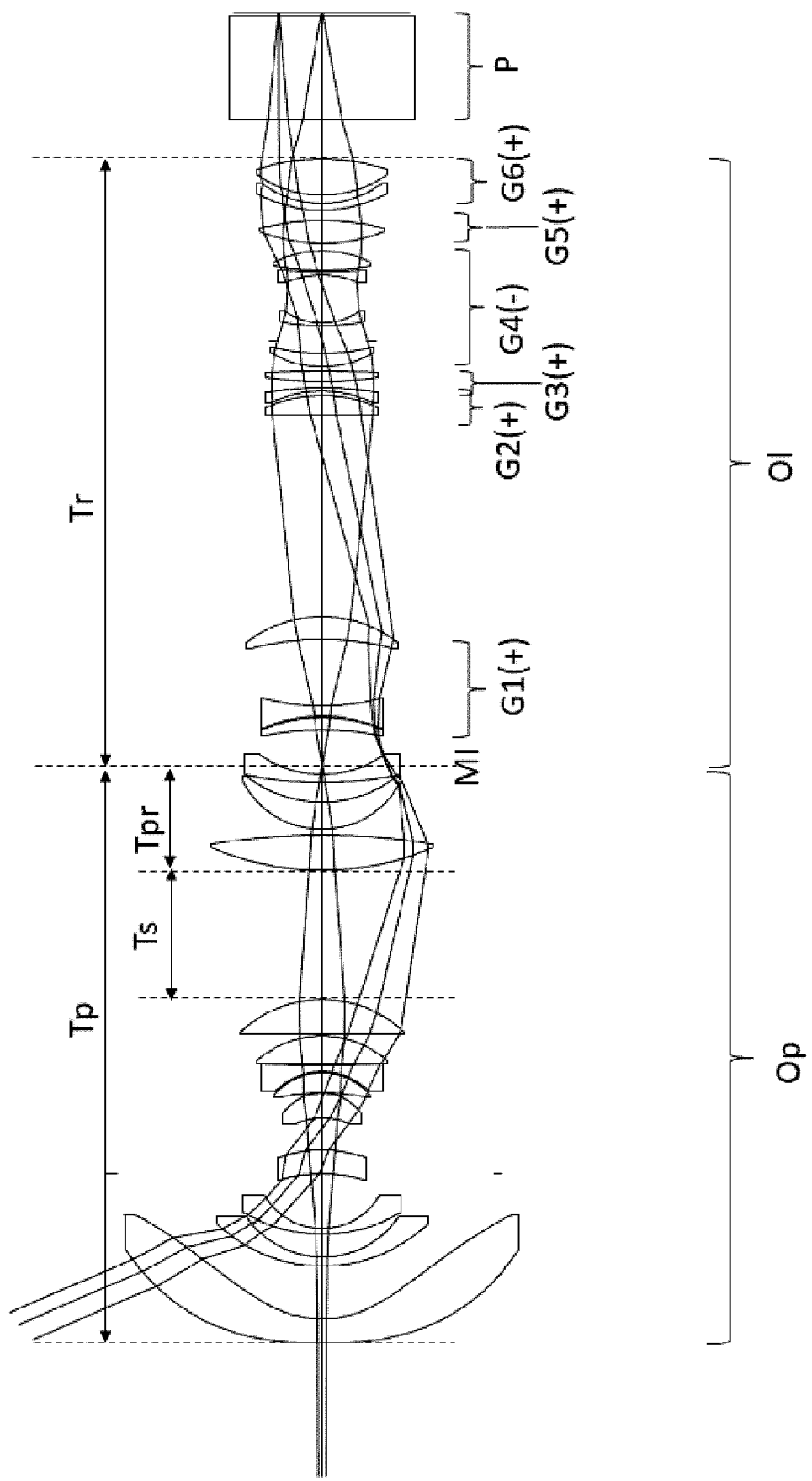
FIG. 10 is a layout diagram showing an optical path at a wide-angle end in a zoom lens system of example 4 for an object distance of 1065.7157 mm.
Figure 12A:
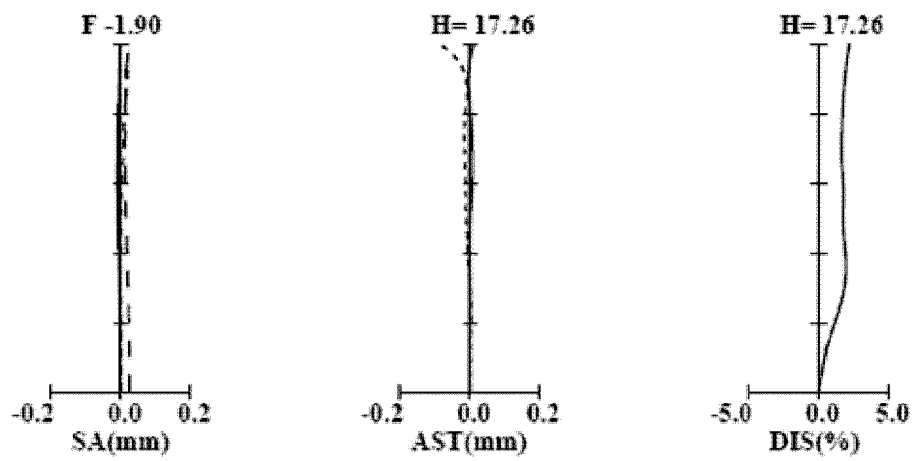
FIGS. 12A-12C are longitudinal aberrations diagram of the zoom lens system of example 4 for an object distance of 1065.7157 mm.
Figure 12B:
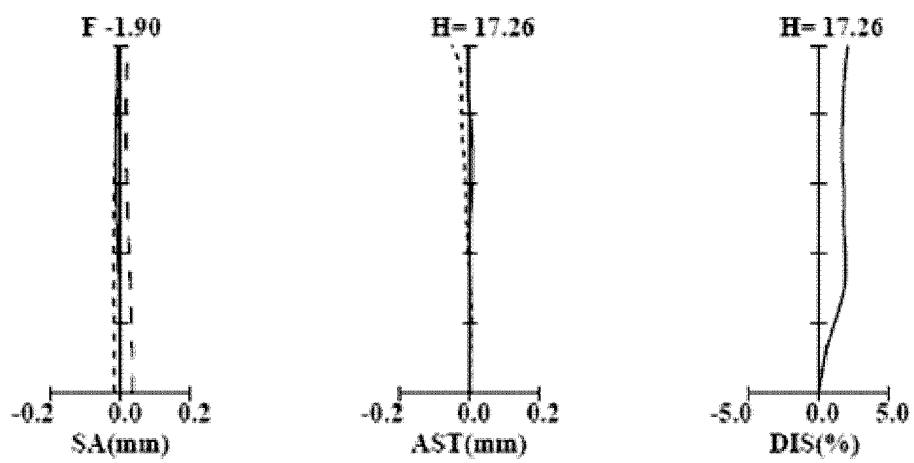
Figure 12C:
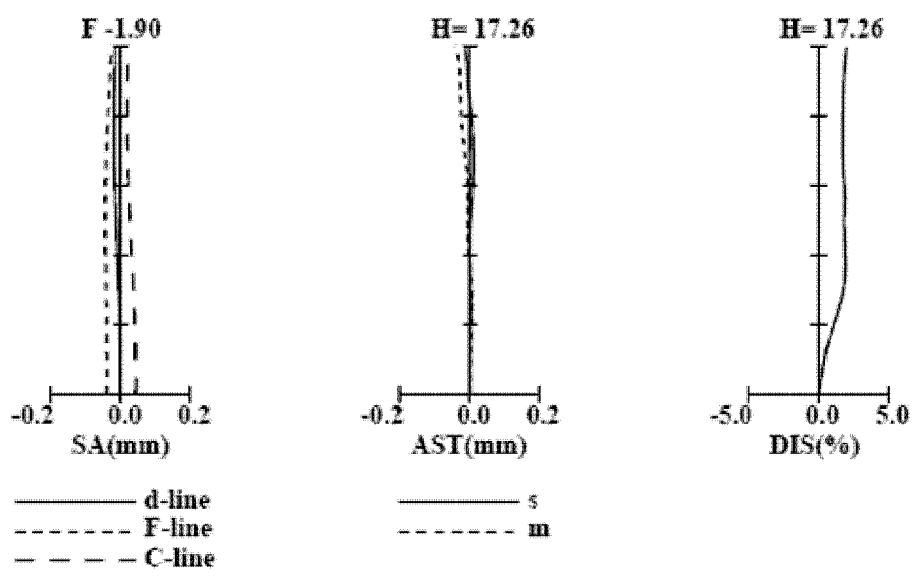
Figure 13:
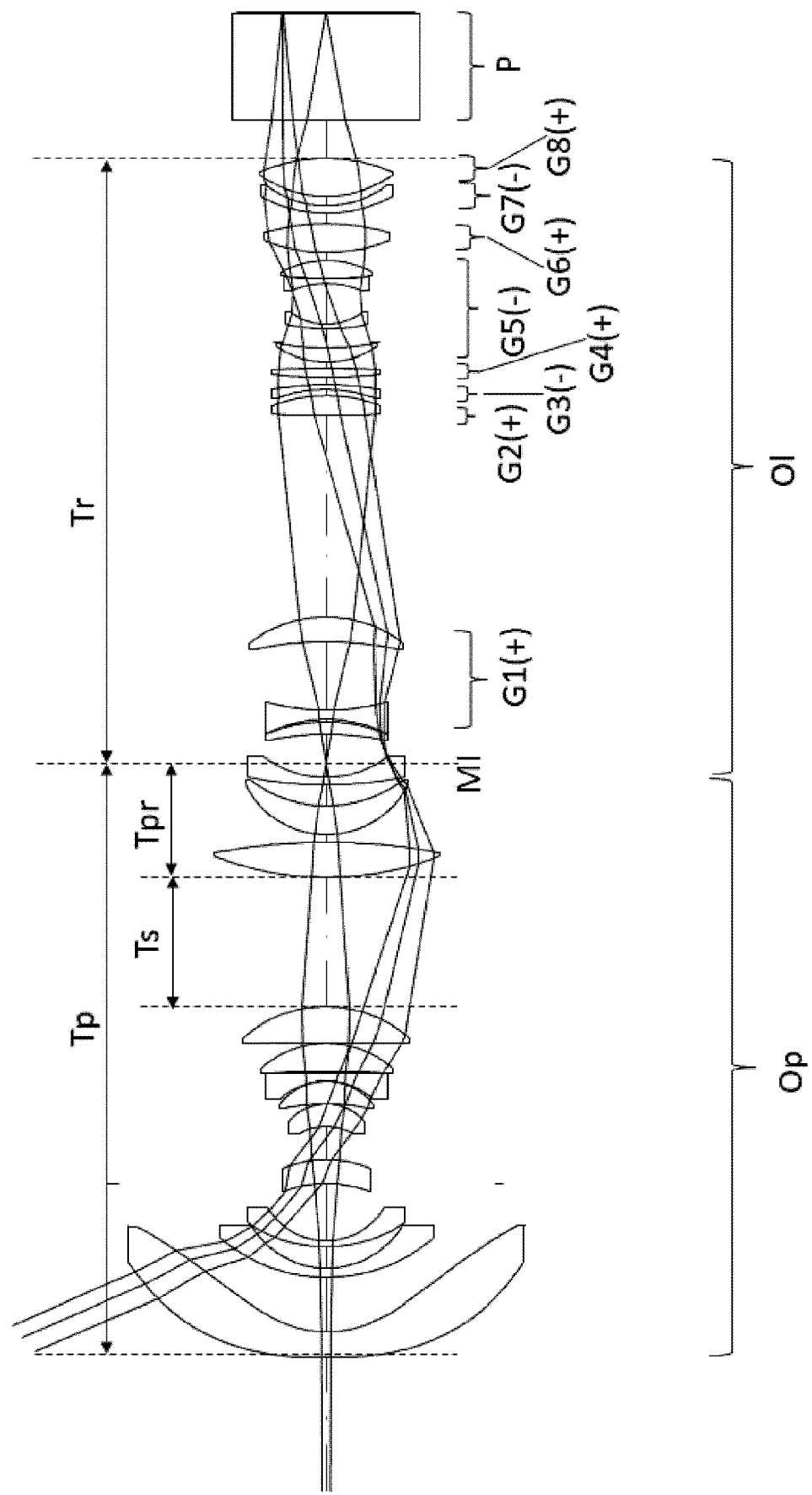
FIG. 13 is a layout diagram showing an optical path at a wide-angle end in a zoom lens system of example 5 for an object distance of 1065.7157 mm.
Figure 15A:
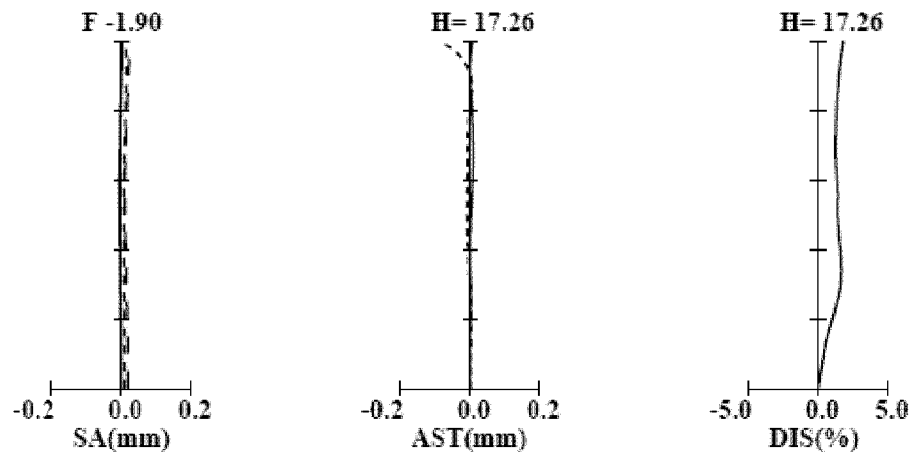
FIGS. 15A-15C are longitudinal aberrations diagram of the zoom lens system of example 5 for an object distance of 1065.7157 mm.
Figure 15B:
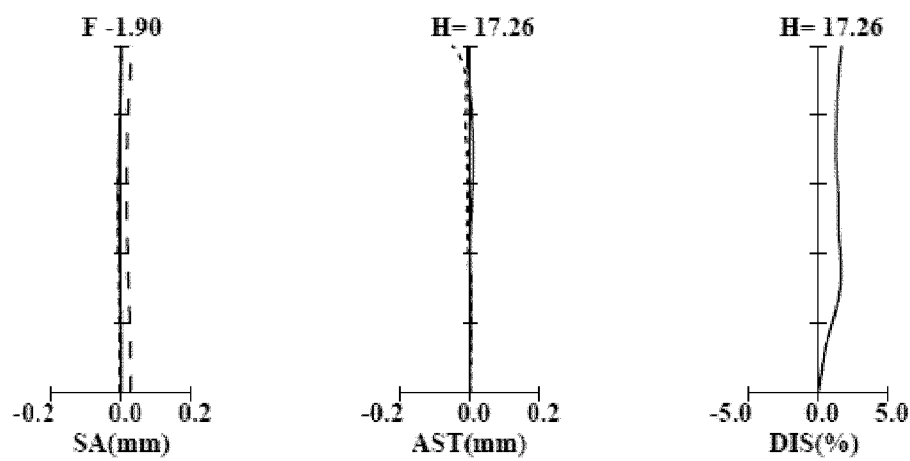
Figure 15C:
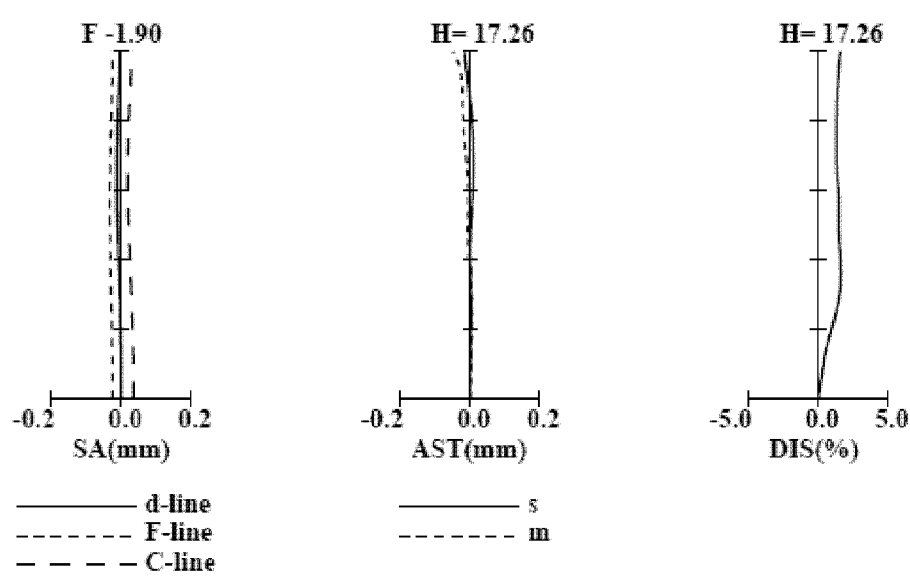
Figure 16:
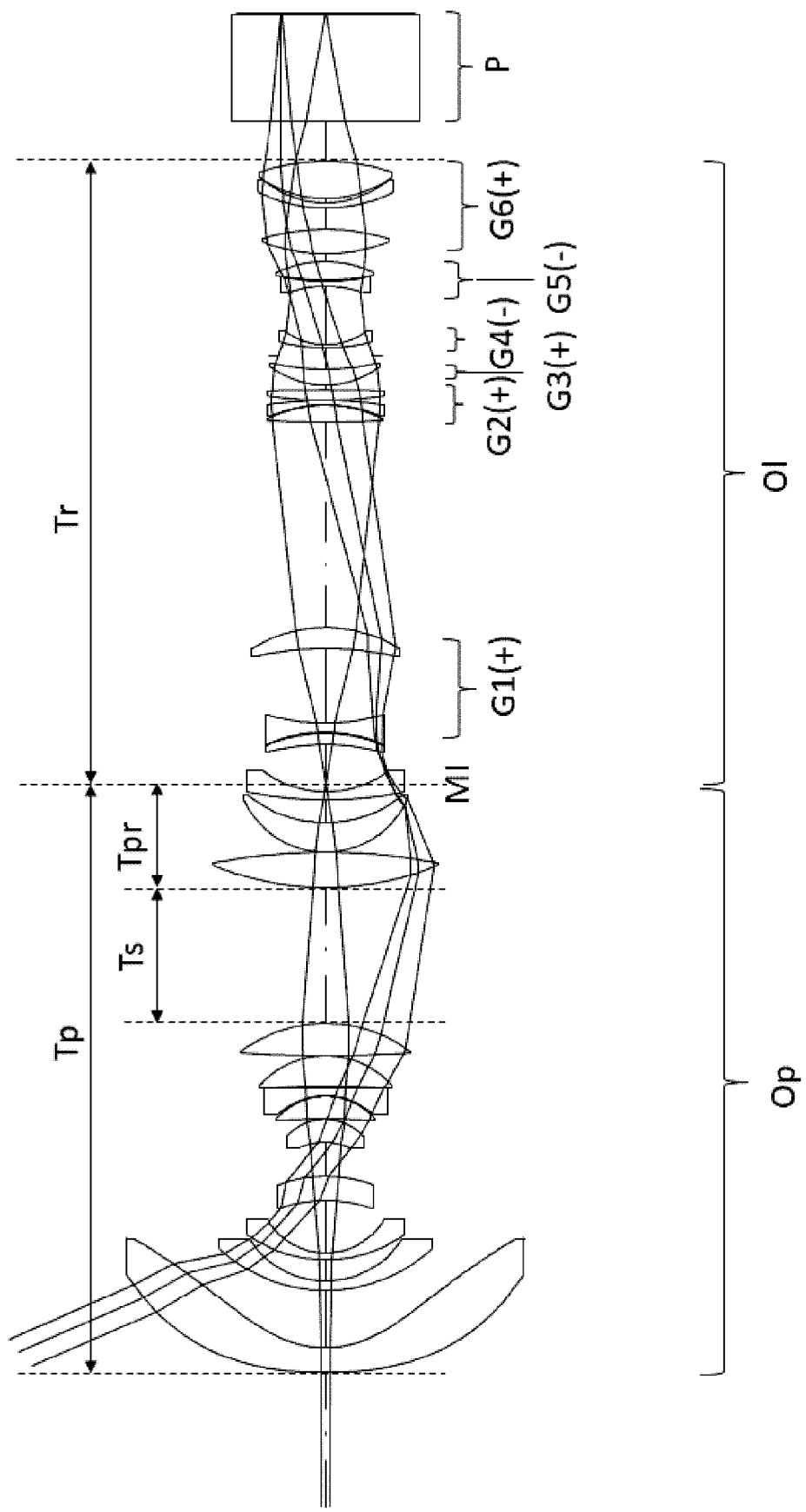
FIG. 16 is a layout diagram showing an optical path at a wide-angle end in a zoom lens system of example 6 for an object distance of 1065.7157 mm.
Figure 17A:
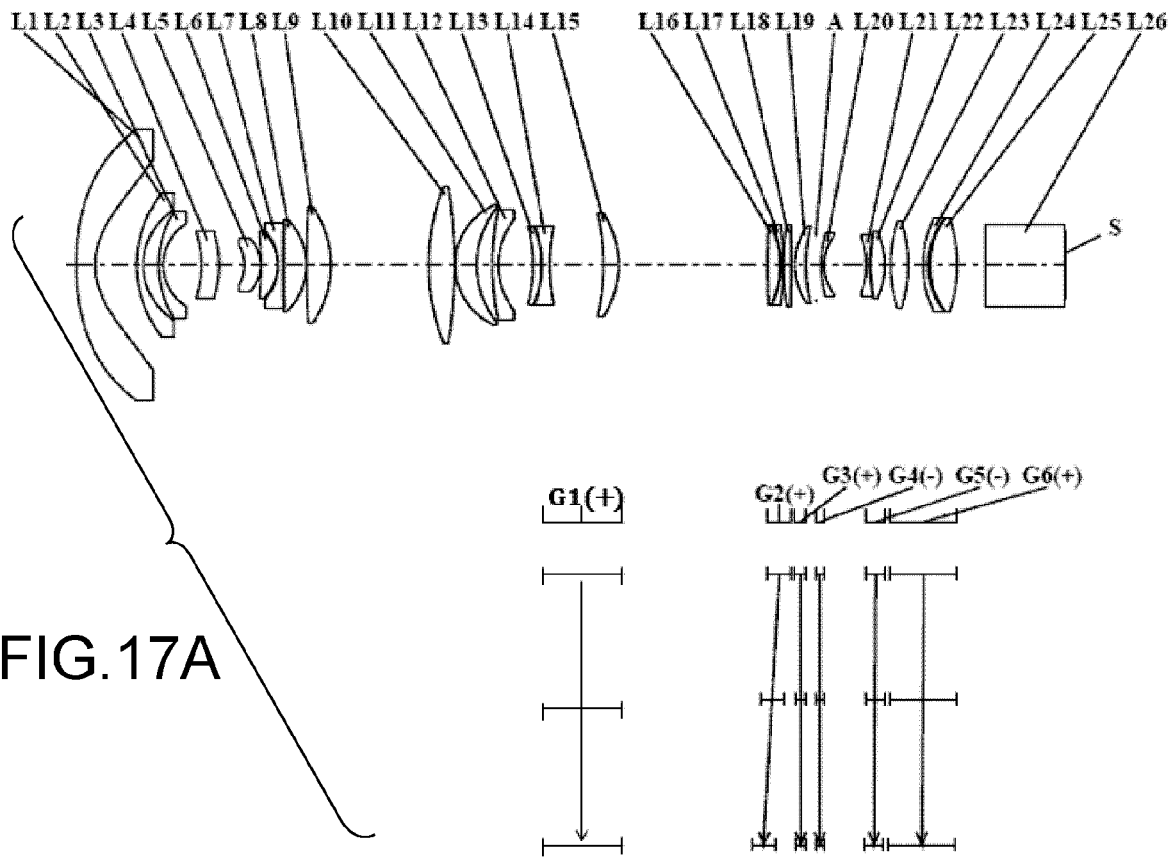
FIGS. 17A-17C are layout diagrams of the zoom lens system of example 6 for an object distance of 1065.7157 mm.
Figure 17B:
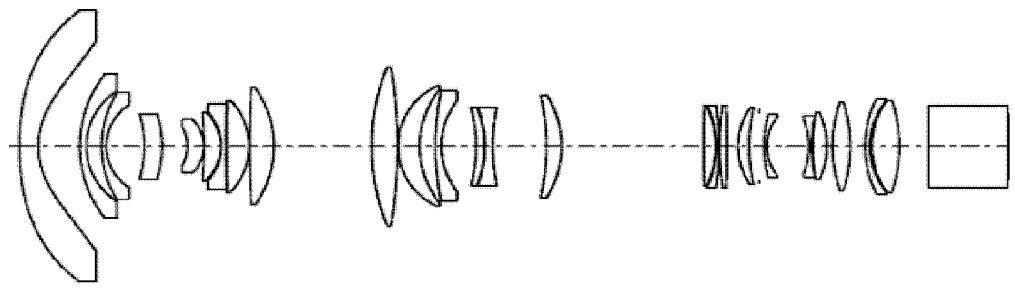
Figure 17C:
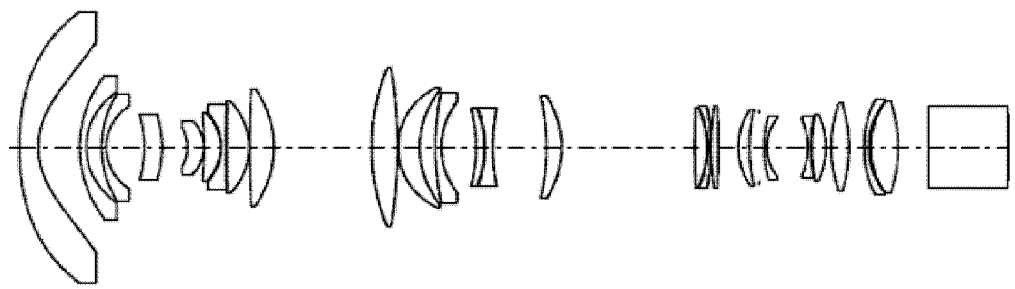
Figure 18A:
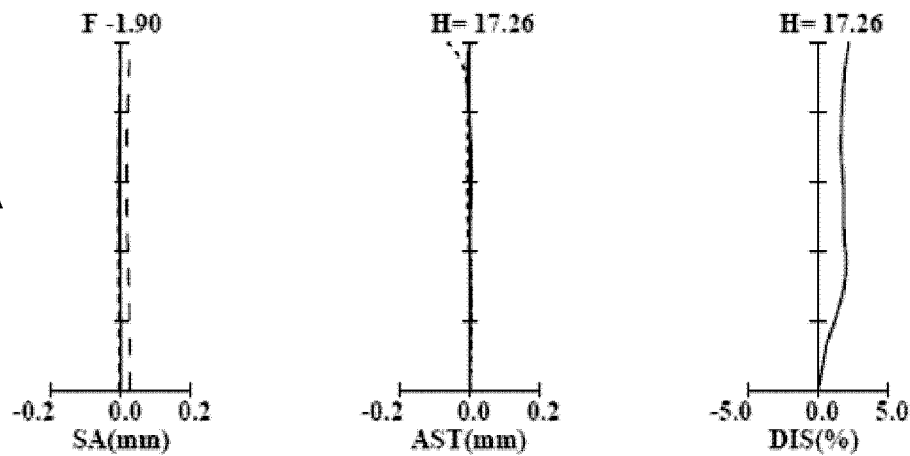
FIGS. 18A-18C are longitudinal aberrations diagram of the zoom lens system of example 6 for an object distance of 1065.7157 mm.
Figure 18B:
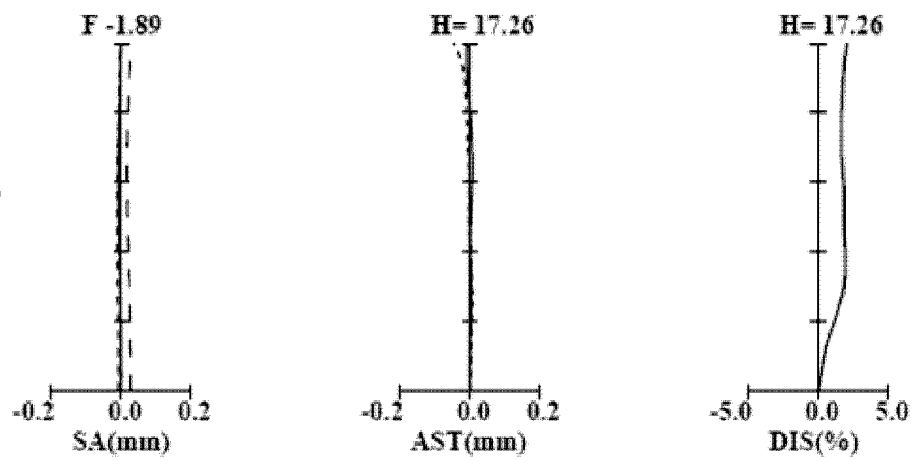
Figure 18C:
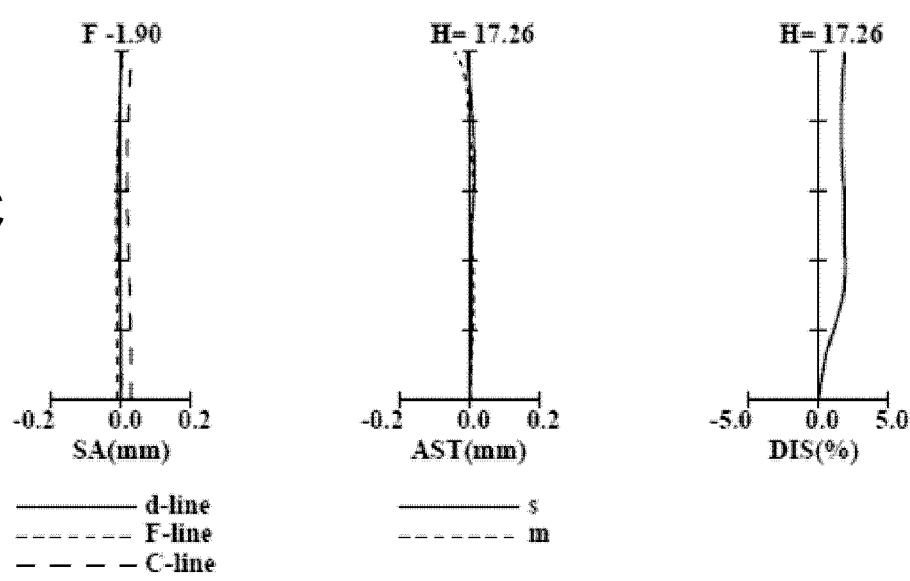

Hereinafter, embodiments are described in detail with reference to the drawings as appropriate. However, unnecessarily detailed descriptions may be omitted. For example, detailed descriptions of well-known items or redundant descriptions of substantially the same configurations may be omitted. This is to prevent the following description from being unnecessarily redundant and to facilitate understanding by those skilled in the art.

It should be noted that the applicant provides the accompanying drawings and the following description for those skilled in the art to fully understand the present disclosure, and it is not intended to limit the subject matter described in the claims thereby.

Each example of an optical system according to the present disclosure is described below. In each example, described is an example in which the optical system is used in a projector (an example of an image projection apparatus) that projects onto a screen image light of an original image S obtained by spatially modulating incident light using an image forming element, such as liquid crystal or digital micromirror device (DMD), based on an image signal. In other words, the optical system according to the present disclosure can be used for magnifying the original image S on the image forming element arranged on the reduction side to project the image onto the screen (not shown), which is arranged on an extension line on the magnification side.

Further, the optical system according to the present disclosure can also be used for collecting light emitted from an object located on the extension line on the magnification side to form an optical image of the object on an imaging surface of an imaging element arranged on the reduction side.

First Embodiment

Hereinafter, a first embodiment of the present disclosure is described with reference to FIGS. 1 to 15. Here, a zoom lens system is described as an example of the optical system.

FIGS. 1, 4, 7, 10, 13 and 16 are layout diagrams each showing an optical path at a wide-angle end in a zoom lens system according to any of examples 1 to 6 for an object distance of 1065.7157 mm. FIGS. 2A-2C, 5A-5C, 8A-8C, 11A-11C, 14A-14C and 17A-17C are layout drawings of the zoom lens system according to examples 1 to 6 for an object distance of 1065.7157 mm. FIGS. 2A, 5A, 8A, 11A, 14A and 17A are lens arrangement diagrams at the wide-angle end in the zoom lens system. FIGS. 2B, 5B, 8B, 11B, 14B and 17B are lens arrangement diagrams at an intermediate position in the zoom lens system. FIGS. 2C, 5C, 8C, 11C, 14C and 17C are lens arrangement diagrams at a telephoto end in the zoom lens system.

The wide-angle end is defined as the shortest focal length state in which the entire optical system has the shortest focal length fw. The intermediate position is defined as an intermediate focal length state between the wide-angle end and the telephoto end. The telephoto end is defined as the longest focal length state in which the entire optical system has the longest focal length ft. By using the focal length fw at the wide-angle end and the focal length ft at the telephoto end, the focal length fm at the intermediate position can be defined as fm=√(fw×ft) (√: square root).

The zoom lens system according to example 1 includes a magnification optical system Op, a relay optical system Ol and an optical element P. The relay optical system Ol includes a first lens group G1 to a fourth lens group G4. The magnification optical system Op is constituted of a first lens element L1 to a 12th lens element L12, including a surface 1 to a surface 24 (see the numerical examples described later). The relay optical system Ol is constituted of a 13th lens element L13 to a 25th lens element L25, including a surface 25 to a surface 51. The first lens group G1 having a positive power is constituted of a 13th lens element L13 to a 15th lens element L15, including a surface 25 to a surface 30. The second lens group G2 having a positive power is constituted of a 16th lens element L16 to an 18th lens element L18, including a surface 31 to a surface 36. The third lens group G3 having a negative power is constituted of a 19th lens element L19 to a 22nd lens element L22, including a surface 37 to a surface 45. The fourth lens group G4 having a positive power is constituted of a 23rd lens element L23 to a 25th lens element L25, including a surface 46 to a surface 51. The optical element P includes a surface 52 to a surface 53.

The zoom lens system according to example 2 includes a magnification optical system Op, a relay optical system Ol and an optical element P. The relay optical system Ol includes a first lens group G1 to a fifth lens group G5. The magnification optical system Op is constituted of a first lens element L1 to a 12th lens element L12, including a surface 1 to a surface 24 (see the numerical examples described later). The relay optical system Ol is constituted of a 13th lens element L13 to a 25th lens element L25, including a surface 25 to a surface 51. The first lens group G1 having a positive power is constituted of a 13th lens element L13 to a 15th lens element L15, including a surface 25 to a surface 30. The second lens group G2 having a positive power is constituted of a 16th lens element L16 to an 18th lens element L18, including a surface 31 to a surface 36. The third lens group G3 having a negative power is constituted of a 19th lens element L19 to a 22nd lens element L22, including a surface 37 to a surface 45. The fourth lens group G4 having a positive power is constituted of a 23rd lens element L23, including a surface 46 to a surface 47. The fifth lens group G5 having a positive power is constituted of a 24th lens element L24 to a 25th lens element L25, including a surface 48 to a surface 51. The optical element P includes a surface 52 to a surface 53.

The zoom lens system according to example 3 includes a magnification optical system Op, a relay optical system Ol and an optical element P. The relay optical system Ol includes a first lens group G1 to a sixth lens group G6. The magnification optical system Op is constituted of a first lens element L1 to a 12th lens element L12, including a surface 1 to a surface 24 (see the numerical examples described later). The relay optical system Ol is constituted of a 13th lens element L13 to a 25th lens element L25, including a surface 25 to a surface 51. The first lens group G1 having a positive power is constituted of a 13th lens element L13 to a 15th lens element L15, including a surface 25 to a surface 30. The second lens group G2 having a positive power is constituted of a 16th lens element L16 to an 18th lens element L18, including a surface 31 to a surface 36. The third lens group G3 having a negative power is constituted of a 19th lens element L19 to a 22nd lens element L22, including a surface 37 to a surface 45. The fourth lens group G4 having a positive power is constituted of a 23rd lens element L23, including a surface 46 to a surface 47. The fifth lens group G5 having a negative power is constituted of a 24th lens element L24, including a surface 48 to a surface 49. The sixth lens group G6 having a positive power is constituted of a 25th lens element L25, including a surface 50 to a surface 51. The optical element P includes a surface 52 to a surface 53.

The zoom lens system according to example 4 includes a magnification optical system Op, a relay optical system Ol and an optical element P. The relay optical system Ol includes a first lens group G1 to a sixth lens group G6. The magnification optical system Op is constituted of a first lens element L1 to a 12th lens element L12, including a surface 1 to a surface 24 (see the numerical examples described later). The relay optical system Ol is constituted of a 13th lens element L13 to a 25th lens element L25, including a surface 25 to a surface 51. The first lens group G1 having a positive power is constituted of a 13th lens element L13 to a 15th lens element L15, including a surface 25 to a surface 30. The second lens group G2 having a positive power is constituted of a 16th lens element L16 to a 17th lens element L17, including a surface 31 to a surface 34. The third lens group G3 having a positive power is constituted of an 18th lens element L18, including a surface 35 to a surface 36. The fourth lens group G4 having a negative power is constituted of a 19th lens element L19 to a 22nd lens element L22, including a surface 37 to a surface 45. The fifth lens group G5 having a positive power is constituted of a 23rd lens element L23, including a surface 46 to a surface 47. The sixth lens group G6 having a positive power is constituted of a 25th lens element L25, including a surface 50 to a surface 51. The optical element P includes a surface 52 to a surface 53.

The zoom lens system according to example 5 includes a magnification optical system Op, a relay optical system Ol and an optical element P. The relay optical system Ol includes a first lens group G1 to an eighth lens group G8. The magnification optical system Op is constituted of a first lens element L1 to a 12th lens element L12, including a surface 1 to a surface 24 (see the numerical examples described later). The relay optical system Ol is constituted of a 13th lens element L13 to a 25th lens element L25, including a surface 25 to a surface 51. The first lens group G1 having a positive power is constituted of a 13th lens element L13 to a 15th lens element L15, including a surface 25 to a surface 30. The second lens group G2 having a positive power is constituted of a 16th lens element L16, including a surface 31 to a surface 32. The third lens group G3 having a negative power is constituted of to a 17th lens element L17, including a surface 33 to a surface 34. The fourth lens group G4 having a positive power is constituted of an 18th lens element L18, including a surface 35 to a surface 36. The fifth lens group G5 having a negative power is constituted of a 19th lens element L19 to a 22nd lens element L22, including a surface 37 to a surface 45. The sixth lens group G6 having a positive power is constituted of a 23rd lens element L23, including a surface 46 to a surface 47. The seventh lens group G7 having a negative power is constituted of a 24th lens element L24, including a surface 48 to a surface 49. The eighth lens group G8 having a positive power is constituted of a 25th lens element L25, including a surface 50 to a surface 51. The optical element P includes a surface 52 to a surface 53.

The zoom lens system according to example 6 includes a magnification optical system Op, a relay optical system Ol and an optical element P. The relay optical system Ol includes a first lens group G1 to a sixth lens group G6. The magnification optical system Op is constituted of a first lens element L1 to a 12th lens element L12, including a surface 1 to a surface 24 (see the numerical examples described later). The relay optical system Ol is constituted of a 13th lens element L13 to a 25th lens element L25, including a surface 25 to a surface 51. The first lens group G1 having a negative power is constituted of a 13th lens element L13 to a 15th lens element L15, including a surface 25 to a surface 30. The second lens group G2 having a positive power is constituted of a 16th lens element L16 to an 18th lens element L18, including a surface 31 to a surface 36. The third lens group G3 having a positive power is constituted of a 19th lens element L19, including a surface 37 to a surface 38. The fourth lens group G4 having a negative power is constituted of an aperture and a 20th lens element L20, including a surface 39 to a surface 41. The fifth lens group G5 having a negative power is constituted of a 21st lens element L21 to a 22nd lens element L22, including a surface 42 to a surface 45. The sixth lens group G6 having a positive power is constituted of a 23rd lens element L23 to a 25th lens element L25, including a surface 46 to a surface 51. The optical element P includes a surface 52 to a surface 53.

Polygonal line arrows shown in lower part of each of FIGS. 2A, 5A, 8A, 11A, 14A and 17A include straight lines obtained by connecting the positions of the first lens group G1 to any one of the final lens group G4, G5, G6, G8, corresponding to each of the states of the wide-angle end, the intermediate position, and the telephoto end ranked in order from the top in the drawing. The wide-angle end and the intermediate position, and the intermediate position and the telephoto end are simply connected by a straight line, which is different from the actual movement of each of the lens groups G1 to G8. The symbols (+) and (−) attached to the reference numerals of the respective lens groups G1 to G8 indicate the positive or negative power of each of the lens groups G1 to G8.

The zoom lens systems according to examples 1 to 6 may include a focusing adjustment lens group that adjusts the focus when an object distance is changed, and a field curvature correction lens group that corrects the field curvature aberration after focus adjustment by the focusing adjustment lens group.

In each of the drawings, an imaging position on the magnification side (i.e., the magnification conjugate point) is located on the left side, and an imaging position on the reduction side (i.e., the reduction conjugate point) is located on the right side. Further, in each of the drawings, the straight line drawn closest to the reduction side represents a position of the original image S, and an optical element P is located on the magnification side of the original image S. The optical element P represents different optical elements, such as a prism for color separation and color synthesis, an optical filter, a flat-parallel glass plate, a crystal low-pass filter, and an infrared cut filter.

The zoom lens system according to each of examples 1 to 6 internally has an intermediate imaging position MI that is conjugated to the magnification conjugate point on the magnification side and the reduction conjugate point on the reduction side, respectively. Further, in each of the drawings, a magnification optical system Op is positioned on the magnification side with respect to the intermediate imaging position MI, and a relay optical system Ol is positioned on the reduction side with respect to the intermediate imaging position MI.

In the zoom lens system according to each of examples 1 to 6, there are a plurality of air distances among the first lens element L1 to the 25th lens element L25 and the optical element P. The magnification optical system Op has the longest air distance along an optical axis in the magnification optical system. For example, as shown in FIGS. 2A, 5A, 8A, 11A, 14A and 17A, there is the longest air distance between the ninth lens element L9 and the 10th lens element L10. The magnification optical system Op includes a magnification optical system front group Opf positioned on the magnification side with respect to the longest air distance and a magnification optical system rear group Opr positioned on the reduction side with respect to the longest air distance. The front group Opf and the rear group Opr may have a single lens element or plural lens elements.

FIGS. 3A-3C, 6A-6C, 9A-9C, 12A-12C, 15A-15C and 18A-18C are longitudinal aberration diagrams of the zoom lens system according to examples 1 to 6 for an object distance of 1065.7157 mm. FIGS. 3A, 6A, 9A, 12A, 15A and 18A show longitudinal aberration diagrams at the wide-angle end of the zoom lens system, and FIGS. 3B, 6B, 9B, 12B, 15B and 18B show longitudinal aberration diagrams at the intermediate position, and FIGS. 3C, 6C, 9C, 12C, 15C and 18C show longitudinal aberration diagrams at the telephoto end.

Each of the longitudinal aberration diagrams shows spherical aberration (SA (mm)), astigmatism (AST (mm)), and distortion (DIS (%)) in order from the left side. In the spherical aberration diagram, the vertical axis represents a pupil height, and a solid line shows the characteristic of the d-line, a short dashed line shows the characteristic of the F-line, and a long dashed line shows the characteristic of the C-line. In the astigmatism diagram, the vertical axis represents an image height, and a solid line shows the characteristic of the sagittal plane (indicated by s in the drawing), and a dashed line shows the characteristic of the meridional plane (indicated by m in the drawing). In the distortion diagram, the vertical axis represents the image height. The distortion represents distortion with respect to equidistant projection.

Example 1

As shown in FIGS. 1 and 2A-2C, the zoom lens system according to example 1 includes the magnification optical system Op and the relay optical system Ol. The magnification optical system Op is constituted of the first lens element L1 to the 12th lens element L12. The magnification optical system Op includes the front group Opf and the rear group Opr.

The front group Opf of the magnification optical system Op is constituted of the first lens element L1 to the ninth lens element L9 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a positive meniscus shape with the convex surfaces facing the reduction side. The fifth lens element L5 has a positive meniscus shape with the convex surfaces facing the reduction side. The sixth lens element L6 has a positive meniscus shape with the convex surfaces facing the reduction side. The seventh lens element L7 has a negative meniscus shape with the convex surfaces facing the reduction side. The eighth lens element L8 has a positive meniscus shape with the convex surfaces facing the reduction side. The ninth lens element L9 has a positive meniscus shape with the convex surfaces facing the reduction side.

The rear group Opr of the magnification optical system Op is constituted of the 10th lens element L10 to the 12th lens element L12 in this order from the magnification side to the reduction side. The 10th lens element L10 has a biconvex shape.

The 11th lens element L11 has a positive meniscus shape with the convex surfaces facing the magnification side. The 12th lens element L12 has a negative meniscus shape with the convex surfaces facing the magnification side.

The relay optical system Ol is constituted of the 13th lens element L13 to the 25th lens element L25 in order from the magnification side to the reduction side. The 13th lens element L13 has a positive meniscus shape with the convex surfaces facing the reduction side. The 14th lens element L14 has a biconcave shape. The 15th lens element L15 has a positive meniscus shape with the convex surfaces facing the reduction side. The 16th lens element L16 has a biconvex shape. The 17th lens element L17 has a negative meniscus shape with the convex surfaces facing the reduction side. The 18th lens element L18 has a biconvex shape. The 19th lens element L19 has a positive meniscus shape with the convex surfaces facing the magnification side. The 20th lens element L20 has a negative meniscus shape with the convex surfaces facing the magnification side. The 21st lens element L21 has a biconcave shape. The 22nd lens element L22 has a biconvex shape. The 23rd lens element L23 has a biconvex shape. The 24th lens element L24 has a negative meniscus shape with the convex surfaces facing the magnification side. The 25th lens element L25 has a biconvex shape.

The relay optical system Ol is constituted of the first lens group (L13 to L15) having a positive power, the second lens group (L16 to L18) having a positive power, the third lens group (L19 to L22) having a negative power, and the fourth lens group (L23 to L25) having a positive power in order from the magnification side to the reduction side. During zooming the first lens group and the third lens group are fixed, while the second lens group and the fourth lens group are displaced along the optical axis, wherein during from the wide-angle end to the telephoto end, the second lens group and the fourth lens group are displaced toward the magnification side.

In other words, the relay optical system Ol has the first lens group (an example of the "first lens group" in claims) having a positive power positioned closest to the magnification side, the second lens group and the fourth lens group (an example of the "two lens groups" in claims) positioned on the reduction side with respect to the first lens group, and the third lens group (an example of the "negative lens groups" in claims) positioned between the second lens group and the fourth lens group. During zooming the third lens group is fixed, while the second lens group and the fourth lens group are displaced toward the magnification side.

The intermediate imaging position MI is located between the 12th lens element L12 and the 13th lens element L13. Further, an aperture A is arranged between the 19th lens element L19 and the 20th lens element L20. The optical element P having zero optical power is arranged on the reduction side of the relay optical system Ol.

Example 2

As shown in FIGS. 4 and 5A-5C, the zoom lens system according to example 2 includes the magnification optical system Op and the relay optical system Ol. The magnification optical system Op is constituted of the first lens element L1 to the 12th lens element L12. The magnification optical system Op includes the front group Opf and the rear group Opr.

The front group Opf of the magnification optical system Op is constituted of the first lens element L1 to the ninth lens element L9 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a positive meniscus shape with the convex surfaces facing the reduction side. The fifth lens element L5 has a positive meniscus shape with the convex surfaces facing the reduction side. The sixth lens element L6 has a positive meniscus shape with the convex surfaces facing the reduction side. The seventh lens element L7 has a negative meniscus shape with the convex surfaces facing the reduction side. The eighth lens element L8 has a positive meniscus shape with the convex surfaces facing the reduction side. The ninth lens element L9 has a positive meniscus shape with the convex surfaces facing the reduction side.

The rear group Opr of the magnification optical system Op is constituted of the 10th lens element L10 to the 12th lens element L12 in this order from the magnification side to the reduction side. The 10th lens element L10 has a biconvex shape. The 11th lens element L11 has a positive meniscus shape with the convex surfaces facing the magnification side. The 12th lens element L12 has a negative meniscus shape with the convex surfaces facing the magnification side.

The relay optical system Ol is constituted of the 13th lens element L13 to the 25th lens element L25 in order from the magnification side to the reduction side. The 13th lens element L13 has a positive meniscus shape with the convex surfaces facing the reduction side. The 14th lens element L14 has a biconcave shape. The 15th lens element L15 has a positive meniscus shape with the convex surfaces facing the reduction side. The 16th lens element L16 has a biconvex shape. The 17th lens element L17 has a negative meniscus shape with the convex surfaces facing the reduction side. The 18th lens element L18 has a biconvex shape. The 19th lens element L19 has a positive meniscus shape with the convex surfaces facing the magnification side. The 20th lens element L20 has a negative meniscus shape with the convex surfaces facing the magnification side. The 21st lens element L21 has a biconcave shape. The 22nd lens element L22 has a biconvex shape. The 23rd lens element L23 has a biconvex shape. The 24th lens element L24 has a negative meniscus shape with the convex surfaces facing the magnification side. The 25th lens element L25 has a biconvex shape.

The relay optical system Ol is constituted of the first lens group (L13 to L15) having a positive power, the second lens group (L16 to L18) having a positive power, the third lens group (L19 to L22) having a negative power, and the fourth lens group (L23) having a positive power in order from the magnification side to the reduction side. During zooming the first lens group and the third lens group are fixed, while the second lens group and the fourth lens group are displaced along the optical axis, wherein during from the wide-angle end to the telephoto end, the second lens group and the fourth lens group are displaced toward the magnification side.

In other words, the relay optical system Ol has the first lens group (an example of the "first lens group" in claims) having a positive power positioned closest to the magnification side, the second lens group and the fourth lens group (an example of the "two lens groups" in claims) positioned on the reduction side with respect to the first lens group, and the third lens group (an example of the "negative lens groups" in claims) positioned between the second lens group and the fourth lens group. During zooming the third lens group is fixed, while the second lens group and the fourth lens group are displaced toward the magnification side.

The intermediate imaging position MI is located between the 12th lens element L12 and the 13th lens element L13. Further, an aperture A is arranged between the 19th lens element L19 and the 20th lens element L20. The optical element P having zero optical power is arranged on the reduction side of the relay optical system Ol.

Example 3

As shown in FIGS. 7 and 8A-8C, the zoom lens system according to example 3 includes the magnification optical system Op and the relay optical system Ol. The magnification optical system Op is constituted of the first lens element L1 to the 12th lens element L12. The magnification optical system Op includes the front group Opf and the rear group Opr.

The front group Opf of the magnification optical system Op is constituted of the first lens element L1 to the ninth lens element L9 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a positive meniscus shape with the convex surfaces facing the magnification side. The fifth lens element L5 has a negative meniscus shape with the convex surfaces facing the reduction side. The sixth lens element L6 has a positive meniscus shape with the convex surfaces facing the reduction side. The seventh lens element L7 has a negative meniscus shape with the convex surfaces facing the reduction side. The eighth lens element L8 has a positive meniscus shape with the convex surfaces facing the reduction side. The ninth lens element L9 has a positive meniscus shape with the convex surfaces facing the reduction side.

The rear group Opr of the magnification optical system Op is constituted of the 10th lens element L10 to the 12th lens element L12 in this order from the magnification side to the reduction side. The 10th lens element L10 has a biconvex shape. The 11th lens element L11 has a positive meniscus shape with the convex surfaces facing the magnification side. The 12th lens element L12 has a negative meniscus shape with the convex surfaces facing the magnification side.

The relay optical system Ol is constituted of the 13th lens element L13 to the 25th lens element L25 in order from the magnification side to the reduction side. The 13th lens element L13 has a positive meniscus shape with the convex surfaces facing the reduction side. The 14th lens element L14 has a biconcave shape. The 15th lens element L15 has a positive meniscus shape with the convex surfaces facing the reduction side. The 16th lens element L16 has a biconvex shape. The 17th lens element L17 has a negative meniscus shape with the convex surfaces facing the reduction side. The 18th lens element L18 has a biconvex shape. The 19th lens element L19 has a positive meniscus shape with the convex surfaces facing the magnification side. The 20th lens element L20 has a negative meniscus shape with the convex surfaces facing the magnification side. The 21st lens element L21 has a biconcave shape. The 22nd lens element L22 has a biconvex shape. The 23rd lens element L23 has a biconvex shape. The 24th lens element L24 has a negative meniscus shape with the convex surfaces facing the magnification side. The 25th lens element L25 has a biconvex shape.

The relay optical system Ol is constituted of the first lens group (L13 to L15) having a positive power, the second lens group (L16 to L18) having a positive power, the third lens group (L19 to L22) having a negative power, the fourth lens group (L23) having a positive power, the fifth lens group (L24) having a negative power, and the sixth lens group (L26) having a positive power in order from the magnification side to the reduction side. During zooming the first lens group, the third lens group and the sixth lens group are fixed, while the second lens group, the fourth lens group and the fifth lens group are displaced along the optical axis, wherein during from the wide-angle end to the telephoto end, the second lens group, the fourth lens group and the fifth lens group are displaced toward the magnification side.

In other words, the relay optical system Ol has the first lens group (an example of the "first lens group" in claims) having a positive power positioned closest to the magnification side, the second lens group and the fourth lens group (an example of the "two lens groups" in claims) positioned on the reduction side with respect to the first lens group, and the third lens group (an example of the "negative lens groups" in claims) positioned between the second lens group and the fourth lens group. During zooming the third lens group is fixed, while the second lens group and the fourth lens group are displaced toward the magnification side. The relay optical system Ol further includes the fifth lens group (an example of the "another negative lens groups" in claims), wherein the third lens group has a negative power smaller than that of the fifth lens group.

The intermediate imaging position MI is located between the 12th lens element L12 and the 13th lens element L13. Further, an aperture A is arranged between the 19th lens element L19 and the 20th lens element L20. The optical element P having zero optical power is arranged on the reduction side of the relay optical system Ol.

Example 4

As shown in FIGS. 10 and 11A-11C, the zoom lens system according to example 4 includes the magnification optical system Op and the relay optical system Ol. The magnification optical system Op is constituted of the first lens element L1 to the 12th lens element L12. The magnification optical system Op includes the front group Opf and the rear group Opr.

The front group Opf of the magnification optical system Op is constituted of the first lens element L1 to the ninth lens element L9 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a positive meniscus shape with the convex surfaces facing the reduction side. The fifth lens element L5 has a positive meniscus shape with the convex surfaces facing the reduction side. The sixth lens element L6 has a positive meniscus shape with the convex surfaces facing the reduction side. The seventh lens element L7 has a biconcave shape. The eighth lens element L8 has a biconvex shape. The ninth lens element L9 has a positive meniscus shape with the convex surfaces facing the reduction side.

The rear group Opr of the magnification optical system Op is constituted of the 10th lens element L10 to the 12th lens element L12 in this order from the magnification side to the reduction side. The 10th lens element L10 has a biconvex shape. The 11th lens element L11 has a positive meniscus shape with the convex surfaces facing the magnification side. The 12th lens element L12 has a negative meniscus shape with the convex surfaces facing the magnification side.

The relay optical system Ol is constituted of the 13th lens element L13 to the 25th lens element L25 in order from the magnification side to the reduction side. The 13th lens element L13 has a positive meniscus shape with the convex surfaces facing the reduction side. The 14th lens element L14 has a biconcave shape. The 15th lens element L15 has a positive meniscus shape with the convex surfaces facing the reduction side. The 16th lens element L16 has a biconvex shape. The 17th lens element L17 has a negative meniscus shape with the convex surfaces facing the reduction side. The 18th lens element L18 has a biconvex shape. The 19th lens element L19 has a positive meniscus shape with the convex surfaces facing the magnification side. The 20th lens element L20 has a negative meniscus shape with the convex surfaces facing the magnification side. The 21st lens element L21 has a biconcave shape. The 22nd lens element L22 has a biconvex shape. The 23rd lens element L23 has a biconvex shape. The 24th lens element L24 has a negative meniscus shape with the convex surfaces facing the magnification side. The 25th lens element L25 has a biconvex shape.

The relay optical system Ol is constituted of the first lens group (L13 to L15) having a positive power, the second lens group (L16 to L17) having a positive power, the third lens group (L18) having a positive power, the fourth lens group (L19 to L22) having a negative power, the fifth lens group (L23) having a positive power, and the sixth lens group (L24 to L25) having a positive power in order from the magnification side to the reduction side. During zooming the first lens group, the fourth lens group and the sixth lens group are fixed, while the second lens group, the third lens group and the fifth lens group are displaced along the optical axis, wherein during from the wide-angle end to the telephoto end, the second lens group, the third lens group and the fifth lens group are displaced toward the magnification side.

In other words, the relay optical system Ol has the first lens group (an example of the "first lens group" in claims)

having a positive power positioned closest to the magnification side, the third lens group and the fifth lens group (an example of the "two lens groups" in claims) positioned on the reduction side with respect to the first lens group, and the fourth lens group (an example of the "negative lens groups" in claims) positioned between the third lens group and the fifth lens group. During zooming the fourth lens group is fixed, while the third lens group and the fifth lens group are displaced toward the magnification side.

The intermediate imaging position MI is located between the 12th lens element L12 and the 13th lens element L13. Further, an aperture A is arranged between the 19th lens element L19 and the 20th lens element L20. The optical element P having zero optical power is arranged on the reduction side of the relay optical system Ol.

Example 5

As shown in FIGS. 13 and 14A-14C, the zoom lens system according to example 5 includes the magnification optical system Op and the relay optical system Ol. The magnification optical system Op is constituted of the first lens element L1 to the 12th lens element L12. The magnification optical system Op includes the front group Opf and the rear group Opr.

The front group Opf of the magnification optical system Op is constituted of the first lens element L1 to the ninth lens element L9 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a positive meniscus shape with the convex surfaces facing the reduction side. The fifth lens element L5 has a positive meniscus shape with the convex surfaces facing the reduction side. The sixth lens element L6 has a positive meniscus shape with the convex surfaces facing the reduction side. The seventh lens element L7 has a biconcave shape. The eighth lens element L8 has a positive meniscus shape with the convex surfaces facing the reduction side. The ninth lens element L9 has a biconvex shape.

The rear group Opr of the magnification optical system Op is constituted of the 10th lens element L10 to the 12th lens element L12 in this order from the magnification side to the reduction side. The 10th lens element L10 has a biconvex shape. The 11th lens element L11 has a positive meniscus shape with the convex surfaces facing the magnification side. The 12th lens element L12 has a negative meniscus shape with the convex surfaces facing the magnification side.

The relay optical system Ol is constituted of the 13th lens element L13 to the 25th lens element L25 in order from the magnification side to the reduction side. The 13th lens element L13 has a positive meniscus shape with the convex surfaces facing the reduction side. The 14th lens element L14 has a biconcave shape. The 15th lens element L15 has a positive meniscus shape with the convex surfaces facing the reduction side. The 16th lens element L16 has a biconvex shape. The 17th lens element L17 has a negative meniscus shape with the convex surfaces facing the reduction side. The 18th lens element L18 has a biconvex shape. The 19th lens element L19 has a positive meniscus shape with the convex surfaces facing the magnification side. The 20th lens element L20 has a negative meniscus shape with the convex surfaces facing the magnification side. The 21st lens element L21 has a biconcave shape. The 22nd lens element L22 has a biconvex shape. The 23rd lens element L23 has a biconvex shape. The 24th lens element L24 has a negative meniscus shape with the convex surfaces facing the magnification side. The 25th lens element L25 has a biconvex shape.

The relay optical system Ol is constituted of the first lens group (L13 to L15) having a positive power, the second lens group (L16) having a positive power, the third lens group (L17) having a negative power, the fourth lens group (L18) having a positive power, the fifth lens group (L19 to L22) having a negative power, the sixth lens group (L23) having a positive power, the seventh lens group (L24) having a negative power, and the eighth lens group (L25) having a positive power in order from the magnification side to the reduction side. During zooming the first lens group, the fifth lens group and the eighth lens group are fixed, while the second lens group, the third lens group, the fourth lens group, the sixth lens group and the seventh lens group are displaced along the optical axis, wherein during from the wide-angle end to the telephoto end, the second lens group, the third lens group, the fourth lens group and the sixth lens group and the seventh lens group are displaced toward the magnification side.

In other words, the relay optical system Ol has the first lens group (an example of the "first lens group" in claims) having a positive power positioned closest to the magnification side, the fourth lens group and the sixth lens group (an example of the "two lens groups" in claims) positioned on the reduction side with respect to the first lens group, and the fifth lens group (an example of the "negative lens groups" in claims) positioned between the fourth lens group and the sixth lens group. During zooming the fifth lens group is fixed, while the fourth lens group and the sixth lens group are displaced toward the magnification side. The relay optical system Ol further includes the third lens group and the seventh lens group (an example of the "another negative lens groups" in claims), wherein the fifth lens group has a negative power smaller than those of the third lens group and the seventh lens group.

The intermediate imaging position MI is located between the 12th lens element L12 and the 13th lens element L13. Further, an aperture A is arranged between the 19th lens element L19 and the 20th lens element L20. The optical element P having zero optical power is arranged on the reduction side of the relay optical system Ol.

Example 6

As shown in FIGS. 16 and 17A-17C, the zoom lens system according to example 6 includes the magnification optical system Op and the relay optical system Ol. The magnification optical system Op is constituted of the first lens element L1 to the 12th lens element L12. The magnification optical system Op includes the front group Opf and the rear group Opr.

The front group Opf of the magnification optical system Op is constituted of the first lens element L1 to the ninth lens element L9 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a positive meniscus shape with the convex surfaces facing the reduction side. The fifth lens element L5 has a positive meniscus shape with the convex surfaces facing the reduction side. The sixth lens element L6 has a positive meniscus shape with the convex surfaces facing the reduction side. The seventh lens element L7 has a biconcave shape. The eighth lens element L8 has a positive meniscus shape with the convex surfaces facing the reduction side. The ninth lens element L9 has a biconvex shape.

The rear group Opr of the magnification optical system Op is constituted of the 10th lens element L10 to the 12th lens element L12 in this order from the magnification side to the reduction side. The 10th lens element L10 has a biconvex shape. The 11th lens element L11 has a positive meniscus shape with the convex surfaces facing the magnification side. The 12th lens element L12 has a negative meniscus shape with the convex surfaces facing the magnification side.

The relay optical system Ol is constituted of the 13th lens element L13 to the 25th lens element L25 in order from the magnification side to the reduction side. The 13th lens element L13 has a positive meniscus shape with the convex surfaces facing the reduction side. The 14th lens element L14 has a biconcave shape. The 15th lens element L15 has a positive meniscus shape with the convex surfaces facing the reduction side. The 16th lens element L16 has a biconvex shape. The 17th lens element L17 has a negative meniscus shape with the convex surfaces facing the reduction side. The 18th lens element L18 has a biconvex shape. The 19th lens element L19 has a positive meniscus shape with the convex surfaces facing the magnification side. The 20th lens element L20 has a negative meniscus shape with the convex surfaces facing the magnification side. The 21st lens element L21 has a biconcave shape. The 22nd lens element L22 has a biconvex shape. The 23rd lens element L23 has a biconvex shape. The 24th lens element L24 has a negative meniscus shape with the convex surfaces facing the magnification side. The 25th lens element L25 has a biconvex shape.

The relay optical system Ol is constituted of the first lens group (L13 to L15) having a negative power, the second lens group (L16 to L18) having a positive power, the third lens group (L19) having a positive power, the fourth lens group (L20) having a negative power, the fifth lens group (L21 to L22) having a negative power, and the sixth lens group (L23 to L25) having a positive power in order from the magnification side to the reduction side. During zooming the first lens group and the fourth lens group are fixed, while the second lens group, the third lens group, the fifth lens group and the sixth lens group are displaced along the optical axis, wherein during from the wide-angle end to the telephoto end, the second lens group, the fifth lens group and the sixth lens group displaced toward the magnification side and the third lens group are displaced toward the reduction side.

In other words, the relay optical system Ol has the first lens group (an example of the "first lens group" in claims) having a negative power positioned closest to the magnification side, the third lens group and the fifth lens group (an example of the "two lens groups" in claims) positioned on the reduction side with respect to the first lens group, and the fourth lens group (an example of the "negative lens groups" in claims) positioned between the third lens group and the fifth lens group. During zooming the fourth lens group is fixed, while the third lens group and the fifth lens group are displaced toward the magnification side. The relay optical system Ol further includes the fourth lens group and the fifth lens group (an example of the "another negative lens groups" in claims), wherein the fourth lens group has a negative power smaller than that of the fifth lens group.

The intermediate imaging position MI is located between the 12th lens element L12 and the 13th lens element L13. Further, an aperture A is arranged between the 19th lens element L19 and the 20th lens element L20. The optical element P having zero optical power is arranged on the reduction side of the relay optical system Ol.

The zoom lens system according to each of examples 1 to 6 may include not only lens elements having an optical power but also elements having zero or substantially zero optical power, such as mirrors, apertures, masks, cover glasses, filters, prisms, wave plates, and polarizing elements.

Next, conditions which the zoom lens system according to each of examples 1 to 6 can satisfy are described below. Although a plurality of the conditions are defined for the zoom lens system according to each of the examples, all of these plurality of conditions may be satisfied, or the individual conditions may be satisfied to obtain the corresponding effects.

The zoom lens system according to each of examples 1 to 6 internally has an intermediate imaging position that is conjugated to a magnification conjugate point on a magnification side and a reduction conjugate point on a reduction side, respectively. The zoom lens system includes a magnification optical system positioned on the magnification side with respect to the intermediate imaging position and a relay optical system positioned on the reduction side with respect to the intermediate imaging position. The relay optical system includes a first lens group having a positive power that is positioned closest to the magnification side, two lens groups positioned on the reduction side with respect to the first lens group, and a negative lens group interposed between the two lens groups, wherein during zooming the negative lens is fixed, while the two lens groups are displaced.

According to this configuration, even when the lens is made wider in angle, the lens can be made small in effective diameter and light in weight. Further the zoom actuation mechanism can be made simple, so that mechanical components thereof as well as the entire lens can be made light in weight.

In the zoom lens system according to each of examples 1 to 6, the first lens group and the magnification optical system may be fixed during zooming.

According to this configuration, arrangement of a zoom mechanism closer to the reduction side with respect to the intermediate imaging position allows a zoom operation mechanism, such as, cam, motor, to be implemented on the reduction side. Therefore, the center of gravity of a lens barrel can be brought closer to the reduction side.

Further, in the zoom lens system according to each of examples 1 to 6, the relay optical system may further include an another negative lens group, wherein said negative lens group may have a negative power smaller than that of said another negative lens group.

According to this configuration, during zooming variation in aberration can be made smaller, resulting in good performance over the entire zoom range.

Further, in the zoom lens system according to each of examples 1 to 6, said negative lens group may have an aperture.

According to this configuration, during zooming variation in aberration can be made smaller, resulting in good performance over the entire zoom range.

Further, in the zoom lens system according to each of examples 1 to 6, a lens positioned closest to the reduction side within the magnification optical system may be a negative lens.

According to this configuration, the lens close to the intermediate imaging position can be made small in effective diameter and light in weight.

In the zoom lens system according to each of examples 1 to 6, a lens positioned closest to the magnification side within the relay optical system may be a positive lens.

According to this configuration, the lens close to the intermediate imaging position can be made small in effective diameter and light in weight.

Further, the zoom lens system according to each of examples 1 to 6 may satisfy the following condition (1):

$$0.1 < fp/fr < 0.5 \tag{1}$$

where fp is a focal length of the magnification optical system, and fr is a focal length of the relay optical system at the wide-angle end.

The condition (4) is a conditional expression for defining the relationship between the composite focal lengths of the magnification optical system and the relay optical system. When satisfying this, an optical system having a wide angle and a small lens diameter can be realized. If falling below the lower limit value of the condition (4), the effective diameter of the positive power lens element which is located on the magnification side with respect to the intermediate imaging position and second-closest to the intermediate imaging position becomes too large, and the lens becomes heavier. On the other hand, if exceeding the upper limit value, the effective diameter of the lens located closest to the magnification side becomes too large, and the lens becomes heavier.

In addition to the condition (1), more advantageous effects can be obtained by further satisfying the following condition (1A):

$$0.15 < fp/fr < 0.30 \tag{1A}$$

Further, the zoom lens system according to each of examples 1 to 6 may satisfy the following condition (2):

$$100 < |fr1/fw| < 1000 \tag{2}$$

where fr1 is a focal length of the first lens group, and fw is a focal length of the entire optical system at the wide-angle end.

The condition (2) is a conditional expression for defining the relationship between the focal length of the first lens group and the focal length of the entire optical system at the wide-angle end. When satisfying this, an optical system having a wide angle and a small lens diameter can be realized. If exceeding the upper limit of the condition (2), the diameter of the first lens group becomes too large, and the lens becomes heavier accordingly. On the other hand, if falling below the lower limit, the diameter of the rear group of the magnification optical system becomes too large, and the lens becomes heavier accordingly.

In addition to the condition (2), more advantageous effects can be obtained by further satisfying the following condition (2A):

$$150 < |fr1/fw| < 700 \tag{2A}$$

Further, the zoom lens system according to each of examples 1 to 6 may satisfy the following condition (3):

$$5 < frn/fw < 50 \tag{3}$$

where frn is a focal length of the negative lens group, and fw is a focal length of the entire optical system at the wide-angle end.

The condition (3) is a conditional expression for defining the relationship between the focal length of the negative lens group and the focal length of the entire optical system at the wide-angle end. When satisfying this, an optical system having a wide angle and a small lens diameter can be realized. If exceeding the upper limit of the condition (3), the diameter of the negative lens group becomes too large, and the lens becomes heavier accordingly. On the other hand, if falling below the lower limit, the diameter of the lens group positioned on the reduction side with respect to the negative lens group becomes too large, and the lens becomes heavier accordingly.

In addition to the condition (3), more advantageous effects can be obtained by further satisfying the following condition (3A):

$$8 < frn/fw < 30 \tag{3A}$$

Further, in the zoom lens system according to each of examples 1 to 6, the magnification optical system may have the longest air distance, and include a magnification optical system front group positioned on the magnification side with respect to the longest air distance and a magnification optical system rear group positioned on the reduction side with respect to the longest air distance, and the zoom lens system may satisfy the following conditions (4) and (5):

$$6.5 < |Ts/fw| < 12.0 \tag{4}$$

$$3.0 < |Tpr/fw| < 8.0 \tag{5}$$

where Ts is the longest air distance within the magnification optical system, fw is a focal length of the entire optical system, and Tpr is a distance from a surface closest to the magnification side within the magnification optical system rear group to the intermediate imaging position.

The condition (4) is a conditional expression for defining the relationship between the longest air distance within the magnification optical system and the focal length of the entire optical system at the wide-angle end. When satisfying the condition (4), the optical system can achieve a wider angle. If falling below the lower limit of the condition (4), the lens of the magnification optical system front group becomes heavier. If exceeding the upper limit of the condition (4), the center of gravity of the entire optical system is moved to the magnification side. The condition (5) is a conditional expression for defining the relationship between the distance from the surface on the magnification side within the magnification optical system rear group to the intermediate imaging position and the focal length of the entire optical system at the wide-angle end. When satisfying the condition (5), the effect of the condition (4) can be exhibited.

In addition to the conditions (4) and (5), more advantageous effects can be obtained by further satisfying the following conditions (4A) and (5A):

$$6.5 < |Ts/fw| < 10.0 \tag{4A}$$

$$5.0 < |Tpr/fw| < 6.5 \tag{5A}$$

The zoom lens system according to each of examples 1 to 6 may satisfy the following conditional expression (6):

$$0.8 < Tp/Tr < 1.0 \tag{6}$$

where Tp is a distance from a surface closest to the magnification side within the magnification optical system to the intermediate imaging position, and Tr is a distance from the intermediate imaging position to a surface closest to the reduction side within the relay optical system at the wide-angle end.

The condition (6) is a conditional expression for defining the relationship between the distance from the surface closest to the magnification side within the magnification optical system to the intermediate imaging position and the distance from the intermediate imaging position to the surface closest to the reduction side within the relay optical system at the wide-angle end. If exceeding the upper limit of the condition (6), it becomes difficult to correct the field curvature. If falling below the lower limit of the condition (6), the center of gravity is moved toward the magnification side.

In addition to the condition (6), more advantageous effects can be obtained by further satisfying the following condition (6A):

$$0.9 < Tp/Tr < 1.0 \tag{6A}$$

In the zoom lens system according to each of examples 1 to 6, the magnification optical system may have the longest air distance, and include a magnification optical system front group positioned on the magnification side with respect to the longest air distance and a magnification optical system rear group positioned on the reduction side with respect to the longest air distance, and the zoom lens system may satisfy the following conditional expression (7):

$$7 < |fpr/fw| < 12 \tag{7}$$

where fpr is a focal length of the magnification optical system rear group.

The condition (7) is a conditional expression for defining the relationship between the focal length of the magnification optical system rear group and the focal length of the entire optical system at the wide-angle end. If exceeding the upper limit of the condition (7), the diameter of the magnification optical system rear group becomes too large, and the lens becomes heavier accordingly. If falling below the lower limit of the condition (7), the diameter of the magnification optical system front group becomes too large, and the lens becomes heavier accordingly.

In addition to the condition (7), more advantageous effects can be obtained by further satisfying the following condition (7A):

$$9 < |fpr/fw| < 10 \tag{7A}$$

In the zoom lens system according to each of examples 1 to 6, the magnification optical system may have the longest air distance, and include a magnification optical system front group positioned on the magnification side with respect to the longest air distance and a magnification optical system rear group positioned on the reduction side with respect to the longest air distance, and the zoom lens system may satisfy the following conditional expression (8):

$$2 < |fpf/fw| < 5 \tag{8}$$

where fpf is a focal length of the magnification optical system front group.

The condition (8) is a conditional expression for defining the relationship between the focal length of the magnification optical system front group and the focal length of the entire optical system at the wide-angle end. If exceeding the upper limit of the condition (8), the diameter of the magnification optical system front group becomes too large, and the lens becomes heavier accordingly. If falling below the lower limit of the condition (8), the diameter of the magnification optical system rear group becomes too large, and the lens becomes heavier accordingly.

In addition to the condition (8), more advantageous effects can be obtained by further satisfying the following condition (8A):

$$3 < |fpf/fw| < 4 \tag{8A}$$

Further, in the zoom lens system according to each of examples 1 to 6, the first lens element may be arranged closest to the magnification side within the magnification optical system, and the first lens element may have a first lens magnification side aspherical surface facing the magnification side and a first lens reduction side aspherical surface facing the reduction side, and the first lens magnification side surface and the first lens reduction side surface may satisfy the following condition (9) within a range above zero (r>0) to an effective diameter:

$$dZ(r)/dr > 0 \tag{9}$$

where r is a distance (r>0) from a vertex of a surface as measured along a plane perpendicular to the optical axis of the optical system, and Z(r) is an amount of sag of the surface (assuming that Z=0 at the vertex (r=0), where Z has a sign + for reduction side displacement with respect to the vertex, and a sign − for magnification side displacement).

The condition (14) is a conditional expression for defining that the first derivative dZ(r)/dr of the amount of sag Z(r) of the surface is positive. When satisfying the condition (14), even when local heat is generated in the first lens element, a change in shape due to thermal expansion take places likewise in both the magnification side surface and the reduction side surface of the first lens element. As a result, the occurrence of field curvature and astigmatism can be suppressed.

In addition, in the zoom lens system according to each of examples 1 to 6, the first lens element may be made of synthetic resin.

According to this configuration, the first lens element is easily made large in diameter, and the weight of the lens can be reduced by using the synthetic resin.

In the zoom lens system according to each of examples 1 to 6, all the lens elements that satisfy the condition (10) among the plurality of lens elements may satisfy the condition (11), and one lens element among the plurality of lens elements may not satisfy both of the conditions (10) and (11):

$$|ym/(fw \cdot \tan(\omega m))| < 3.0 \tag{10}$$

$$Tg > 300° \text{ C.} \tag{11}$$

where ωm is a maximum half angle of view at the wide-angle end, ym is a height at the telephoto end at which the most off-axis main ray passes through the lens surface, and Tg is a glass transition point of lens material.

The condition (10) is a conditional expression for defining the relationship among the height at the telephoto end at which the most off-axis main ray passes through the lens surface, the focal length of the entire optical system at the wide-angle end, and the maximum half angle of view at the wide-angle end. The condition (11) is a conditional expression for defining the glass transition point of the lens material. When satisfying both of the conditions (10) and (11), deterioration of the lens can be prevented when high intensity light passes through the lens. Note that ym is calculated as a lower one out of a height of the light passing through the surface on the magnification side and a height of the light passing through the surface on the reduction side of the lens. Further, in a case of not satisfying the condition (10), a material not satisfying the glass transition point Tg of the lens material may be selected in order to expand the scope of selection of a glass material that is less susceptible to heat. This allows a material having a low glass transition point Tg, such as resin, to be selected and thus allows reduction in weight.

Further, the zoom lens system according to each of examples 1 to 6 may satisfy the following conditional expression (12):

$$\omega m > 65° \quad (12)$$

where ωm is a maximum half angle of view at the wide-angle end.

The condition (12) is a conditional expression for defining the maximum half angle of view at the wide-angle end. When satisfying the condition (12) is satisfied, a working distance can be shortened.

Further, the zoom lens system according to each of examples 1 to 6 may satisfy the following conditional expression (13):

$$-1.5 < (L1R1+L1R2)/(L1R2-L1R1) < -0.9 \quad (13)$$

where L1R1 is a radius of curvature at the center of the lens magnification side surface closest to the magnification side, and L1R2 is a radius of curvature at the center of the lens reduction side surface closest to the magnification side.

The condition (13) is a conditional expression for defining the shaping factor of the first lens element positioned closest to the magnification side within the magnification optical system. When satisfying the condition (13), the effective diameter of the lens can be reduced while correcting field curvature and distortion aberration. If falling below the lower limit of the condition (13), field curvature and distortion aberration cannot be sufficiently corrected. Further, if exceeding the upper limit, the effective diameter of the lens positioned on the reduction side becomes larger.

In addition to the condition (13), more advantageous effects can be obtained by further satisfying the following condition (13A):

$$-1.2 < (L1R1+L1R2)/(L1R2-L1R1) < -1.07 \quad (13A)$$

In the zoom optical system according to each of examples 1 to 6, the group positioned closest to the magnification side within the rear group may have a positive power and may be displaced toward the magnification side during zooming from the wide-angle end to the telephoto end.

According to this configuration, during zooming variation in aberration can be made smaller.

In the zoom optical system according to each of examples 1 to 6, the group positioned adjacent to the front group positioned on the magnification side may have a positive power, and the group positioned adjacent to the reduction side may have a positive power.

According to this configuration, during zooming variation in aberration can be made smaller.

As described above, some examples have been described to exemplify the technology disclosed in the present application. The technology of the present disclosure, however, is not limited only to these examples, but also can be applied to other embodiments appropriately devised through modification, substitution, addition, omission and so on.

Hereinafter, numerical examples of the zoom lens system according to examples 1 to 6 are described. In each of the numerical examples, in the table, the unit of length is all "mm", and the unit of angle of view is all "°" (degree). Further, in each of the numerical examples, r is a radius of curvature, d is a surface interval, nd is a refractive index for d line, and vd is an Abbe number for d line. Further, in each of the numerical examples, a surface marked with "*" is aspherical, and the aspherical shape is defined by the following formula.

$$Z = \frac{h^2/r}{1+\sqrt{1-(1+\kappa)(h/r)^2}} + \sum A_n h^n \quad \text{[Mathematical Formula 1]}$$

where Z is a distance from a point located on an aspherical surface at a height "h" from the optical axis, to the tangent plane of the aspherical vertex, h is a height from the optical axis, r is a radius of curvature of the vertex, κ is a cone constant, and An is a nth-order aspherical coefficient.

Numerical Example 1

Regarding the zoom lens system of numerical example 1 (corresponding to example 1), Table 1 shows surface data, Table 2 shows various data, and Table 3 shows single lens data (unit: mm).

TABLE 1

Surface data

| SURFACE NUMBER | r | d | nd | vd |
|---|---|---|---|---|
| Object plane | ∞ (infinity) | | | |
| 1* | 1559.72740 | 10.00000 | 1.50940 | 56.5 |
| 2* | 49.93020 | 21.30460 | | |
| 3 | 62.81020 | 3.50000 | 1.80420 | 46.5 |
| 4 | 34.70010 | 8.90130 | | |
| 5 | 56.73020 | 2.50000 | 1.80420 | 46.5 |
| 6 | 26.07540 | 23.46460 | | |
| 7 | −45.65000 | 9.58260 | 1.80420 | 46.5 |
| 8 | −43.96980 | 10.59440 | | |
| 9* | −26.79370 | 9.98320 | 1.51633 | 64.1 |
| 10* | −17.01960 | 0.20000 | | |
| 11 | −48.20740 | 6.63870 | 1.49700 | 81.6 |
| 12 | −23.22440 | 0.20000 | | |
| 13 | −24.11240 | 2.50000 | 1.86966 | 20.0 |
| 14 | −390.21520 | 0.27550 | | |
| 15 | −310.33810 | 10.92670 | 1.49700 | 81.6 |
| 16 | −32.54250 | 3.54050 | | |
| 17 | −327.98450 | 12.31470 | 1.49700 | 81.6 |
| 18 | −44.92820 | 52.72720 | | |
| 19 | 112.99220 | 12.93660 | 1.92286 | 20.9 |
| 20 | −242.56180 | 1.07700 | | |
| 21 | 34.64080 | 10.20050 | 1.92286 | 20.9 |
| 22 | 47.22600 | 7.87550 | | |
| 23 | 175.26870 | 2.64100 | 1.80420 | 46.5 |
| 24 | 40.67200 | 17.69210 | | |
| 25 | −99.40430 | 5.09720 | 1.73800 | 32.3 |
| 26 | −58.46020 | 1.18700 | | |
| 27 | −48.52090 | 4.00000 | 1.75500 | 52.3 |
| 28 | 112.52870 | 24.31600 | | |
| 29 | −103.32630 | 9.73590 | 1.86966 | 20.0 |
| 30 | −46.35090 | variable | | |
| 31 | 628.18950 | 14.57510 | 1.59282 | 68.6 |
| 32 | −52.01000 | 1.93020 | | |
| 33 | −50.20170 | 1.50000 | 1.59270 | 35.4 |
| 34 | −118.85930 | 0.20000 | | |
| 35 | 119.34120 | 4.06280 | 1.49700 | 81.6 |
| 36 | −609.80110 | variable | | |
| 37 | 39.15350 | 4.63700 | 1.59270 | 35.4 |
| 38 | 78.94450 | 7.47190 | | |
| 39 (Aperture) | ∞ | 5.06950 | | |
| 40 | 83.20610 | 1.50000 | 1.51680 | 64.2 |
| 41 | 25.33360 | 19.56830 | | |
| 42 | −35.31920 | 1.50000 | 1.73800 | 32.3 |
| 43 | 314.02180 | 0.23590 | | |
| 44 | 317.72160 | 6.90320 | 1.43700 | 95.1 |
| 45 | −39.10950 | variable | | |
| 46 | 77.92810 | 10.14880 | 1.49700 | 81.6 |
| 47 | −66.68800 | 4.58920 | | |
| 48 | 52.73130 | 2.50000 | 1.67300 | 38.3 |
| 49 | 38.05440 | 2.43570 | | |
| 50 | 43.58200 | 13.94890 | 1.43700 | 95.1 |
| 51 | −89.60580 | variable | | |

TABLE 1-continued

| | | | | |
|---|---|---|---|---|
| 52 | ∞ | 41.77900 | 1.51680 | 64.2 |
| 53 | ∞ | BF | | |
| Image plane | ∞ | | | |

Aspherical data

1st surface

K = 0.00000E+00, A3 = 1.28353E−04, A4 = −2.64195E−07,
A5 = −6.74969E−08, A6 = 1.81712E−09, A7 = −1.58164E−11,
A8 = −6.22311E−14, A9 = 2.06740E−15, A10 = −1.04375E−17

2nd surface

K = −8.26520E−01, A3 = 1.67017E−04, A4 = −3.90151E−06,
A5 = 4.01101E−09, A6 = 8.36718E−11, A7 = −1.92652E−12,
A8 = 3.11135E−14, A9 = 6.71471E−16, A10 = −8.69102E−18

9th surface

K = 0.00000E+00, A3 = 0.00 000E+00, A4 = −2.79259E−05,
A5 = 0.00000E+00, A6 = −9.86305E−08, A7 = 0.00000E+00,
A8 = −4.35015E−11, A9 = 0.00000E+00, A10 = −3.54848E−12

10th surface

K = 0.00000E+00, A3 = 0.00000E+00, A4 = 6.83358E−06,
A5 = 0.00000E+00, A6 = 5.05887E−09, A7 = 0.00000E+00,
A8 = 4.34142E−12, A9 = 0.00000E+00, A10 = 0. 00000E+00

TABLE 2

Various data
Zoom ratio 1.07169

| | WIDE-ANGLE | INTERMEDIATE | TELEPHOTO |
|---|---|---|---|
| Focal length | −7.2471 | −7.4853 | −7.7666 |
| F number | −1.89825 | −1.89923 | −1.90119 |
| Angle of view | −66.7864 | −66.1339 | −65.3643 |
| Image height | 17.2650 | 17.2650 | 17.2650 |
| Total length of lens | 531.0070 | 531.0195 | 531.0251 |
| BF | 1.00700 | 1.01971 | 1.02522 |
| d30 | 79.3276 | 76.2376 | 72.7297 |
| d36 | 2.0000 | 5.0899 | 8.5979 |
| d45 | 2.8841 | 2.8449 | 2.7430 |
| d51 | 15.3200 | 15.3591 | 15.4610 |
| Position of entrance pupil | 39.4726 | 39.4868 | 39.5064 |
| Position of exit pupil | −629.6533 | −622.9628 | −606.2384 |
| Position of front principal point | 32.1422 | 31.9117 | 31.6404 |
| Position of rear principal point | 538.2065 | 538.4541 | 538.7371 |

TABLE 3

Single lens data

| Lens element | First surface | Focal length |
|---|---|---|
| 1 | 1 | −101.4864 |
| 2 | 3 | −102.0782 |
| 3 | 5 | −62.2680 |
| 4 | 7 | 419.3768 |
| 5 | 9 | 67.0430 |
| 6 | 11 | 82.8595 |
| 7 | 13 | −29.6464 |
| 8 | 15 | 72.2058 |
| 9 | 17 | 103.2565 |
| 10 | 19 | 85.0120 |
| 11 | 21 | 101.4077 |
| 12 | 23 | −66.4382 |
| 13 | 25 | 182.6611 |
| 14 | 27 | −44.4293 |
| 15 | 29 | 89.5395 |
| 16 | 31 | 81.6757 |
| 17 | 33 | −147.8329 |
| 18 | 35 | 201.1947 |
| 19 | 37 | 125.6127 |
| 20 | 40 | −71.1068 |
| 21 | 42 | −42.9411 |
| 22 | 44 | 80.1579 |
| 23 | 46 | 74.0303 |
| 24 | 48 | −218.0976 |
| 25 | 50 | 69.3032 |

Numerical Example 2

Regarding the zoom lens system of numerical example 2 (corresponding to example 2), Table 4 shows surface data, Table 5 shows various data, and Table 6 shows single lens data (unit: mm).

TABLE 4

Surface data

| SURFACE NUMBER | r | d | nd | vd |
|---|---|---|---|---|
| Object plane | ∞ (infinity) | | | |
| 1* | 1285.52270 | 10.00000 | 1.50940 | 56.5 |
| 2* | 49.83060 | 21.21070 | | |
| 3 | 62.02650 | 3.50000 | 1.80420 | 46.5 |
| 4 | 35.06940 | 9.10900 | | |
| 5 | 58.54560 | 2.50000 | 1.80420 | 46.5 |
| 6 | 26.12090 | 23.74190 | | |
| 7 | −46.72130 | 9.61280 | 1.80420 | 46.5 |
| 8 | −44.15830 | 10.24780 | | |
| 9* | −26.01750 | 9.90630 | 1.51633 | 64.1 |
| 10* | −16.98380 | 0.20000 | | |
| 11 | −50.16140 | 6.68810 | 1.49700 | 81.6 |
| 12 | −23.53440 | 0.20000 | | |
| 13 | −24.64730 | 2.50000 | 1.86966 | 20.0 |
| 14 | −585.53890 | 0.31100 | | |
| 15 | −393.42380 | 10.84330 | 1.49700 | 81.6 |
| 16 | −33.35970 | 3.25760 | | |
| 17 | −343.11560 | 12.47360 | 1.49700 | 81.6 |
| 18 | −44.66860 | 52.40130 | | |
| 19 | 112.65940 | 13.18500 | 1.92286 | 20.9 |
| 20 | −240.04370 | 1.20910 | | |
| 21 | 34.70690 | 10.27630 | 1.92286 | 20.9 |
| 22 | 47.35520 | 7.94350 | | |
| 23 | 175.99540 | 2.70280 | 1.80420 | 46.5 |
| 24 | 40.79770 | 17.83980 | | |
| 25 | −100.33770 | 4.78040 | 1.73800 | 32.3 |
| 26 | −61.87190 | 1.14400 | | |
| 27 | −51.03120 | 4.00000 | 1.75500 | 52.3 |
| 28 | 106.39920 | 25.02820 | | |
| 29 | −107.82800 | 9.69950 | 1.86966 | 20.0 |
| 30 | −46.86680 | variable | | |
| 31 | 980.24220 | 13.42940 | 1.59282 | 68.6 |
| 32 | −49.21610 | 1.38190 | | |
| 33 | −47.83950 | 1.50000 | 1.59270 | 35.4 |
| 34 | −112.14390 | 0.20000 | | |
| 35 | 114.93620 | 4.06190 | 1.49700 | 81.6 |
| 36 | −836.92110 | variable | | |
| 37 | 39.04630 | 4.71460 | 1.59270 | 35.4 |
| 38 | 80.21340 | 6.84850 | | |
| 39 (Aperture) | ∞ | 4.96320 | | |
| 40 | 87.23480 | 1.50000 | 1.51680 | 64.2 |
| 41 | 25.40700 | 20.30400 | | |
| 42 | −35.83100 | 1.50000 | 1.73800 | 32.3 |
| 43 | 333.80130 | 0.62340 | | |
| 44 | 184.10960 | 7.84820 | 1.43700 | 95.1 |
| 45 | −39.54110 | variable | | |
| 46 | 78.61340 | 10.04780 | 1.49700 | 81.6 |
| 47 | −72.77470 | variable | | |
| 48 | 53.01230 | 2.50000 | 1.67300 | 38.3 |

TABLE 4-continued

| | | | | |
|---|---|---|---|---|
| 49 | 36.50730 | 2.16040 | | |
| 50 | 40.36680 | 13.98580 | 1.43700 | 95.1 |
| 51 | −111.29940 | 15.32000 | | |
| 52 | ∞ | 41.77900 | 1.51680 | 64.2 |
| 53 | ∞ | BF | | |
| Image plane | ∞ | | | |

Aspherical data

1st surface

K = 0.00000E+00, A3 = 1.28839E−04, A4 = −3.08330E−07,
A5 = −6.71661E−08, A6 = 1.82141E−09, A7 = −1.58537E−11,
A8 = −6.25886E−14, A9 = 2.06822E−15, A10 = −1.04113E−17

2nd surface

K = −8.31900E−01, A3 = 1.67819E−04, A4 = −3.91209E−06,
A5 = 3.98957E−09, A6 = 8.43543E−11, A7 = −1.91614E−12,
A8 = 3.12599E−14, A9 = 6.71655E−16, A10 = −8.70014E−18

9th surface

K = 0.00000E+00, A3 = 0.00000E+00, A4 = −2.77656E−05,
A5 = 0.00000E+00, A6 = −1.04848E−07, A7 = 0.00000E+00,
A8 = −1.16343E−11, A9 = 0.00000E+00, A10 = −3.81206E−12

10th surface

K = 0.00000E+00, A3 = 0.00000E+00, A4 = 6.68590E−06,
A5 = 0.00000E+00, A6 = 4.30475E−09, A7 = 0.00000E+00,
A8 = 5.04148E−12, A9 = 0.00000E+00, A10 = 0.00000E+00

TABLE 5

Various data
Zoom ratio 1.07164

| | WIDE-ANGLE | INTERMEDIATE | TELEPHOTO |
|---|---|---|---|
| Focal length | −7.2472 | −7.4856 | −7.7664 |
| F number | −1.89804 | −1.89866 | −1.90299 |
| Angle of view | −66.7815 | −66.1287 | −65.3536 |
| Image height | 17.2650 | 17.2650 | 17.2650 |
| Total length of lens | 531.0056 | 531.0189 | 531.0223 |
| BF | 1.00567 | 1.01918 | 1.02245 |
| d30 | 79.4673 | 76.3678 | 73.0056 |
| d36 | 2.0000 | 5.0994 | 8.4617 |
| d45 | 2.9239 | 2.9156 | 2.7065 |
| d47 | 4.4286 | 4.4368 | 4.6460 |
| Position of entrance pupil | 39.6338 | 39.6469 | 39.6642 |
| Position of exit pupil | −629.4376 | −628.4604 | −604.9882 |
| Position of front principal point | 32.3032 | 32.0722 | 31.7983 |
| Position of rear principal point | 538.2053 | 538.4538 | 538.7342 |

TABLE 6

Single lens data

| Lens element | First surface | Focal length |
|---|---|---|
| 1 | 1 | −102.0460 |
| 2 | 3 | −106.5025 |
| 3 | 5 | −60.7339 |
| 4 | 7 | 374.6402 |
| 5 | 9 | 68.9777 |
| 6 | 11 | 82.3402 |
| 7 | 13 | −29.6481 |
| 8 | 15 | 72.6153 |
| 9 | 17 | 101.9147 |
| 10 | 19 | 84.6010 |
| 11 | 21 | 101.3027 |
| 12 | 23 | −66.6334 |
| 13 | 25 | 207.7268 |

TABLE 6-continued

Single lens data

| Lens element | First surface | Focal length |
|---|---|---|
| 14 | 27 | −45.1874 |
| 15 | 29 | 88.7533 |
| 16 | 31 | 79.4364 |
| 17 | 33 | −141.9943 |
| 18 | 35 | 203.6251 |
| 19 | 37 | 123.1158 |
| 20 | 40 | −69.9428 |
| 21 | 42 | −43.7696 |
| 22 | 44 | 75.2891 |
| 23 | 46 | 77.7513 |
| 24 | 48 | −185.5362 |
| 25 | 50 | 69.7427 |

Numerical Example 3

Regarding the zoom lens system of numerical example 3 (corresponding to example 3), Table 7 shows surface data, Table 8 shows various data, and Table 9 shows single lens data (unit: mm).

TABLE 7

Surface data

| SURFACE NUMBER | r | d | nd | vd |
|---|---|---|---|---|
| Object plane | ∞ (infinity) | | | |
| 1* | 1542.85870 | 10.00000 | 1.50940 | 56.5 |
| 2* | 49.55880 | 20.91510 | | |
| 3 | 61.91000 | 3.50000 | 1.80420 | 46.5 |
| 4 | 35.40450 | 8.98610 | | |
| 5 | 58.86560 | 2.50000 | 1.80420 | 46.5 |
| 6 | 26.15990 | 23.55990 | | |
| 7 | −48.39100 | 9.60620 | 1.80420 | 46.5 |
| 8 | −45.50060 | 10.68200 | | |
| 9* | −24.82700 | 9.90660 | 1.51633 | 64.1 |
| 10* | −17.27930 | 0.20000 | | |
| 11 | −60.90260 | 7.18860 | 1.49700 | 81.6 |
| 12 | −24.17250 | 0.20000 | | |
| 13 | −25.60320 | 2.50000 | 1.86966 | 20.0 |
| 14 | −12790.35690 | 0.38630 | | |
| 15 | −810.61200 | 10.98140 | 1.49700 | 81.6 |
| 16 | −34.93840 | 2.31620 | | |
| 17 | −470.05300 | 12.87300 | 1.49700 | 81.6 |
| 18 | −45.09980 | 52.14650 | | |
| 19 | 112.57610 | 13.51480 | 1.92286 | 20.9 |
| 20 | −235.92950 | 1.04610 | | |
| 21 | 34.81750 | 10.34860 | 1.92286 | 20.9 |
| 22 | 46.77120 | 7.98380 | | |
| 23 | 167.00960 | 2.74570 | 1.80420 | 46.5 |
| 24 | 40.71110 | 17.82940 | | |
| 25 | −99.89220 | 4.66260 | 1.73800 | 32.3 |
| 26 | −63.60960 | 1.09750 | | |
| 27 | −52.56980 | 4.00000 | 1.75500 | 52.3 |
| 28 | 104.66390 | 25.76170 | | |
| 29 | −110.86560 | 9.51860 | 1.86966 | 20.0 |
| 30 | −47.59640 | variable | | |
| 31 | 1141.93590 | 12.21660 | 1.59282 | 68.6 |
| 32 | −49.36050 | 1.41000 | | |
| 33 | −47.97660 | 1.50000 | 1.59270 | 35.4 |
| 34 | −114.67330 | 0.20000 | | |
| 35 | 112.51030 | 4.14990 | 1.49700 | 81.6 |
| 36 | −772.27450 | variable | | |
| 37 | 39.35990 | 4.81790 | 1.59270 | 35.4 |
| 38 | 84.40660 | 6.27310 | | |
| 39 (Aperture) | ∞ | 4.75130 | | |
| 40 | 91.49710 | 1.50000 | 1.51680 | 64.2 |
| 41 | 25.98720 | 19.85740 | | |
| 42 | −38.54720 | 1.50000 | 1.73800 | 32.3 |
| 43 | 190.47750 | 0.81730 | | |
| 44 | 123.82590 | 8.05450 | 1.43700 | 95.1 |
| 45 | −41.18570 | variable | | |

TABLE 7-continued

| | | | | |
|---|---|---|---|---|
| 46 | 75.00430 | 8.96430 | 1.49700 | 81.6 |
| 47 | −89.90820 | variable | | |
| 48 | 49.67100 | 2.50000 | 1.67300 | 38.3 |
| 49 | 36.65610 | variable | | |
| 50 | 43.77010 | 13.46000 | 1.43700 | 95.1 |
| 51 | −103.12930 | 15.32000 | | |
| 52 | ∞ | 41.77900 | 1.51680 | 64.2 |
| 53 | ∞ | BF | | |
| Image plane | ∞ | | | |

Aspherical data

1st surface

K = 0.00000E+00, A3 = 1.27352E−04, A4 = −2.46395E−07,
A5 = −6.78194E−08, A6 = 1.82353E−09, A7 = −1.58698E−11,
A8 = −6.23368E−14, A9 = 2.06906E−15, A10 = −1.04258E−17

2nd surface

K = −8.34168E−01, A3 = 1.66154E−04, A4 = −3.92942E−06,
A5 = 3.98305E−09, A6 = 8.75484E−11, A7 = −1.87356E−12,
A8 = 3.13986E−14, A9 = 6.69332E−16, A10 = −8.78444E−18

9th surface

K = 0.00000E+00, A3 = 0.00000E+00, A4 = −2.59408E−05,
A5 = 0.00000E+00, A6 = −1.01204E−07, A7 = 0.00000E+00,
A8 = 1.03376E−11, A9 = 0.00000E+00, A10 = −3.68227E−12

10th surface

K = 0.00000E+00, A3 = 0.00000E+00, A4 = 6.01465E−06,
A5 = 0.00000E+00, A6 = 4.28522E−09, A7 = 0.00000E+00,
A8 = 4.82571E−12, A9 = 0.00000E+00, A10 = 0.00000E+00

TABLE 8

Various data
Zoom ratio 1.07195

| | WIDE-ANGLE | INTERMEDIATE | TELEPHOTO |
|---|---|---|---|
| Focal length | −7.2462 | −7.4855 | −7.7676 |
| F number | −1.89833 | −1.89996 | −1.90470 |
| Angle of view | −66.7849 | −66.1367 | −65.3666 |
| Image height | 17.2650 | 17.2650 | 17.2650 |
| Total length of lens | 531.0064 | 531.0187 | 531.0213 |
| BF | 1.00665 | 1.01903 | 1.02147 |
| d30 | 80.2537 | 77.1802 | 73.8099 |
| d36 | 2.0130 | 5.0864 | 8.4567 |
| d45 | 3.0000 | 2.9143 | 2.6517 |
| d47 | 4.3983 | 4.3721 | 4.5535 |
| d49 | 4.3068 | 4.4187 | 4.5000 |
| Position of entrance pupil | 39.3613 | 39.3735 | 39.3900 |
| Position of exit pupil | −624.4664 | −620.0128 | −597.7090 |
| Position of front principal point | 32.0311 | 31.7978 | 31.5217 |
| Position of rear principal point | 538.2052 | 538.4535 | 538.7343 |

TABLE 9

Single lens data

| Lens element | First surface | Focal length |
|---|---|---|
| 1 | 1 | −100.7454 |
| 2 | 3 | −109.2611 |
| 3 | 5 | −60.6131 |
| 4 | 7 | 381.7367 |
| 5 | 9 | 76.0781 |
| 6 | 11 | 75.7254 |
| 7 | 13 | −29.5021 |
| 8 | 15 | 73.1217 |
| 9 | 17 | 99.3757 |

TABLE 9-continued

Single lens data

| Lens element | First surface | Focal length |
|---|---|---|
| 10 | 19 | 84.1477 |
| 11 | 21 | 104.2867 |
| 12 | 23 | −67.5962 |
| 13 | 25 | 225.0220 |
| 14 | 27 | −45.8473 |
| 15 | 29 | 89.6298 |
| 16 | 31 | 80.1192 |
| 17 | 33 | −140.3461 |
| 18 | 35 | 197.9015 |
| 19 | 37 | 119.6685 |
| 20 | 40 | −70.7848 |
| 21 | 42 | −43.3203 |
| 22 | 44 | 71.7887 |
| 23 | 46 | 83.7890 |
| 24 | 48 | −225.2782 |
| 25 | 50 | 72.3320 |

Numerical Example 4

Regarding the zoom lens system of numerical example 4 (corresponding to example 4), Table 10 shows surface data, Table 11 shows various data, and Table 12 shows single lens data (unit: mm).

TABLE 10

Surface data

| SURFACE NUMBER | r | d | nd | vd |
|---|---|---|---|---|
| Object plane | ∞ (infinity) | | | |
| 1* | 853.38660 | 10.00000 | 1.50940 | 56.5 |
| 2* | 48.21640 | 20.70550 | | |
| 3 | 60.33030 | 3.50000 | 1.80420 | 46.5 |
| 4 | 35.47130 | 9.18140 | | |
| 5 | 59.13110 | 2.50000 | 1.80420 | 46.5 |
| 6 | 26.22800 | 21.79970 | | |
| 7 | −52.13020 | 9.56340 | 1.80420 | 46.5 |
| 8 | −50.05870 | 12.81450 | | |
| 9* | −24.44800 | 9.66160 | 1.51633 | 64.1 |
| 10* | −18.38320 | 0.20000 | | |
| 11 | −86.40890 | 8.16710 | 1.49700 | 81.6 |
| 12 | −24.81670 | 0.20000 | | |
| 13 | −27.15970 | 2.50000 | 1.86966 | 20.0 |
| 14 | 547.94120 | 0.56170 | | |
| 15 | 16222.81880 | 11.25620 | 1.49700 | 81.6 |
| 16 | −37.40970 | 0.96000 | | |
| 17 | −1502.05520 | 13.82660 | 1.49700 | 81.6 |
| 18 | −46.36270 | 51.66830 | | |
| 19 | 114.83090 | 13.86910 | 1.92286 | 20.9 |
| 20 | −243.40280 | 2.17470 | | |
| 21 | 34.79770 | 10.67800 | 1.92286 | 20.9 |
| 22 | 46.85510 | 8.21000 | | |
| 23 | 161.92410 | 2.91920 | 1.80420 | 46.5 |
| 24 | 40.25020 | 17.86250 | | |
| 25 | −104.95000 | 4.80810 | 1.73800 | 32.3 |
| 26 | −63.25580 | 0.87980 | | |
| 27 | −54.39110 | 4.00000 | 1.75500 | 52.3 |
| 28 | 95.33210 | 26.73890 | | |
| 29 | −112.94140 | 8.84110 | 1.86966 | 20.0 |
| 30 | −48.78270 | variable | | |
| 31 | 884.85040 | 8.40570 | 1.59282 | 68.6 |
| 32 | −49.78970 | 1.34100 | | |
| 33 | −48.57320 | 1.50000 | 1.59270 | 35.4 |
| 34 | −118.65630 | variable | | |
| 35 | 124.78890 | 4.21320 | 1.49700 | 81.6 |
| 36 | −452.70770 | variable | | |
| 37 | 37.96760 | 5.04490 | 1.59270 | 35.4 |
| 38 | 82.24760 | 4.80510 | | |
| 39 (Aperture) | ∞ | 5.85310 | | |
| 40 | 75.39660 | 1.50000 | 1.51680 | 64.2 |

TABLE 10-continued

| | | | | |
|---|---|---|---|---|
| 41 | 24.99980 | 18.91870 | | |
| 42 | −39.01370 | 1.50000 | 1.73800 | 32.3 |
| 43 | 127.29270 | 0.70010 | | |
| 44 | 120.82030 | 7.63430 | 1.43700 | 95.1 |
| 45 | −41.82490 | variable | | |
| 46 | 68.42550 | 9.25900 | 1.49700 | 81.6 |
| 47 | −93.00100 | variable | | |
| 48 | 54.80590 | 2.50000 | 1.67300 | 38.3 |
| 49 | 37.59050 | 3.35980 | | |
| 50 | 44.24510 | 14.52660 | 1.43700 | 95.1 |
| 51 | −76.05600 | 15.32000 | | |
| 52 | ∞ | 41.77900 | 1.51680 | 64.2 |
| 53 | ∞ | BF | | |
| Image plane | ∞ | | | |

Aspherical data

1st surface $K = 0.00000E+00, A3 = 1.23207E-04, A4 = -2.64346E-07, A5 = -6.70631E-08, A6 = 1.82466E-09, A7 = -1.59622E-11, A8 = -6.20200E-14, A9 = 2.06858E-15, A10 = -1.04117E-17$ 2nd surface $K = -8.53791E-01, A3 = 1.65320E-04, A4 = -4.01450E-06, A5 = 4.12521E-09, A6 = 9.64433E-11, A7 = -1.78094E-12, A8 = 3.16260E-14, A9 = 6.61916E-16, A10 = -8.92584E-18$ 9th surface $K = 0.00000E+00, A3 = 0.00000E+00, A4 = -2.10717E-05, A5 = 0.00000E+00, A6 = -6.55977E-08, A7 = 0.00000E+00, A8 = -1.66719E-11, A9 = 0.00000E+00, A10 = -2.25629E-12$ 10th surface $K = 0.00000E+00, A3 = 0.00000E+00, A4 = 4.94270E-06, A5 = 0.00000E+00, A6 = 4.28518E-09, A7 = 0.00000E+00, A8 = 1.37239E-11, A9 = 0.00000E+00, A10 = 0.00000E+00$

TABLE 11

Various data
Zoom ratio 1.07176

| | WIDE-ANGLE | INTERMEDIATE | TELEPHOTO |
|---|---|---|---|
| Focal length | −7.2505 | 7.4890 | −7.7708 |
| F number | −1.89769 | −1.89966 | −1.90218 |
| Angle of view | −66.7723 | −66.1145 | −65.3417 |
| Image height | 17.2650 | 17.2650 | 17.2650 |
| Total length of lens | 531.0044 | 531.0164 | 531.0251 |
| BF | 1.00464 | 1.01668 | 1.02526 |
| d30 | 80.1300 | 77.1041 | 73.7905 |
| d34 | 2.4064 | 2.3383 | 2.0000 |
| d36 | 2.0000 | 5.0939 | 8.7459 |
| d45 | 2.9859 | 2.9042 | 2.7968 |
| d47 | 4.2696 | 4.3513 | 4.4587 |
| Position of entrance pupil | 39.5645 | 39.5759 | 39.5918 |
| Position of exit pupil | −634.2339 | −625.3536 | −614.0913 |
| Position of front principal point | 32.2313 | 31.9973 | 31.7228 |
| Position of rear principal point | 538.2074 | 538.4547 | 538.7412 |

TABLE 12

Single lens data

| Lens element | First surface | Focal length |
|---|---|---|
| 1 | 1 | −100.7441 |
| 2 | 3 | −114.2125 |
| 3 | 5 | −60.6659 |

TABLE 12-continued

Single lens data

| Lens element | First surface | Focal length |
|---|---|---|
| 4 | 7 | 512.2830 |
| 5 | 9 | 93.0480 |
| 6 | 11 | 67.0985 |
| 7 | 13 | −29.6952 |
| 8 | 15 | 75.1155 |
| 9 | 17 | 95.9541 |
| 10 | 19 | 86.1445 |
| 11 | 21 | 102.8235 |
| 12 | 23 | −67.3269 |
| 13 | 25 | 205.6785 |
| 14 | 27 | −45.3490 |
| 15 | 29 | 92.7964 |
| 16 | 31 | 79.7802 |
| 17 | 33 | −139.8653 |
| 18 | 35 | 197.3075 |
| 19 | 37 | 114.1453 |
| 20 | 40 | −73.1124 |
| 21 | 42 | −40.3084 |
| 22 | 44 | 72.1265 |
| 23 | 46 | 80.8587 |
| 24 | 48 | −188.8490 |
| 25 | 50 | 66.4500 |

Numerical Example 5

Regarding the zoom lens system of numerical example 5 (corresponding to example 5), Table 13 shows surface data, Table 14 shows various data, and Table 15 shows single lens data (unit: mm).

TABLE 13

Surface data

| SURFACE NUMBER | r | d | nd | vd |
|---|---|---|---|---|
| Object plane | ∞ (infinity) | | | |
| 1* | 689.85100 | 10.00000 | 1.50940 | 56.5 |
| 2* | 47.67700 | 21.86350 | | |
| 3 | 64.31700 | 3.50000 | 1.80420 | 46.5 |
| 4 | 34.75590 | 8.13040 | | |
| 5 | 53.64940 | 2.50000 | 1.80420 | 46.5 |
| 6 | 26.31140 | 22.13420 | | |
| 7 | −51.65890 | 9.56070 | 1.80420 | 46.5 |
| 8 | −49.64180 | 12.98510 | | |
| 9* | −26.25180 | 9.33550 | 1.51633 | 64.1 |
| 10* | −18.86710 | 0.20000 | | |
| 11 | −72.14340 | 8.82740 | 1.49700 | 81.6 |
| 12 | −23.27540 | 0.20000 | | |
| 13 | −26.11700 | 2.50000 | 1.86966 | 20.0 |
| 14 | 778.49390 | 0.61230 | | |
| 15 | −1722.01300 | 11.44520 | 1.49700 | 81.6 |
| 16 | −37.94710 | 0.20000 | | |
| 17 | 3317.56040 | 14.48620 | 1.49700 | 81.6 |
| 18 | −48.06360 | 50.74300 | | |
| 19 | 120.75180 | 14.00000 | 1.92286 | 20.9 |
| 20 | −239.77770 | 3.13130 | | |
| 21 | 35.09390 | 11.02300 | 1.92286 | 20.9 |
| 22 | 47.26840 | 8.37230 | | |
| 23 | 157.56200 | 3.14730 | 1.80420 | 46.5 |
| 24 | 39.82520 | 16.97740 | | |
| 25 | −103.58400 | 4.82360 | 1.73800 | 32.3 |
| 26 | −63.27830 | 0.70490 | | |
| 27 | −56.53210 | 4.00000 | 1.75500 | 52.3 |
| 28 | 89.06880 | 27.26760 | | |
| 29 | −117.80840 | 9.17600 | 1.86966 | 20.0 |
| 30 | −49.09390 | variable | | |
| 31 | 450.02090 | 7.92050 | 1.59282 | 68.6 |
| 32 | −55.86800 | variable | | |
| 33 | −54.84200 | 1.50000 | 1.59270 | 35.4 |
| 34 | −154.22020 | variable | | |

TABLE 13-continued

| | | | | |
|---|---|---|---|---|
| 35 | 154.83850 | 4.19470 | 1.49700 | 81.6 |
| 36 | −218.56910 | variable | | |
| 37 | 34.89000 | 5.42970 | 1.59270 | 35.4 |
| 38 | 91.06230 | 2.30800 | | |
| 39 (Aperture) | ∞ | 5.54400 | | |
| 40 | 93.13560 | 1.50000 | 1.51680 | 64.2 |
| 41 | 23.67250 | 16.44500 | | |
| 42 | −35.51570 | 1.50000 | 1.73800 | 32.3 |
| 43 | 120.09350 | 0.22440 | | |
| 44 | 122.77130 | 7.34710 | 1.43700 | 95.1 |
| 45 | −37.72510 | variable | | |
| 46 | 65.47640 | 11.04450 | 1.49700 | 81.6 |
| 47 | −86.74310 | variable | | |
| 48 | 53.44180 | 2.50000 | 1.67300 | 38.3 |
| 49 | 37.63000 | variable | | |
| 50 | 46.31700 | 14.75210 | 1.43700 | 95.1 |
| 51 | −67.97830 | 15.32000 | | |
| 52 | ∞ | 41.77900 | 1.51680 | 64.2 |
| 53 | ∞ | BF | | |
| Image plane | ∞ | | | |

Aspherical data

1st surface

K = 0.00000E+00, A3 = 1.17463E−04, A4 = −2.31628E−07, A5 = −6.59395E−08, A6 = 1.81310E−09, A7 = −1.60936E−11, A8 = −6.10381E−14, A9 = 2.09440E−15, A10 = −1.06332E−17

2nd surface

K = −8.25922E−01, A3 = 1.59536E−04, A4 = −4.03112E−06, A5 = 5.08423E−09, A6 = 1.00553E−10, A7 = −1.90015E−12, A8 = 2.91500E−14, A9 = 6.51056E−16, A10 = −8.49456E−18

9th surface

K = 0.00000E+00, A3 = 0.00000E+00, A4 = −2.18898E−05, A5 = 0.00000E+00, A6 = −7.41292E−08, A7 = 0.00000E+00, A8 = 4.43382E−11, A9 = 0.00000E+00, A10 = −2.46623E−12

10th surface

K = 0.00000E+00, A3 = 0.00000E+00, A4 = 3.98821E−06, A5 = 0.00000E+00, A6 = 2.26149E−09, A7 = 0.00000E+00, A8 = 2.47661E−13, A9 = 0.00000E+00, A10 = 0.00000E+00

TABLE 14

Various data
Zoom ratio 1.07178

| | WIDE-ANGLE | INTERMEDIATE | TELEPHOTO |
|---|---|---|---|
| Focal length | −7.2794 | −7.5189 | −7.8019 |
| F number | −1.89789 | −1.89986 | −1.90209 |
| Angle of view | −66.7679 | −66.1108 | −65.3409 |
| Image height | 17.2650 | 17.2650 | 17.2650 |
| Total length of lens | 531.0025 | 531.0103 | 531.0183 |
| BF | 1.00289 | 1.01065 | 1.01871 |
| d30 | 79.7849 | 76.8891 | 73.7081 |
| d32 | 2.3452 | 2.1673 | 2.0000 |
| d34 | 3.0465 | 2.6569 | 2.0000 |
| d36 | 2.0000 | 5.4633 | 9.4686 |
| d45 | 3.1570 | 3.0692 | 2.9663 |
| d47 | 4.5101 | 4.5175 | 4.5349 |
| d49 | 4.0000 | 4.0804 | 4.1658 |
| Position of entrance pupil | 39.6022 | 39.6132 | 39.6290 |
| Position of exit pupil | −636.8964 | −630.5474 | −622.9057 |
| Position of front principal point | 32.2397 | 32.0048 | 31.7296 |
| Position of rear principal point | 538.2340 | 538.4780 | 538.7651 |

TABLE 15

Single lens data

| Lens element | First surface | Focal length |
|---|---|---|
| 1 | 1 | −101.0747 |
| 2 | 3 | −99.2699 |
| 3 | 5 | −66.9349 |
| 4 | 7 | 507.8820 |
| 5 | 9 | 90.8085 |
| 6 | 11 | 65.2261 |
| 7 | 13 | −29.0145 |
| 8 | 15 | 77.8974 |
| 9 | 17 | 95.4633 |
| 10 | 19 | 88.6740 |
| 11 | 21 | 102.9202 |
| 12 | 23 | −67.0718 |
| 13 | 25 | 209.6995 |
| 14 | 27 | −45.2696 |
| 15 | 29 | 91.1241 |
| 16 | 31 | 84.3243 |
| 17 | 33 | −144.4018 |
| 18 | 35 | 183.0431 |
| 19 | 37 | 92.1154 |
| 20 | 40 | −61.8717 |
| 21 | 42 | −36.9891 |
| 22 | 44 | 66.9681 |
| 23 | 46 | 76.9281 |
| 24 | 48 | −201.8175 |
| 25 | 50 | 65.6130 |

Numerical Example 6

Regarding the zoom lens system of numerical example 6 (corresponding to example 6), Table 16 shows surface data, Table 17 shows various data, and Table 18 shows single lens data (unit: mm).

TABLE 16

Surface data

| SURFACE NUMBER | r | d | nd | vd |
|---|---|---|---|---|
| Object plane | ∞ (infinity) | | | |
| 1* | 470.37890 | 10.00000 | 1.50940 | 56.5 |
| 2* | 46.40080 | 22.24280 | | |
| 3 | 62.86240 | 3.50000 | 1.80420 | 46.5 |
| 4 | 35.04850 | 8.23400 | | |
| 5 | 54.25150 | 2.50000 | 1.80420 | 46.5 |
| 6 | 26.46800 | 20.45790 | | |
| 7 | −58.23820 | 9.59530 | 1.80420 | 46.5 |
| 8 | −54.97430 | 13.48880 | | |
| 9* | −21.83380 | 8.92100 | 1.51633 | 64.1 |
| 10* | −19.16310 | 0.20000 | | |
| 11 | −170.52590 | 8.82520 | 1.49700 | 81.6 |
| 12 | −25.34350 | 0.20000 | | |
| 13 | −27.52730 | 2.50000 | 1.86966 | 20.0 |
| 14 | 547.77300 | 0.66240 | | |
| 15 | −2910.64330 | 12.01970 | 1.49700 | 81.6 |
| 16 | −34.94790 | 0.20000 | | |
| 17 | 569.05770 | 13.00120 | 1.49700 | 81.6 |
| 18 | −54.03350 | 52.43390 | | |
| 19 | 113.08890 | 14.00000 | 1.92286 | 20.9 |
| 20 | −255.91160 | 0.20000 | | |
| 21 | 35.51020 | 11.53020 | 1.92286 | 20.9 |
| 22 | 48.89210 | 8.57230 | | |
| 23 | 149.63270 | 3.11540 | 1.80420 | 46.5 |
| 24 | 39.72700 | 18.68680 | | |
| 25 | −81.98070 | 4.41450 | 1.73800 | 32.3 |
| 26 | −58.08410 | 0.47880 | | |
| 27 | −54.41030 | 4.00000 | 1.75500 | 52.3 |
| 28 | 102.14640 | 28.87440 | | |
| 29 | −123.11250 | 8.14390 | 1.86966 | 20.0 |
| 30 | −51.51400 | variable | | |
| 31 | 459.44430 | 6.60460 | 1.59282 | 68.6 |

TABLE 16-continued

| | | | | |
|---|---|---|---|---|
| 32 | −51.60860 | 0.20000 | | |
| 33 | −52.25720 | 1.50000 | 1.59270 | 35.4 |
| 34 | −166.77410 | 0.20000 | | |
| 35 | 131.99520 | 4.04930 | 1.49700 | 81.6 |
| 36 | −805.29130 | variable | | |
| 37 | 35.88770 | 5.95330 | 1.59270 | 35.4 |
| 38 | 87.80370 | variable | | |
| 39 (Aperture) | ∞ | 2.91650 | | |
| 40 | 64.62000 | 1.50000 | 1.51680 | 64.2 |
| 41 | 25.27360 | variable | | |
| 42 | −37.75460 | 1.50000 | 1.73800 | 32.3 |
| 43 | 79.16160 | 0.45350 | | |
| 44 | 91.44850 | 7.76440 | 1.43700 | 95.1 |
| 45 | −42.41670 | variable | | |
| 46 | 70.67940 | 9.55270 | 1.49700 | 81.6 |
| 47 | −80.50330 | 8.02360 | | |
| 48 | 57.64490 | 2.50000 | 1.67300 | 38.3 |
| 49 | 38.89870 | 1.10570 | | |
| 50 | 42.03140 | 14.81530 | 1.43700 | 95.1 |
| 51 | −78.93860 | variable | | |
| 52 | ∞ | 41.77900 | 1.51680 | 64.2 |
| 53 | ∞ | BF | | |
| Image plane | ∞ | | | |

Aspherical data

1st surface

K = 0.00000E+00, A3 = 1.21277E−04, A4 = −5.82244E−07, A5 = −5.95006E−08, A6 = 1.77842E−09, A7 = −1.63746E−11, A8 = −5.85060E−14, A9 = 2.11902E−15, A10 = −1.08872E−17

2nd surface

K = −8.11394E−01, A3 = 1.65003E−04, A4 = −4.20440E−06, A5 = 3.97809E−09, A6 = 1.14779E−10, A7 = −1.71713E−12, A8 = 2.91519E−14, A9 = 6.24786E−16, A10 = −8.50847E−18

9th surface

K = 0.00000E+00, A3 = 0.00000E+00, A4 = −1.13910E−05, A5 = 0.00000E+00, A6 = −2.46711E−08, A7 = 0.00000E+00, A8 = −1.20244E−11, A9 = 0.00000E+00, A10 = −1.67140E−12

10th surface

K = 0.00000E+00, A3 = 0.00000E+00, A4 = 5.61069E−06, A5 = 0.00000E+00, A6 = 9.40124E−09, A7 = 0.00000E+00, A8 = 3.22652E−11, A9 = 0.00000E+00, A10 = 0.00000E+00

TABLE 17

Various data
Zoom ratio 1.07206

| | WIDE-ANGLE | INTERMEDIATE | TELEPHOTO |
|---|---|---|---|
| Focal length | −7.2526 | −7.4921 | −7.7752 |
| F number | −1.89660 | −1.89323 | −1.89545 |
| Angle of view | −66.7640 | −66.1128 | −65.3466 |
| Image height | 17.2650 | 17.2650 | 17.2650 |
| Total length of lens | 531.0076 | 531.0105 | 531.0083 |
| BF | 1.00778 | 1.01095 | 1.00847 |
| d30 | 80.0082 | 76.0752 | 71.4986 |
| d36 | 2.0000 | 6.0639 | 10.7992 |
| d38 | 5.2896 | 5.1586 | 5.0000 |
| d41 | 23.0156 | 22.5850 | 21.9978 |
| d45 | 2.9500 | 2.8961 | 2.8254 |
| d51 | 15.3200 | 15.8044 | 16.4624 |
| Position of entrance pupil | 40.2672 | 40.2788 | 40.2965 |
| Position of exit pupil | −723.7475 | −660.0698 | −589.7112 |
| Position of front principal point | 32.9420 | 32.7017 | 32.4189 |
| Position of rear principal point | 538.2126 | 538.4519 | 538.7288 |

TABLE 18

Single lens data

| Lens element | First surface | Focal length |
|---|---|---|
| 1 | 1 | −101.8693 |
| 2 | 3 | −104.3530 |
| 3 | 5 | −66.9515 |
| 4 | 7 | 527.9376 |
| 5 | 9 | 141.9555 |
| 6 | 11 | 58.7099 |
| 7 | 13 | −30.0775 |
| 8 | 15 | 71.0740 |
| 9 | 17 | 99.9845 |
| 10 | 19 | 86.5622 |
| 11 | 21 | 99.4565 |
| 12 | 23 | −68.1163 |
| 13 | 25 | 250.3683 |
| 14 | 27 | −46.5091 |
| 15 | 29 | 96.7347 |
| 16 | 31 | 78.6425 |
| 17 | 33 | −129.0298 |
| 18 | 35 | 228.5115 |
| 19 | 37 | 98.2136 |
| 20 | 40 | −81.3741 |
| 21 | 42 | −34.4504 |
| 22 | 44 | 67.4982 |
| 23 | 46 | 77.3496 |
| 24 | 48 | −187.8082 |
| 25 | 50 | 65.1909 |

Table 19 below shows values of the variables of the respective conditions (1) to (13) in the respective numerical examples.

TABLE 19

| Cond. | Ex. 1 | Ex. 2 | Ex. 3 | Ex. 4 | Ex. 5 | Ex. 6 |
|---|---|---|---|---|---|---|
| (1) | 0.20 | 0.21 | 0.21 | 0.21 | 0.22 | 0.22 |
| (2) | 198.73 | 178.09 | 207.65 | 614.34 | 240.96 | 312.80 |
| (3) | 11.32 | 12.68 | 13.68 | 12.85 | 11.89 | 11.22 |
| (4) | 7.28 | 7.23 | 7.20 | 7.12 | 6.97 | 7.23 |
| (5) | 5.52 | 5.58 | 5.63 | 5.87 | 6.23 | 5.70 |
| (6) | 0.94 | 0.94 | 0.94 | 0.96 | 0.98 | 0.95 |
| (7) | 9.62 | 9.51 | 9.53 | 9.51 | 9.65 | 9.03 |
| (8) | 3.28 | 3.32 | 3.33 | 3.43 | 3.62 | 3.45 |
| (9) | >0 | >0 | >0 | >0 | >0 | >0 |
| (10) | See (10), (11) in Tables 21A-B and 22A-B | | | | | |
| (11) | | | | | | |
| (12) | 66.79 | 66.78 | 66.78 | 66.77 | 66.77 | 66.76 |
| (13) | −1.07 | −1.08 | −1.07 | −1.12 | −1.15 | −1.22 |

Table 20 below shows values of the variables of the respective conditions (1) to (13) in the respective numerical examples.

TABLE 20

| Var. | Ex. 1 | Ex. 2 | Ex. 3 | Ex. 4 | Ex. 5 | Ex. 6 |
|---|---|---|---|---|---|---|
| fp | 10.76 | 10.76 | 10.76 | 10.77 | 10.86 | 10.78 |
| fr | 52.55 | 51.57 | 50.88 | 50.15 | 48.64 | 48.04 |
| fw | −7.25 | −7.25 | −7.25 | −7.25 | −7.28 | −7.25 |
| fr1 | 1440.19 | 1290.64 | 1504.69 | 4456.25 | 1754.05 | −2268.64 |
| frn | −82.07 | −91.91 | −99.12 | −93.19 | −86.54 | −81.37 |
| Ts | 52.73 | 52.40 | 52.15 | 51.67 | 50.74 | 52.43 |
| Tpr | 40.03 | 40.47 | 40.79 | 42.56 | 45.33 | 41.34 |
| Tp | 229.18 | 229.18 | 229.24 | 231.63 | 234.56 | 230.32 |
| Tr | 243.72 | 243.73 | 243.66 | 241.24 | 238.35 | 242.58 |
| fpr | 69.75 | 68.90 | 69.04 | 68.95 | 70.24 | 65.50 |
| fpf | 23.74 | 24.07 | 24.10 | 24.90 | 26.32 | 25.06 |
| ωm | 66.79 | 66.78 | 66.78 | 66.77 | 66.77 | 66.76 |
| L1R1 | 1559.73 | 1285.52 | 1542.86 | 853.39 | 689.85 | 470.38 |
| L1R2 | 49.93 | 49.83 | 49.56 | 48.22 | 47.68 | 46.40 |
| fr2 | 95.90 | 95.92 | 96.38 | 182.78 | 84.32 | 107.44 |
| fr3 | −82.07 | −91.91 | −99.12 | 197.31 | −144.40 | 98.21 |

TABLE 20-continued

| Var. | Ex. 1 | Ex. 2 | Ex. 3 | Ex. 4 | Ex. 5 | Ex. 6 |
|---|---|---|---|---|---|---|
| fr4 | 46.88 | 77.75 | 83.79 | -93.19 | 183.04 | -81.37 |
| fr5 | | 110.50 | -225.28 | 80.86 | -86.52 | -82.30 |
| fr6 | | | 72.33 | 99.47 | 76.93 | 48.50 |
| fr7 | | | | | -201.818 | |
| fr8 | | | | | 65.613 | | fp is a focal length of the magnification optical system,
fr is a focal length of the relay optical system at the wide-angle end,
fw is a focal length of the entire optical system at the wide-angle end,
fr1 is a focal length of the first lens group,
frn is a focal length of the negative lens group,
Ts is the longest air distance within the magnification optical system,
Tpr is a distance from a surface closest to the magnification side within the magnification optical system rear group to the intermediate imaging position,
Tp is a distance from a surface closest to the magnification side within the magnification optical system to the intermediate imaging position,
Tr is a distance from the intermediate imaging position to a surface closest to the reduction side within the relay optical system at the wide-angle end.
fpr is a focal length of the magnification optical system rear group,
fpf is a focal length of the magnification optical system front group,
ωm is a maximum half angle of view at the wide-angle end,
ym is a height at the telephoto end at which the most off-axis main ray passes through the lens surface,
L1R1 is a radius of curvature at the center of the lens magnification side surface closest to the magnification side,
L1R2 is a radius of curvature at the center of the lens reduction side surface closest to the magnification side.
fr2 is a focal length of the second lens group,
fr3 is a focal length of the third lens group,
fr4 is a focal length of the fourth lens group,
fr5 is a focal length of the fifth lens group,
fr6 is a focal length of the sixth lens group,
fr7 is a focal length of the seventh lens group, and
fr8 is a focal length of the eighth lens group.

Tables 21A-21B and 22A-22B below show values of |ym/(fw·tan(ωm))| in the condition (10) and Tg in the condition (11) in the respective numerical examples. Note that the lens material, Z330R, is the product name of cyclo-olefin polymers (COP) (ZEON). The lens element L1 can be also made of various synthetic resins, resulting in a lightweight lens. The remaining lens elements L2 to L25 can be also made of various synthetic resins, resulting in lightweight lenses.

TABLE 21A

| | Example 1 | | | Example 2 | | |
|---|---|---|---|---|---|---|
| | Lens material | (10) | (11) | Lens material | (10) | (11) |
| L1 | Z330R | 3.022 | 123 | Z330R | 3.021 | 123 |
| L2 | TAF3D | 1.573 | 692 | TAF3D | 1.584 | 692 |
| L3 | TAF3D | 1.124 | 692 | TAF3D | 1.123 | 692 |
| L4 | TAF3D | 0.297 | 692 | TAF3D | 0.273 | 692 |
| L5 | L-BSL7 | 0.133 | 498 | L-BSL7 | 0.143 | 498 |

TABLE 21A-continued

| | Example 1 | | | Example 2 | | |
|---|---|---|---|---|---|---|
| | Lens material | (10) | (11) | Lens material | (10) | (11) |
| L6 | FCD1 | 0.388 | 457 | FCD1 | 0.400 | 457 |
| L7 | FDS20-W | 0.506 | 589 | FDS20-W | 0.518 | 589 |
| L8 | FCD1 | 0.598 | 457 | FCD1 | 0.613 | 457 |
| L9 | FCD1 | 0.973 | 457 | FCD1 | 0.983 | 457 |
| L10 | E-FDS1-W | 1.920 | 666 | E-FDS1-W | 1.936 | 666 |
| L11 | E-FDS1-W | 1.573 | 666 | E-FDS1-W | 1.579 | 666 |
| L12 | TAF3D | 1.324 | 692 | TAF3D | 1.325 | 692 |
| L13 | S-NBH53V | 1.185 | 538 | S-NBH53V | 1.177 | 538 |
| L14 | TAC 6 | 1.172 | 675 | TAC6 | 1.161 | 675 |
| L15 | FDS20-W | 1.330 | 589 | FDS20-W | 1.317 | 589 |
| L16 | FCD515 | 0.417 | 540 | FCD515 | 0.391 | 540 |
| L17 | FF5 | 0.370 | 515 | FF5 | 0.354 | 515 |
| L18 | FCD1 | 0.324 | 457 | FCD1 | 0.307 | 457 |
| L19 | FF5 | 0.133 | 515 | FF5 | 0.120 | 515 |
| L20 | BSC7 | 0.091 | 556 | BSC7 | 0.088 | 556 |
| L21 | S-NBH53V | 0.477 | 538 | S-NBH53V | 0.483 | 538 |
| L22 | FCD100 | 0.529 | 404 | FCD100 | 0.552 | 404 |
| L23 | FCD1 | 0.771 | 457 | FCD1 | 0.800 | 457 |
| L24 | S-NBH52V | 0.941 | 497 | S-NBH52V | 0.950 | 497 |
| L25 | FCD100 | 0.980 | 404 | FCD100 | 0.987 | 404 |

TABLE 21B

| | Example 3 | | |
|---|---|---|---|
| | Lens material | (10) | (11) |
| L1 | Z330R | 3.017 | 123 |
| L2 | TAF3D | 1.591 | 692 |
| L3 | TAF3D | 1.127 | 692 |
| L4 | TAF3D | 0.278 | 692 |
| L5 | L-BSL7 | 0.161 | 498 |
| L6 | FCD1 | 0.428 | 457 |
| L7 | FDS20-W | 0.552 | 589 |
| L8 | FCD1 | 0.656 | 457 |
| L9 | FCD1 | 1.012 | 457 |
| L10 | E-FDS1-W | 1.961 | 666 |
| L11 | E-FDS1-W | 1.585 | 666 |
| L12 | TAF3D | 1.329 | 692 |
| L13 | S-NBH53V | 1.177 | 538 |
| L14 | TAC6 | 1.158 | 675 |
| L15 | FDS20-W | 1.309 | 589 |
| L16 | FCD515 | 0.378 | 540 |
| L17 | FF5 | 0.341 | 515 |
| L18 | FCD1 | 0.295 | 457 |
| L19 | FF5 | 0.109 | 515 |
| L20 | BSC7 | 0.083 | 556 |
| L21 | S-NBH53V | 0.465 | 538 |
| L22 | FCD100 | 0.538 | 404 |
| L23 | FCD1 | 0.776 | 457 |
| L24 | S-NBH52V | 0.917 | 497 |
| L25 | FCD100 | 0.990 | 404 |

TABLE 22A

| | Example 4 | | | Example 5 | | |
|---|---|---|---|---|---|---|
| | Lens material | (10) | (11) | Lens material | (10) | (11) |
| L1 | Z330R | 3.018 | 123 | Z330R | 3.001 | 123 |
| L2 | TAF3D | 1.606 | 692 | TAF3D | 1.551 | 692 |
| L3 | TAF3D | 1.133 | 692 | TAF3D | 1.127 | 692 |
| L4 | TAF3D | 0.371 | 692 | TAF3D | 0.341 | 692 |
| L5 | L-BSL7 | 0.174 | 498 | L-BSL7 | 0.204 | 498 |
| L6 | FCD1 | 0.447 | 457 | FCD1 | 0.468 | 457 |
| L7 | FDS20-W | 0.588 | 589 | FDS20-W | 0.622 | 589 |
| L8 | FCD1 | 0.704 | 457 | FCD1 | 0.749 | 457 |
| L9 | FCD1 | 1.045 | 457 | FCD1 | 1.090 | 457 |
| L10 | E-FDS1-W | 2.002 | 666 | E-FDS1-W | 2.038 | 666 |
| L11 | E-FDS1-W | 1.603 | 666 | E-FDS1-W | 1.622 | 666 |
| L12 | TAF3D | 1.330 | 692 | TAF3D | 1.334 | 692 |

TABLE 22A-continued

| | | Example 4 | | | Example 5 | | |
|---|---|---|---|---|---|---|---|
| | Lens material | (10) | (11) | Lens material | (10) | (11) |
| L13 | S-NBH53V | 1.167 | 538 | S-NBH53V | 1.190 | 538 |
| L14 | TAC 6 | 1.137 | 675 | TAC 6 | 1.157 | 675 |
| L15 | FDS20-W | 1.262 | 589 | FDS20-W | 1.292 | 589 |
| L16 | FCD515 | 0.373 | 540 | FCD515 | 0.362 | 540 |
| L17 | FF5 | 0.337 | 515 | FF5 | 0.314 | 515 |
| L18 | FCD1 | 0.268 | 457 | FCD1 | 0.245 | 457 |
| L19 | FF5 | 0.081 | 515 | FF5 | 0.039 | 515 |
| L20 | BSC7 | 0.099 | 556 | BSC7 | 0.095 | 556 |
| L21 | S-NBH53V | 0.456 | 538 | S-NBH53V | 0.415 | 538 |
| L22 | FCD100 | 0.522 | 404 | FCD100 | 0.463 | 404 |
| L23 | FCD1 | 0.764 | 457 | FCD1 | 0.708 | 457 |
| L24 | S-NBH52V | 0.911 | 497 | S-NBH52V | 0.886 | 497 |
| L25 | FCD100 | 0.970 | 404 | FCD100 | 0.959 | 404 |

TABLE 22B

| | | Example 6 | | |
|---|---|---|---|---|
| | Lens material | (10) | (11) |
| L1 | Z330R | 3.040 | 123 |
| L2 | TAF3D | 1.581 | 692 |
| L3 | TAF3D | 1.148 | 692 |
| L4 | TAF3D | 0.448 | 692 |
| L5 | L-BSL7 | 0.158 | 498 |
| L6 | FCD1 | 0.426 | 457 |
| L7 | FDS20-W | 0.583 | 589 |
| L8 | FCD1 | 0.704 | 457 |
| L9 | FCD1 | 1.061 | 457 |
| L10 | E-FDS1-W | 2.027 | 666 |
| L11 | E-FDS1-W | 1.638 | 666 |
| L12 | TAF3D | 1.323 | 692 |
| L13 | S-NBH53V | 1.138 | 538 |
| L14 | TAC6 | 1.107 | 675 |
| L15 | FDS20-W | 1.202 | 589 |
| L16 | FCD515 | 0.362 | 540 |
| L17 | FF5 | 0.346 | 515 |
| L18 | FCD1 | 0.303 | 457 |
| L19 | FF5 | 0.083 | 515 |
| L20 | BSC7 | 0.048 | 556 |
| L21 | S-NBH53V | 0.439 | 538 |
| L22 | FCD100 | 0.495 | 404 |
| L23 | FCD1 | 0.740 | 457 |
| L24 | S-NBH52V | 0.939 | 497 |
| L25 | FCD100 | 0.957 | 404 |

Second Embodiment

Figure 19:
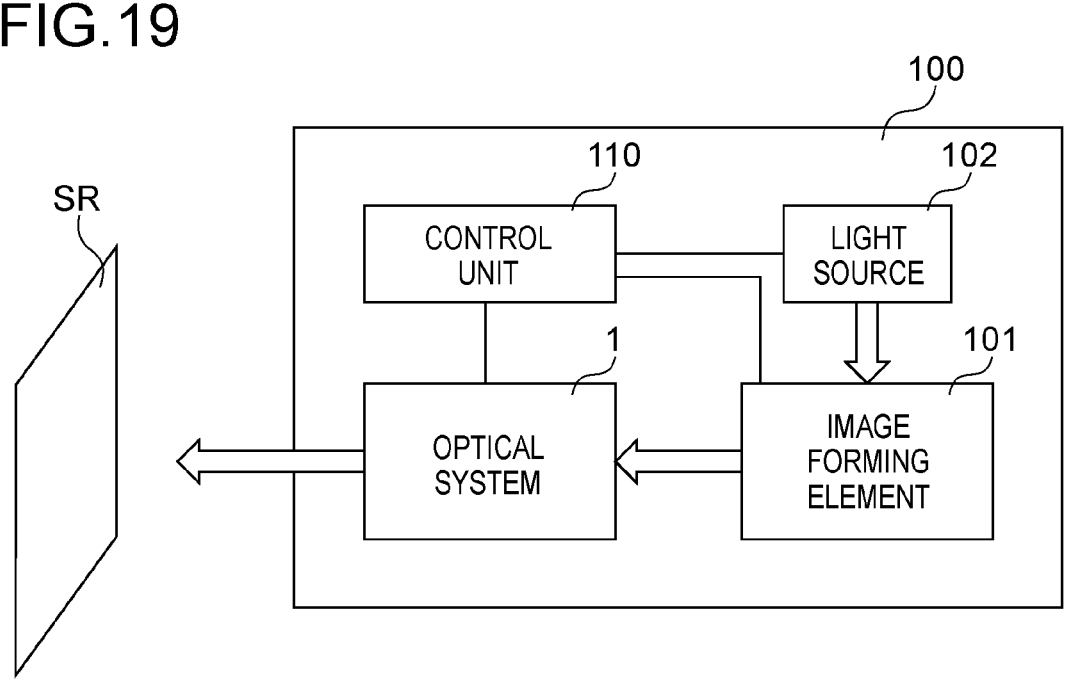
FIG. 19 is a block diagram showing an example of an image projection apparatus according to the present disclosure.

Hereinafter, a second embodiment of the present disclosure is described with reference to FIG. 19. FIG. 19 is a block diagram showing an example of the image projection apparatus according to the present disclosure. The image projection apparatus 100 includes such an optical system 1 as disclosed in the first embodiment, an image forming element 101, a light source 102, a control unit 110, and others. The image forming element 101 is constituted of, for example, liquid crystal or DMD, for generating an image to be projected through the optical system 1 onto a screen SR. The light source 102 is constituted of such as a light emitting diode (LED) or a laser, and supplies light to the image forming element 101. The control unit 110 is constituted of, for example, central processing unit (CPU) or micro-processing unit (MPU), for controlling the entire apparatus and respective components. The optical system 1 may be configured as an interchangeable lens that can be detachably attached to the image projection apparatus 100. In this case, an apparatus in which the optical system 1 is removed from the image projection apparatus 100 is an example of a main body apparatus.

The image projection apparatus 100 described above can realize a wide-angle zoom function while reducing a moment acting on the center of gravity and mitigating thermal effect by employing the optical system 1 according to the first embodiment.

Third Embodiment

Figure 20:
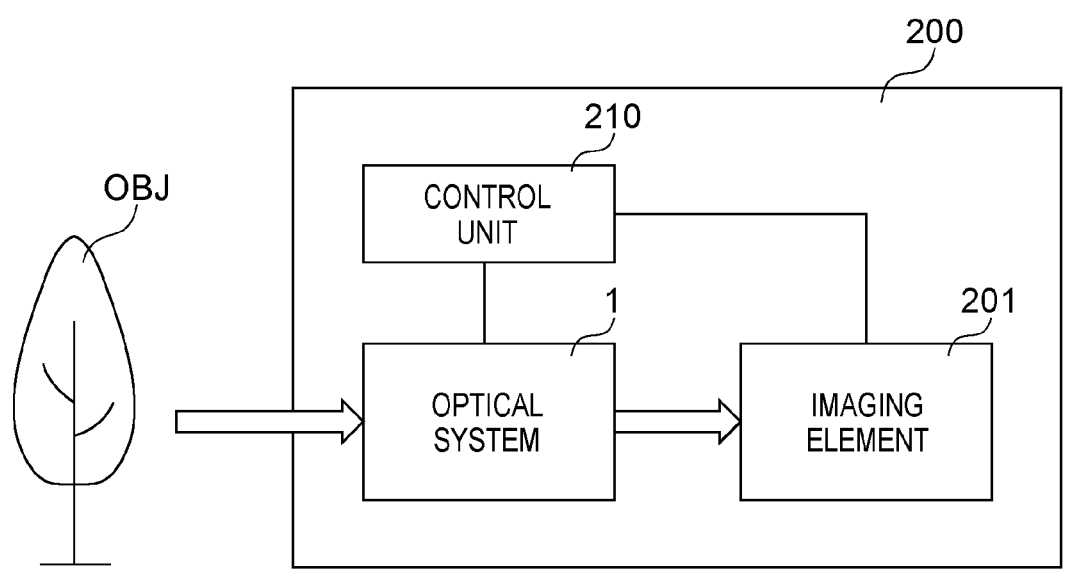
FIG. 20 is a block diagram showing an example of an imaging apparatus according to the present disclosure.

Hereinafter, a third embodiment of the present disclosure is described with reference to FIG. 20. FIG. 20 is a block diagram showing an example of the imaging apparatus according to the present disclosure. The imaging apparatus 200 includes such an optical system 1 as disclosed in the first embodiment, an imaging element 201, a control unit 210, and others. The imaging element 201 is constituted of, for example, charge coupled device (CCD) image sensor or complementary metal oxide semiconductor (CMOS) image sensor, for receiving an optical image of an object OBJ formed by the optical system 1 to convert the image into an electrical image signal. The control unit 110 is constituted of, for example, CPU or MPU, for controlling the entire apparatus and respective components. The optical system 1 may be configured as an interchangeable lens that can be detachably attached to the imaging apparatus 200. In this case, an apparatus in which the optical system 1 is removed from the imaging apparatus 200 is an example of a main body apparatus.

The imaging apparatus 200 described above can realize a wide-angle zoom function while reducing a moment acting on the center of gravity and mitigating thermal effect by employing the optical system 1 according to the first embodiment.

As described above, the embodiments have been described to disclose the technology in the present disclosure. To that end, the accompanying drawings and detailed description are provided.

Therefore, among the components described in the accompanying drawings and the detailed description, not only the components that are essential for solving the problem, but also the components that are not essential for solving the problem may also be included in order to exemplify the above-described technology. Therefore, it should not be directly appreciated that the above non-essential components are essential based on the fact that the non-essential components are described in the accompanying drawings and the detailed description.

Further, the above-described embodiments have been described to exemplify the technology in the present disclosure. Thus, various modification, substitution, addition, omission and so on can be made within the scope of the claims or equivalents thereof.

INDUSTRIAL APPLICABILITY

The present disclosure can be applied to image projection apparatuses such as projectors and head-up displays, and imaging apparatuses such as digital still cameras, digital video cameras, surveillance cameras in surveillance systems, web cameras, and onboard cameras. In particular, the present disclosure can be applied to optical systems that require a high image quality, such as projectors, digital still camera systems, and digital video camera systems.

The invention claimed is:

1. An optical system internally having an intermediate imaging position that is conjugated to a magnification conjugate point on a magnification side and a reduction conjugate point on a reduction side, respectively, the optical system comprising:
   a magnification optical system positioned on the magnification side with respect to the intermediate imaging position; and
   a relay optical system positioned on the reduction side with respect to the intermediate imaging position,
   the relay optical system including:
      a first lens group positioned closest to the magnification side;
      two lens groups positioned on the reduction side with respect to the first lens group;
      a first negative lens group interposed between the two lens groups; and
      a second negative lens group,
   wherein the second negative lens group has a negative power smaller than that of the first negative lens group, and
   wherein during zooming the first negative lens group is fixed, while the two lens groups are displaced.

2. The optical system according to claim 1, wherein the first negative lens group has an aperture.

3. The optical system according to claim 1, wherein a lens positioned closest to the reduction side within the plurality of lens elements of the magnification optical system is a negative lens.

4. The optical system according to claim 1, wherein a lens positioned closest to the magnification side within the plurality of lens elements of the relay optical system is a positive lens.

5. The optical system according to claim 1, wherein the following condition (1) is satisfied:

$$0.1 < fp/fr < 0.5 \tag{1}$$

where fp is a focal length of the magnification optical system, and fr is a focal length of the relay optical system at a wide-angle end.

6. The optical system according to claim 1, wherein the following condition (2) is satisfied:

$$100 < |fr1/fw| < 1000 \tag{2}$$

where fr1 is a focal length of the first lens group, and fw is a focal length of the entire optical system at a wide-angle end.

7. The optical system according to claim 1, wherein the following condition (3) is satisfied:

$$5 < frn/fw < 50 \tag{3}$$

where frn is a focal length of the first negative lens group, and fw is a focal length of the entire optical system at a wide-angle end.

8. The optical system according to claim 1, wherein the magnification optical system has a longest air distance among a plurality of air distances within the magnification optical system, and the plurality of lens elements of the magnification optical system includes a magnification optical system front group positioned on the magnification side with respect to the longest air distance and a magnification optical system rear group positioned on the reduction side with respect to the longest air distance, and
the optical system satisfies the following conditions (4) and (5):

$$6.5 < |Ts/fw| < 12.0 \tag{4}$$

$$3.0 < |Tpr/fw| < 8.0 \tag{5}$$

where Ts is the longest air distance within the magnification optical system, fw is a focal length of the entire optical system, and Tpr is a distance from a surface closest to the magnification side within the magnification optical system rear group to the intermediate imaging position.

9. The optical system according to claim 1, wherein the magnification optical system has a longest air distance among a plurality of air distances within the magnification optical system, and the plurality of lens elements of the magnification optical system includes a magnification optical system front group positioned on the magnification side with respect to the longest air distance and a magnification optical system rear group positioned on the reduction side with respect to the longest air distance, and
the optical system satisfies the following condition (7):

$$7 < |fpr/fw| < 12 \tag{7}$$

where fpr is a focal length of the magnification optical system rear group.

10. The optical system according to claim 1, wherein the magnification optical system has a longest air distance among a plurality of air distances within the magnification optical system, and the plurality of lens elements of the magnification optical system includes a magnification optical system front group positioned on the magnification side with respect to the longest air distance and a magnification optical system rear group positioned on the reduction side with respect to the longest air distance, and
the optical system satisfies the following condition (8):

$$2 < |fpf/fw| < 5 \tag{8}$$

where fpf is a focal length of the magnification optical system front group.

11. The optical system according to claim 1, wherein the plurality of lens elements of the magnification optical system includes a first lens element which is arranged closest to the magnification side within the magnification optical system, and the first lens element has a first lens magnification side aspherical surface facing the magnification side and a first lens reduction side aspherical surface facing the reduction side, and
the first lens magnification side surface and the first lens reduction side surface satisfy the following condition (9) within a range above zero (r>0) to an effective diameter:

$$dZ(r)/dr > 0 \tag{9}$$

where r is a distance (r>0) from a vertex of a surface as measured along a plane perpendicular to the optical axis of the optical system, and Z(r) is an amount of sag of the surface (assuming that Z=0 at the vertex (r=0), where Z has a sign + for reduction side displacement with respect to the vertex, and a sign − for magnification side displacement).

12. The optical system according to claim 1, wherein the plurality of lens elements of the magnification optical system includes a first lens element that is arranged closest to the magnification side within the magnification optical system, and the first lens element is made of synthetic resin.

13. The optical system according to claim 1, wherein among the plurality of lens elements of the magnification optical system and the plurality of lens elements of the relay optical system, all lens elements that satisfy the following condition (10) also satisfy the following condition (11), and one lens element does not satisfy both of the conditions (10) and (11):

$$|ym/(fw \cdot \tan(\omega m))| < 3.0 \tag{10}$$

$$Tg > 300° C. \tag{11}$$

where for each lens element, ωm is a maximum half angle of view at a wide-angle end, ym is a height at a telephoto end at which the most off-axis main ray passes through a surface of the lens element, and Tg is a glass transition point of a lens material of the lens element.

14. The optical system according to claim 1, wherein the following condition (12) is satisfied:

$$\omega m > 65° \tag{12}$$

where ωm is a maximum half angle of view at a wide-angle end.

15. The optical system according to claim 1, wherein the plurality of lens elements of the magnification optical system includes a first lens element that is arranged closest to the magnification side within the magnification optical system, and the following condition (13) is satisfied:

$$-1.5 < (L1R1+L1R2)/(L1R2-L1R1) < -0.9 \tag{13}$$

where L1R1 is a radius of curvature at a center of a lens magnification side surface of the first lens element, and L1R2 is a radius of curvature at a center of a lens reduction side surface of the first lens element.

16. An image projection apparatus comprising:
the optical system according to claim 1; and
an image forming element that generates an image to be projected through the optical system onto a screen.

17. An imaging apparatus comprising:
the optical system according to claim 1; and
an imaging element that receives an optical image formed by the optical system to convert the optical image into an electrical image signal.

18. The optical system according to claim 1, wherein the first lens group has a positive power, and the first lens group and the magnification optical system are fixed during zooming.

19. An optical system internally having an intermediate imaging position that is conjugated to a magnification conjugate point on a magnification side and a reduction conjugate point on a reduction side, respectively, the optical system comprising:
a magnification optical system positioned on the magnification side with respect to the intermediate imaging position; and
a relay optical system positioned on the reduction side with respect to the intermediate imaging position,
the relay optical system including:
a first lens group positioned closest to the magnification side;
two lens groups positioned on the reduction side with respect to the first lens group; and
a negative lens group interposed between the two lens groups,
wherein the following condition (6) is satisfied:

$$0.8 < Tp/Tr < 1.0 \tag{6}$$

where Tp is a distance from a surface closest to the magnification side within the magnification optical system to the intermediate imaging position, and Tr is a distance from the intermediate imaging position to a surface closest to the reduction side within the relay optical system at a wide-angle end.

20. An optical system internally having an intermediate imaging position at which an intermediate image is formed, the intermediate imaging position being conjugated to a magnification conjugate point on a magnification side and a reduction conjugate point on a reduction side, respectively, the optical system comprising:
a magnification optical system having a plurality of lens elements, the magnification optical system being positioned on the magnification side with respect to the intermediate imaging position; and
a relay optical system having a plurality of lens elements, the relay optical system being positioned on the reduction side with respect to the intermediate imaging position,
the plurality of lens elements of the relay optical system including:
a first lens group positioned closest to the magnification side;
two lens groups positioned on the reduction side with respect to the first lens group; and
a negative lens group interposed between the two lens groups,
wherein during zooming the negative lens group is fixed, while the two lens groups are displaced, and
wherein the following condition (1) is satisfied:

$$0.1 < fp/fr < 0.5 \tag{1}$$

where fp is a focal length of the magnification optical system, and fr is a focal length of the relay optical system at a wide-angle end.

* * * * *